US012120252B2

(12) United States Patent
Jakobsson

(10) Patent No.: US 12,120,252 B2
(45) Date of Patent: Oct. 15, 2024

(54) METHODS FOR SECURELY ADDING DATA TO A BLOCKCHAIN USING DYNAMIC TIME QUANTA AND VERSION AUTHENTICATION

(71) Applicant: Artema Labs, Inc, Los Angeles, CA (US)

(72) Inventor: Bjorn Markus Jakobsson, New York, NY (US)

(73) Assignee: Artema Labs, Inc, Los Angeles, CA (US)

( * ) Notice: Subject to any disclaimer, the term of this patent is extended or adjusted under 35 U.S.C. 154(b) by 192 days.

(21) Appl. No.: 17/817,931

(22) Filed: Aug. 5, 2022

(65) Prior Publication Data

US 2023/0043223 A1    Feb. 9, 2023

Related U.S. Application Data

(60) Provisional application No. 63/271,727, filed on Oct. 26, 2021, provisional application No. 63/244,857, filed on Sep. 16, 2021, provisional application No. 63/238,890, filed on Aug. 31, 2021, provisional application No. 63/229,924, filed on Aug. 5, 2021.

(51) Int. Cl.
*H04L 9/00* (2022.01)
*H04L 9/32* (2006.01)

(52) U.S. Cl.
CPC .............. *H04L 9/50* (2022.05); *H04L 9/3218* (2013.01); *H04L 9/3271* (2013.01)

(58) Field of Classification Search
CPC ........ H04L 9/50; H04L 9/3218; H04L 9/3271
USPC ...................................................... 713/168
See application file for complete search history.

(56) References Cited

U.S. PATENT DOCUMENTS

| 8,990,576 B2 | 3/2015 | Jakobsson |
| 2017/0337534 A1* | 11/2017 | Goeringer ............. G06Q 20/06 |
| 2019/0123580 A1 | 4/2019 | Bindea et al. |
| 2019/0123680 A1* | 4/2019 | Rodrigues ................ E04D 1/30 |

(Continued)

FOREIGN PATENT DOCUMENTS

WO       2023015312 A1     2/2023

OTHER PUBLICATIONS

International Preliminary Report on Patentability for International Application PCT/US2022/074633, Report issued Feb. 6, 2024, Mailed on Feb. 15, 2024, 15 Pgs.

(Continued)

*Primary Examiner* — Samson B Lemma
(74) *Attorney, Agent, or Firm* — KPPB LLP

(57) ABSTRACT

Devices can be configured to implement distributed ledgers capable of immutably recording ledger entries that have validated version identifiers. The devices can include network interfaces, memory and processors. Processors can be configured to obtain ledger entries including version identifiers and version authenticator values, determine software versions that correspond to version identifiers, determine that version identifiers are valid based on version authenticator values, obtain challenges using cryptographic systems, wherein challenges are based on ledger entries, and/or broadcast blocks that incorporate ledger entries to securely add blocks to distributed ledgers. Blocks can be capable of being validated by using cryptographic systems to obtain proofs based on challenges.

10 Claims, 41 Drawing Sheets

(56) References Cited

U.S. PATENT DOCUMENTS

| | | | |
|---|---|---|---|
| 2019/0312734 A1* | 10/2019 | Wentz | H04L 9/3239 |
| 2019/0312941 A1* | 10/2019 | Maccini | H04H 60/88 |
| 2019/0324995 A1* | 10/2019 | Jakobsson | H04L 9/50 |
| 2019/0358515 A1* | 11/2019 | Tran | H04L 9/3236 |
| 2020/0028868 A1* | 1/2020 | Sood | G06F 21/53 |
| 2020/0257775 A1 | 8/2020 | Wright et al. | |
| 2021/0049685 A1* | 2/2021 | Tachau | G06Q 40/03 |
| 2021/0073913 A1 | 3/2021 | Ingargiola | |
| 2022/0058622 A1* | 2/2022 | Snow | G06Q 20/0658 |

OTHER PUBLICATIONS

International Search Report and Written Opinion for International Application No. PCT/US2022/074633, Search completed Oct. 29, 2022, Mailed Nov. 22, 2022, 27 Pgs.

Jakobsson, "Fractal hash sequence representation and traversal", Conference: Information Theory, 2002. Proceedings. 2002 IEEE International Symposium, 6 pgs.

Yang et al., "A Blockchain-Based Reputation System for Data Credibility Assessment in Vehicular Network", ResearchGate, 2018, retrieved on [Oct. 27, 2022]. Retrieved from the internet URL: https://www.researchgate.net/profile/Zhe-Yang..., 6 pgs.

* cited by examiner

METHODS FOR SECURELY ADDING DATA TO A BLOCKCHAIN USING DYNAMIC TIME QUANTA AND VERSION AUTHENTICATION

CROSS-REFERENCE TO RELATED APPLICATIONS

The current application claims the benefit of and priority under 35 U.S.C. § 119(e) to U.S. Provisional Patent Application No. 63/271,727 filed Oct. 26, 2021 titled "Improvement of Proof of History Based Blockchain Verification," U.S. Provisional Patent Application No. 63/244,857 filed Sep. 16, 2021 titled "Robust Enforcement of Software Update Policies in Consensus Networks," U.S. Provisional Patent Application No. 63/238,890 filed Aug. 31, 2021 titled "Methods for Ensuring Blockchain Integrity and Stability," and U.S. Provisional Patent Application No. 63/229,924 filed Aug. 5, 2021 titled "Integration of Real-World Data and Measurements into Distributed and Consensus-Based Environments," the disclosures of which are incorporated herein by reference in their entireties for all purposes.

FIELD OF THE INVENTION

This invention relates to cryptography. More particularly it relates to verification mechanisms associated with cryptographic systems.

BACKGROUND

Cryptography can be used to provide security, privacy and authenticity to transactions. Some cryptographic components, such as digital signatures and encryption functions, are standardized and well-studied with known security characteristics. Cryptography can be used to create immutable ledgers such as (but not limited to) blockchains. Immutable ledgers and blockchains can be based on a variety of cryptographic methods. In some implementations of immutable ledgers and blockchains, mining is used to securely add information. Mining can include computer systems (often referred to as "miners") generating proofs based on computational challenges. Generally, a proof can be an output of a function that conforms to one or more requirements defined by a challenge. A proof protocol can be a function used to generate a proposed proof. The proof protocol can be iteratively performed until a proof is generated which meets the requirements of the challenge. The requirements of the challenge can be based on a difficulty. Mining can also include the use of computer systems known as "verifiers" that perform processes to check the generated proofs. In many instances, a proof can be easily verified based on providing successful inputs to a verifier. Miners and verifies can be implemented using any one or more of personal computers, application-specific integrated circuits, mobile devices (e.g., a mobile phone or tablet), server computer systems, virtual machines executing on computer systems, and/or any other form of computing device capable of performing computations associated with the performance of a particular mining or verifier function.

SUMMARY OF THE INVENTION

A device can be configured to implement a distributed ledger capable of immutably recording certified measurements. In an embodiment, the device includes a network interface, memory and a processor. The processor configured to obtain a ledger entry comprising a certified report. The certified report including: a certified measurement. The certified measurement including a first data element and an assurance. The assurance including executable instructions that execute conditional on a measurement evaluation. The processor further configured to compute a challenge using a cryptographic system. The challenge is based on the ledger entry. The processor further configured to broadcast a block that incorporates the ledger entry to securely add the block to a distributed ledger. The block is capable of being validated by using a cryptographic system to obtain a proof based on the challenge.

In another embodiment, the processor is further configured to receive the block, and the proof is obtained based on the block.

In a further embodiment the proof is generated based on an iterative process.

In still another embodiment, the processor is further configured to receive a condition, the condition comprising in indication of a requirement for the certified measurement.

In a still further embodiment, the processor is further configured to receive a condition, the condition including an indication of a requirement for the assurance.

In yet another embodiment, the assurance satisfies a condition.

In another additional embodiment, the assurance comprises a reference to a token.

In a further additional embodiment, the assurance comprises a reference to a cryptographic token recorded on a blockchain.

In another embodiment again, the assurance comprises a reference to a cryptographic insurance token recorded on a blockchain.

In a further embodiment again, the assurance comprises a reference to a reputation value.

In still yet another embodiment, the assurance includes a reference to a reputation value, the reputation value associated with an observer entity that generated the certified measurement.

In a still yet further embodiment, the assurance includes a reference to a smart contract.

In still another embodiment the certified measurement further includes a digital signature.

In a still further embodiment, wherein the certified measurement further includes a policy.

In yet another embodiment, the certified report further includes a digital signature.

In a yet further embodiment, the certified report further includes a reference to a smart contract.

In another additional embodiment, the certified report further includes a policy.

In a further additional embodiment, the processor is further configured to generate a certified report based on a certified measurement.

In still yet another embodiment, the processor is further configured to generate a certified measurement based on a measurement.

In a still yet further embodiment, the processor is further configured to obtain a bounty hunter report, wherein the bounty hunter report includes a reference to the certified report.

In still another additional embodiment, the processor is further configured to obtain a bounty hunter report from a bounty hunter, wherein the bounty hunter report includes a public key.

In a still further additional embodiment, the processor is further configured to obtain a bounty hunter report from a bounty hunter, wherein the bounty hunter report includes evidence.

In still another embodiment again, the certified measurement further includes origination details.

In a still further embodiment again, the certified report further includes computed data, the computed data generated based on the certified measurement.

In yet another additional embodiment, the certified report further includes origination details.

In yet another embodiment again, the certified report further includes a function descriptor.

A device can be configured to implement a distributed ledger capable of immutably recording certified measurements. In an embodiment the device includes a network interface, memory, and a processor. The processor configured to obtain a ledger entry. The ledger entry including a certified report. The certified report including an assurance, and a certified measurement. The certified measurement including a first data element. The processor further configured to compute a challenge using a cryptographic system, wherein the challenge is based on the ledger entry, and broadcast a block that incorporates the ledger entry to securely add the block to a distributed ledger. The block is capable of being validated by using a cryptographic system to obtain a proof based on the challenge.

In a yet further embodiment again, the processor is further configured to receive the block, and the proof is obtained based on the block.

In another additional embodiment again, the proof is generated based on an iterative process.

In another embodiment, wherein the processor is further configured to receive a condition, the condition comprising in indication of a requirement for the certified report.

In still another embodiment again, the processor is further configured to receive a condition, the condition comprising in indication of a requirement for the assurance.

In still another additional embodiment, the assurance satisfies a condition.

In another additional embodiment, the assurance includes a reference to a token.

In a still further embodiment, the assurance includes a reference to a cryptographic token recorded on a blockchain.

In yet another embodiment, the assurance includes a reference to a cryptographic insurance token recorded on a blockchain.

In a yet further embodiment, the assurance includes a reference to a reputation value.

In a further additional embodiment, the assurance includes a reference to a reputation value, the reputation value associated with an observer entity that generated the certified measurement.

In still yet another embodiment, the assurance includes a reference to a smart contract.

In a still yet further embodiment, the certified measurement further includes a digital signature.

In a still further additional embodiment, the certified measurement further includes a policy.

In a still further embodiment again, the certified report further includes a digital signature.

In a still further embodiment again, the certified report further includes a policy.

In yet another embodiment again, the processor is further configured to generate a certified report based on a certified measurement.

In a yet further embodiment again, the processor is further configured to generate a certified measurement based on a measurement.

In another additional embodiment again, the processor is further configured to obtain a bounty hunter report, wherein the bounty hunter report includes a reference to the certified report.

In another embodiment, the processor is further configured to obtain a bounty hunter report from a bounty hunter, wherein the bounty hunter report includes a public key.

In a further embodiment, the processor is further configured to obtain a bounty hunter report from a bounty hunter, wherein the bounty hunter report includes evidence.

In a still further embodiment, the certified measurement further includes origination details.

In yet another additional embodiment, the certified report further includes computed data, the computed data generated based on the certified measurement.

In still another embodiment again, certified report further includes origination details.

In still another additional embodiment, the certified report further includes a function descriptor.

Devices can be configured to implement a distributed ledger capable of immutably recording evidence. In an embodiment, the device includes a network interface, memory, and a processor. The processor configured to obtain a first ledger entry. The first ledger entry including evidence associated with a first public key. The evidence indicating that a tag associated with a second ledger entry satisfies a condition, wherein the second ledger entry is associated with a second public key. The first ledger entry further including a transaction for transferring a number of tokens from the second public key to the first public key. The processor further configured to obtain a challenge using a cryptographic system, wherein the challenge is based on the first ledger entry. The processor further configured to broadcast a block that incorporates the first ledger entry to securely add the block to a distributed ledger. The block is capable of being validated by using a cryptographic system to obtain a proof based on the challenge.

In another additional embodiment, the processor is further configured to receive the block; and the proof is obtained based on the block.

In a still further embodiment, the proof is generated based on an iterative process.

In yet another embodiment, the tag indicates a software configuration of an entity, wherein the entity closed the second ledger entry.

In a yet further embodiment, the tag indicates a hardware configuration of an entity, wherein the entity closed the second ledger entry.

In a further additional embodiment, the second ledger entry includes a second transaction for transferring a second number of tokens to the second public key.

In still yet another embodiment, the second ledger entry includes a second transaction for transferring a second number of tokens to the second public key, and wherein the second transaction is a coinbase transaction.

In a still yet further embodiment, the challenge is further based on the second ledger entry.

In a still further additional embodiment, the block further the second ledger entry.

In a still further embodiment again, the first ledger entry further includes a third transaction for transferring a third number of tokens to a third public key.

In yet another embodiment again, the first ledger entry further includes a third transaction for transferring a third number of tokens to a third public key, and wherein the third transaction is a coinbase transaction.

In a yet further embodiment again, the first ledger entry further includes a third transaction for transferring a third number of tokens to the first public key.

In another additional embodiment again, the first ledger entry further includes a third transaction for transferring a third number of tokens to the first public key, and wherein the third transaction is a coinbase transaction.

A device can be configured to implement a distributed ledger capable of immutably recording a commitment to evidence. In an embodiment the device includes a network interface, memory, and a processor. The processor configured to obtain a container. The container comprising evidence associated with a first public key, the evidence indicating that a tag associated with a first ledger entry satisfies a condition, wherein the first ledger entry is associated with a first public key. The processor further configured to obtain a second ledger entry. The second ledger entry including a commitment to the evidence, the commitment associated with a second public key. The processor further configured to obtain a challenge using a cryptographic system, wherein the challenge is based on the container, and broadcast a block that incorporates the second ledger entry to securely add the block to a distributed ledger. The block is capable of being validated by using a cryptographic system to obtain a proof based on the challenge.

In another embodiment, the processor is further configured to receive the block, and the proof is obtained based on the block.

In a further embodiment, the proof is generated based on an iterative process.

In a still further embodiment, the challenge is further based on the first ledger entry.

In yet another additional embodiment, a coinbase transaction incorporated into the block is associated with a third public key.

In a still further embodiment again, a coinbase transaction incorporated into the block is associated with the second public key.

In still another embodiment again, the processor is further configured to obtain a third ledger entry, the third ledger entry comprising a decommitment to the evidence, the decommitment associated with the second public key.

In still another additional embodiment, wherein the block further incorporates a third ledger entry, the third ledger entry comprising a decommitment to the evidence, the decommitment associated with the second public key.

In another additional embodiment, the tag indicates a software configuration of an entity, wherein the entity is associated with the first public key.

In a still further embodiment, the tag indicates a hardware configuration of an entity, wherein the entity is associated with the first public key.

In yet another embodiment, the container further includes a second tag.

In a yet further embodiment, the container further includes a second tag, the second tag indicating a software configuration of an entity associated with the second public key.

In a further additional embodiment, the container further includes a second tag, the second tag indicating a hardware configuration of an entity associated with the second public key.

In still yet another embodiment, the container further includes a ledger reference.

In a still yet further embodiment, wherein the container further includes a proof.

In a still further additional embodiment, the container further includes a report referencing the first ledger entry and comprising a third public key.

A device can be configured to implement a distributed ledger capable of immutably recording ledger entries that have been modified based on a software version. In an embodiment, the device includes a network interface, memory, and a processor. The processor configured to obtain a ledger entry comprising a version identifier, determine a software version that corresponds to the version identifier, determine a limitation value based on the software version, modify the ledger entry based on the limitation value, obtain a challenge using a cryptographic system, wherein the challenge is based on the ledger entry, and broadcast a block that incorporates the ledger entry to securely add the block to a distributed ledger. The block is capable of being validated by using the cryptographic system to obtain a proof based on the challenge.

In yet another embodiment again, the processor is further configured to receive the block, and the proof is obtained based on the block.

In a yet further embodiment again, the proof is generated based on an iterative process.

In another additional embodiment again, the ledger entry further includes a version authenticator value and wherein determining the limitation value is based on a comparison between the version authenticator value and a function output, wherein the function output is based on the challenge and the software version.

In another embodiment, modifying the ledger entry based on the limitation value includes reducing a number of tokens associated with a coinbase transaction.

In a further embodiment, the proof is capable of being validated based on the limitation value.

In a still further embodiment, the limitation value can be determined based on a state of the distributed ledger.

In yet another additional embodiment, determining a software version that corresponds to the version identifier includes accessing a code record.

In a still further embodiment again, determining a software version that corresponds to the version identifier includes accessing a code record comprising code and a digital signature on the code.

In still another embodiment again, determining a software version that corresponds to the version identifier includes determining if the version identifier is valid.

In still another additional embodiment, the ledger entry further includes a version authenticator value, and wherein determining a software version that corresponds to the version identifier includes determining if the version identifier is valid based on the version authenticator value.

Devices can be configured to implement a distributed ledger capable of immutably recording ledger entries that have been modified based on limitation values. In an embodiment, the device includes a network interface, memory, and a processor. The processor configured to obtain a ledger entry including a version identifier, obtain a limitation value based on the version identifier, obtain a challenge based on a ledger entry using a cryptographic system, and broadcast a block that incorporates the ledger entry to securely add the block to a distributed ledger. The block is capable of being verified by using the cryptographic system to obtain a proof based on the challenge. The proof is capable of being validated based on comparing a validator number to the limitation value, wherein the validator number is extracted from the proof.

In another additional embodiment, the processor is further configured to receive the block, and the proof is obtained based on the block.

In a still further embodiment, the proof is generated based on an iterative process.

In yet another embodiment, extracting a validator number from a proof includes selecting a portion of the proof.

In a yet further embodiment, extracting a validator number from a proof includes selecting a portion of a hash of the proof.

In a further additional embodiment, extracting a validator number from a proof includes selecting a set of twenty most significant bits of the proof.

In still yet another embodiment, obtaining a limitation value is based on comparing a software version associated with the version identifier with a received second software version.

In a still yet further embodiment, the ledger entry further includes a version authenticator value and wherein obtaining the limitation value is based on a comparison between the version authenticator value and a function output, wherein the function output is based on the challenge and a software version associated with the version identifier.

In a still further additional embodiment, the processor is further configured to modify the ledger entry based on the limitation value.

In yet another embodiment again, the processor is further configured to modify the ledger entry based on the limitation value to reduce a number of tokens associated with a coinbase transaction.

In another additional embodiment again, the limitation value can be determined based on a state of the distributed ledger.

In a further embodiment, the processor is further configured to determine a software version that corresponds to the version identifier.

In a still further embodiment, the processor is further configured to determine a software version that corresponds to the version identifier, and wherein determining a software version that corresponds to the version identifier includes determining if the version identifier is valid.

In another embodiment, the ledger entry further includes a version authenticator value, and wherein determining a software version that corresponds to the version identifier includes determining if the version identifier is valid based on the version authenticator value.

A can be device configured to implement a distributed ledger capable of immutably recording ledger entries that have validated version identifiers. In an embodiment, the device includes a network interface, memory, and a processor. The processor configured to obtain a ledger entry comprising a version identifier and a version authenticator value, determine a software version that corresponds to the version identifier, determine that the version identifier is valid based on the version authenticator value, obtain a challenge using a cryptographic system, wherein the challenge is based on the ledger entry, and broadcast a block that incorporates the ledger entry to securely add the block to a distributed ledger. The block is capable of being validated by using the cryptographic system to obtain a proof based on the challenge.

In a further additional embodiment, the processor is further configured to receive the block and the proof is obtained based on the block.

In still another embodiment again, the proof is generated based on an iterative process.

In a still further embodiment again, the proof is capable of being validated based on comparing a validator number to a limitation value, wherein the validator number is extracted from the proof.

In a yet further embodiment again, extracting a validator number from a proof includes selecting a portion of the proof.

In yet another additional embodiment, extracting a validator number from a proof includes selecting a portion of a hash of the proof.

In still another additional embodiment, extracting a validator number from a proof includes selecting a set of twenty most significant bits of the proof.

In another additional embodiment, obtaining a limitation value is based on comparing a software version associated with the version identifier with a received second software version.

In a still further embodiment, the limitation value can be determined based on a state of the distributed ledger.

In yet another embodiment, determining a software version that corresponds to the version identifier includes determining if the version identifier is valid.

In a yet further embodiment, determining a software version that corresponds to the version identifier includes determining if the version identifier is valid based on the version authenticator value.

Devices can be configured to implement a distributed ledger capable of immutably recording a hash chain. In an embodiment, the device includes a network interface, memory, and a processor. The processor configured to obtain a ledger entry. The ledger entry including a hash chain, and an event. The processor further configured to obtain a challenge using a cryptographic system. The challenge is based on the hash chain and the event. The processor further configured to broadcast a block that incorporates the ledger entry to securely add the block to a distributed ledger. The block is capable of being validated by using a cryptographic system to obtain a proof based on the challenge.

In a further additional embodiment, the processor is further configured to receive the block; and the proof is obtained based on the block.

In still yet another embodiment, the processor is further configured to receive a witness; and the proof is obtained based on the witness.

In a still yet further embodiment, the proof is generated based on an iterative process.

In a still further additional embodiment, the challenge is further based on a hardness value.

In a still further embodiment again, the challenge is further based on a hardness value and wherein the hardness value is modified based on an occurrence of at least one collision associated with the event.

In yet another embodiment again, the challenge is further based on a hardness value and wherein the hardness value is modified based on a number of ledger closings.

In another embodiment, the challenge is further based on a hardness value and wherein the hardness value is modified based on a change in system time.

In another additional embodiment again, the challenge is further based on a hardness value and wherein the hardness value is modified based on an absence of at least one collision associated with the event.

In a further embodiment, the hash chain is used for a Proof of History computation.

In a still further embodiment, the hash chain is used to create a relative order between recorded events, wherein the recorded events comprise the event.

In still another embodiment again, the hash chain includes a series of hash values.

A device can be configured to implement a distributed ledger capable of immutably recording a hash chain, and wherein challenges are based on a hardness value. In an embodiment the device includes a network interface, memory, and a processor. The processor configured to obtain a hardness value, obtain a ledger entry. The ledger entry including a hash chain, a first event associated with a first time, a second event associated with a second time. The processor further configured to modify the hardness value based on the second time and the first time, obtain a challenge using a cryptographic system. The challenge is based on the hash chain, the hardness value, the first event, and the second event. The processor further configured to broadcast a block that incorporates the ledger entry to securely add the block to a distributed ledger. The block is capable of being validated by using a cryptographic system to obtain a proof based on the challenge.

In a yet further embodiment again, the processor is further configured to receive the block, and the proof is obtained based on the block.

In yet another additional embodiment, the processor is further configured to receive a witness, and the proof is obtained based on the witness.

In still another additional embodiment, the proof is generated based on an iterative process.

In another additional embodiment, the hash chain includes a series of hash values.

In a still further embodiment, modifying the hardness value based on the second time and the first time includes increasing the hardness value when it is determined that the second time minus the first time is greater than a threshold.

In yet another embodiment, the ledger entry further includes a third event associated with a third time, and wherein modifying the hardness value based on the second time and the first time includes reducing the hardness value when it is determined that the third time minus the first time is less than a threshold.

In a yet further embodiment, wherein modifying the hardness value is further based on an occurrence of at least one collision associated with the first event and the second event.

In a further additional embodiment, modifying the hardness value is further based on a number of ledger closings.

In still yet another embodiment, modifying the hardness value is further based on a change in system time.

In a still further additional embodiment, modifying the hardness value is further based on an absence of at least one collision associated with the first event and the second event.

In a still yet further embodiment, the hash chain is used for a Proof of History computation.

In a still further embodiment again, the hash chain is used to create a relative order between recorded events, wherein the recorded events comprise the first event and the second event.

A device can be configured to implement a distributed ledger capable of immutably recording a hash chain. In an embodiment, the device includes a network interface, memory, and a processor. The processor configured to obtain a first hardness value and a second hardness value, obtain a ledger entry. The ledger entry including a hash chain, a first event, a second event. The processor further configured to obtain a first challenge using a cryptographic system. The first challenge is based on the hash chain, the first hardness value, the first event, and the second event. The processor further configured to obtain a second challenge using a cryptographic system. The second challenge is based on the hash chain, the second hardness value, the first event, and the second event. The processor further configured to select a selected challenge from among the first challenge and the second challenge, and broadcast a block that incorporates the ledger entry to securely add the block to a distributed ledger. The block is capable of being validated by using a cryptographic system to obtain a proof based on the selected challenge.

In another embodiment, the processor is further configured to receive the block, and the proof is obtained based on the block.

In another additional embodiment again, the processor is further configured to receive a witness, and the proof is obtained based on the witness.

In a yet further embodiment again, the proof is generated based on an iterative process.

In yet another embodiment again, the hash chain includes a series of hash values.

In yet another additional embodiment, the processor is further configured identify a first set of collisions associated with the first challenge.

In a still further embodiment again, the processor is further configured identify a second set of collisions associated with the second challenge.

In still another embodiment again, selecting a selected challenge from among the first challenge and the second challenge is based on a first set of collisions associated with the first challenge, and a second set of collisions associated with the second challenge.

In still another additional embodiment, selecting a selected challenge from among the first challenge and the second challenge is based on a first set of collisions associated with the first challenge, and a second set of collisions associated with the second challenge, and wherein the selected challenge is associated with a fewest number collisions.

In still yet another embodiment, the processor is further configured to obtain a third hardness value, obtain a third challenge using a cryptographic system. The third challenge is based on the hash chain, the third hardness value, the first event, and the second event. The processor further configured to select a selected challenge from among the first challenge, the second challenge, and the third challenge.

In a further additional embodiment, the block further incorporates an indication of the selected challenge.

In another additional embodiment, the first event is associated with a first time, the second event is associated with a second time.

In a still further embodiment, the first event is associated with a first time, the second event is associated with a second time, and wherein a collision between a first event and a second event can be determined based on the first time and the second time.

In yet another embodiment, the hash chain is used for a Proof of History computation.

In a yet further embodiment, the hash chain is used to create a relative order between recorded events, wherein the recorded events comprise the first event and the second event.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1:
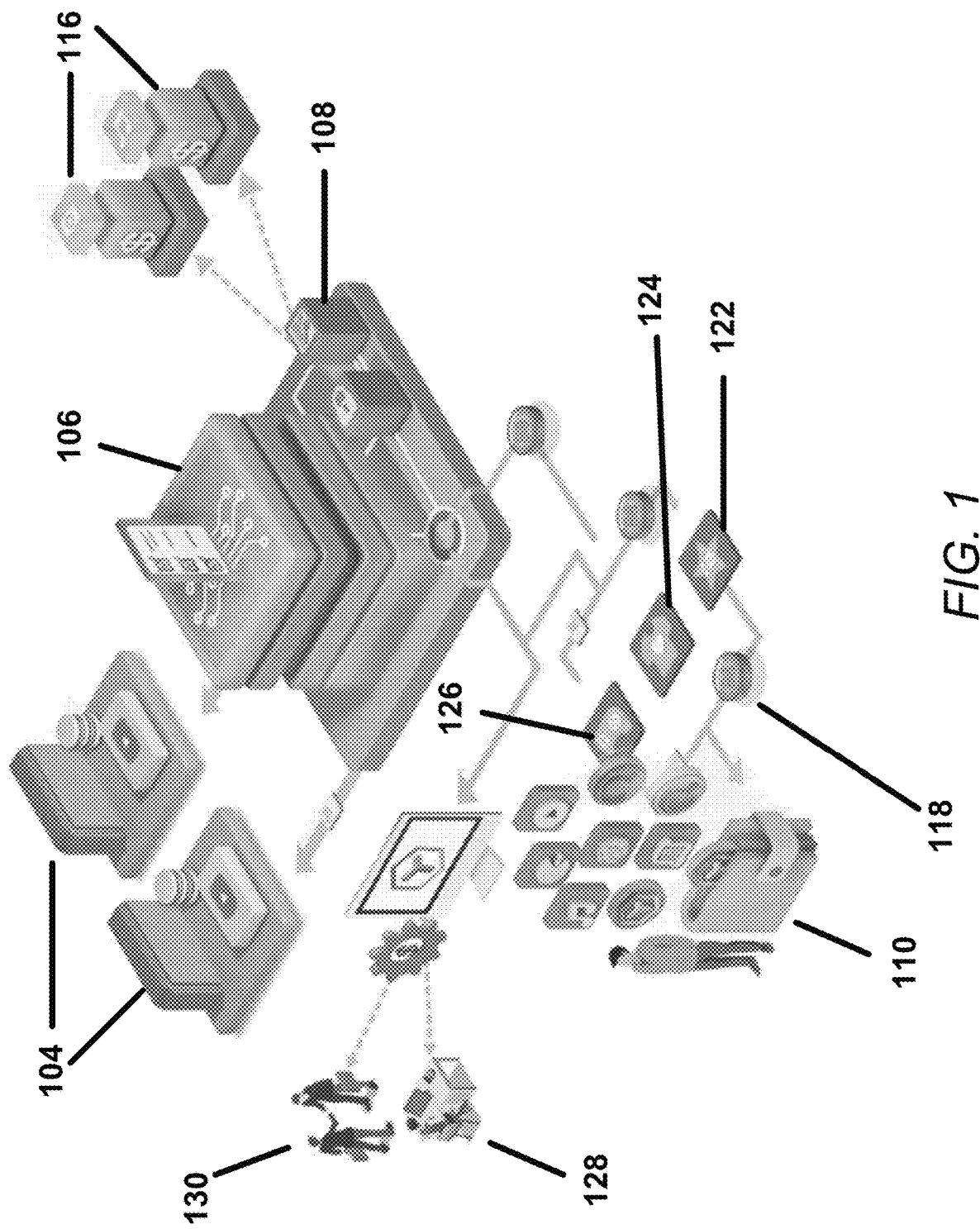
FIG. 1 is a conceptual diagram of an NFT platform in accordance with an embodiment of the invention.

In several embodiments, data can be securely written to the blockchain. In a number of embodiments, the data can include information about external (external to the blockchain) events and states; and/or internal (internal to the blockchain) events and states. External events and states can include real-world measurements, and other information about events occurring off the blockchain. In many embodiments, external events and/or states can be written to the blockchain by incorporating data into ledger entries, and/or by incorporating references to the data into ledger entries. The ledger entries can be integrated into ledgers (e.g., distributed ledgers). In several embodiments, external events and states can be recorded by observers as observations (e.g., certified observations). The observations can be combined into reports (e.g., certified reports) by aggregators. The observations and/or reports can be integrated into ledgers (e.g., distributed ledgers) by miners and/or verifiers. In many embodiments, external and/or internal states and/or events can be ordered using time quanta. When too many states and/or events are to be logged during a time quantum, time quanta sizes can be adjusted. Adjusting time quanta sizes can allow the system to control a precision for time ordering of external and/or internal states and/or events as they are written to a ledger (e.g., distributed ledger). In some embodiments, internal events and/or states can include software versions and updates used by participants on a network (e.g., miners and verifiers on a blockchain). In certain embodiments, systems can be implemented to encourage participants (e.g., miners and verifiers) to keep their software up to date. In many embodiments, software versions can be logged to and authenticated using a ledger (e.g., distributed ledger).

In some embodiments, low-volume real-world data can be integrated into blockchain-based environments by integrating the data items as auxiliary inputs provided to miners and verifiers. Consensus mechanisms can provide assurance that the recorded values are correct. However, this mechanism is often impractical. In a context, where the real-world data to be integrated into the blockchain is not as unambiguous, a different technique can be used. Consider, for example, a type of data that is very volatile, and which therefore causes different entities measuring it at ever so slightly different times to have different values. This will prevent consensus and/or may enable incorrect data to be added to what are immutable records. Similarly, if a large array of non-volatile measurements are to be incorporated, their combined entropy can cause different entities to commonly disagree about one or more values of the array, and therefore again disrupt a consensus to be formed. The lack of knowledge among a sufficient number of miners and verifiers can make these entities unable to determine the challenge with a high degree of certainty, which can undermine the consensus mechanism or makes the system less robust. In various embodiments these issues are addressed. In several embodiments, certified observations and certified reports can be tokens that are used to integrate real-world data and measurements into distributed and consensus-based environments. The real-world data and measurements can be collectively referred to as external data, as they originate from a location external to the distributed and consensus-based systems. The process of generating these tokens from underlying observations, corresponding to the external data, can be referred to as tokenization. In several embodiments, the data is recorded by systems referred to as observers, which generate observations. Systems that can be referred to as aggregators can compile the data from observers to generate reports. In various embodiments, the quality of the observations and reports can be maintained based on penalties for poor quality and/or substantial deviance from expected results.

Consensus-based protocols typically live and die by the functionality of the majority. If a majority of miners within a cryptographic system have an incorrect software version such as an outdated version, or a majority have a bug or other flaw, then this may cause disruptions, including forks. Outdated software is common with mining systems administered by casual miners and full nodes with nothing at stake. A fork is when two or more versions of a blockchain co-exist. This may cause double-spending and/or other problems. In prior art systems there are no built-in measures that address this problem. Some instances can be resolved by rapid patching, if they are discovered in a timely manner, others may not, especially if the bug or flaw is not understood or known about until it causes a fork. It can be critical to solve this problem in a manner that automates detection and remediation of potential vulnerabilities to any consensus-based systems, where crypto-mining protocols is one such system.

In several embodiments, a system can police computational units and identify computational units that are out of compliance, based on scrutiny of the outputs generated by the computational units that are out of compliance. However, it is important that this mechanism for policing the system does not introduce risks in the form of decreased robustness, e.g., against 51% attacks. It is also important to enable graceful transitions to desired software or hardware configurations without the introduction of errors, risks of disruption, and other problems. In many embodiments, version information can be included during mining processes. The information can indicate software and hardware being used for mining. In many embodiments, bounty hunters can inspect this information to identify entities out of compliance. When entities are determined to be out of compliance, a penalty can be levied. The penalty can be determined based on the reason for noncompliance.

In several embodiments, version identifiers and/or version authenticators, can be used both as conveyors of what version is used and as an advertisement platform of what versions are available. That is, a miner or verifier, upon inspecting a proof and associated auxiliary data, can determine that there is an update available for the code. In some embodiments, the miner would optionally also be able to automatically locate such updates, using the reference to the location of the new code.

In several embodiment, incentives can be provided for miners to rapidly update to newer software versions. In some embodiments, non-compliant miners can be penalized to reduce their profits from mining. In several embodiments, miners can be discouraged from misrepresenting version information, as such abuse would cause disruptions in the long run. In several embodiments, Miners that are significantly outdated in terms of the code base they use would at some point become not only non-compliant but also non-compatible. This, however, would affect very small numbers of miners as there would be incentives for these miners to update their code base for mining prior to this becoming significantly out of date. Here, significantly out of date may refer to a situation in which a version that is more than one update too old is used. Like miners, verifiers are incentivized to update to the most recent code base, as they would otherwise not be able to perform their functionality (e.g., by becoming non-compatible).

Proof of History (PoH) is a technique that has been proposed in the context of Blockchain ledger closings, e.g., by a miner and a corresponding verifier. Prior art systems for PoH have a significant drawback related to the significant cost of verification, due to the need for a near-replication of the mining efforts by each verifier in the system. This leads to increased costs of operation, and risks associated with cheating by verifiers. For example, one verifier strategy is to approve any block by voting for its correctness, without having first performed the costly and demanding verification that should precede a vote. In some embodiments, the drawbacks, costs and risks associated with PoH can be avoided, while maintaining a sufficiently high resolution of the time stamping provided by the use of PoH.

In many embodiments, hardness values can be used to increase the difficulty of determining a proof in absence of a witness as compared to with a witness. The witness associated with a proof can be determined by a miner. Miners can transmit a witness with a proof when submitting a mining attempt for verification. Verifiers can verify the proof based on the witness. The witness can be included as an input to a hash function to generate the proof. Access to a witness can eliminate the need to iterate when generating a proof associated with the witness. Verifiers can have access to the witness and can therefore use the easier means for solving the proof. In several embodiments, a reported chain added to the blockchain can be selected from multiple chains. In various embodiments, the reported chain can be the chain with the largest quanta and no collisions among the generated chains. In several embodiments, the reported chain could be selected based on quanta size and collision numbers. In some embodiments, the workload for provers (e.g., miners) can be increased by requiring multiple chains but the cost to verifiers is reduced. Various embodiments have the benefit of minimizing both the relative cost for the verifier and the risk of collisions, at the same time.

Non-Fungible Token (NFT) Platforms

Turning now to the drawings, systems and methods for implementing blockchain-based Non-Fungible Token (NFT) platforms in accordance with various embodiments of the invention are illustrated. In several embodiments, blockchain-based NFT platforms are platforms which enable content creators to issue, mint, and transfer Non-Fungible Tokens (NFTs) directed to content including, but not limited to, rich media content.

In a number of embodiments, content creators can issue NFTs to users within the NFT platform. NFTs can be created around a large range of real-world media content and intellectual property. Movie studios can mint digital collectibles for their movies, characters, notable scenes and/or notable objects. Record labels can mint digital collectibles for artists, bands, albums and/or songs. Similarly, official digital trading cards can be made from likeness of celebrities, cartoon characters and/or gaming avatars.

NFTs minted using NFT platforms in accordance with various embodiments of the invention can have multifunctional programmable use cases including rewards, private access to premium content and experiences, as discounts toward the purchase of goods, among many other value-added use cases.

In many embodiments, each NFT can have a set of attributes that define its unique properties. NFTs may therefore be classified based on which attributes are emphasized. Possible classifications may address, but are not limited to: NFTs as identifying entities, NFTs output by other NFTs, NFTs as content creation assets, and NFTs as evaluating entities. NFTs can be interpreted differently by various platforms in order to create platform-specific user experiences. The metadata associated with an NFT may also include digital media assets such as (but not limited to) images, videos about the specific NFT, and the context in which it was created (studio, film, band, company song etc.).

In many embodiments, NFT storage may be facilitated through mechanisms for the transfer of payment from users to one or more service providers. Through these mechanisms, a payment system for NFT maintenance can allow for incremental payment and ongoing asset protection. NFT storage may be additionally self-regulated through willing participants disclosing unsatisfactory NFT management in exchange for rewards.

In many embodiments, the NFT platform can include media wallet applications that enable users to securely store NFTs and/or other tokens on their devices. Furthermore, media wallets (also referred to as "digital wallets") can enable users to obtain NFTs that prove purchase of rights to access a particular piece of media content on one platform and use the NFT to gain access to the purchased content on another platform. The consumption of such content may be governed by content classification directed to visual user interface systems.

In several embodiments, users can download and install media wallet applications to store NFTs on the same computing devices used to consume streamed and/or downloaded content. Media wallet applications and NFTs can disseminate data concerning media consumption on the computing devices on which the media wallet applications are installed and/or based upon observations indicative of media consumption independently of the device. Media consumption data may include, but is not limited to, data reporting the occurrence of NFT transactions, data reporting the occurrence of NFT event interactions data reporting the content of NFT transactions, data reporting the content of media wallet interactions, and/or data reporting the occurrence of media wallet interactions.

While various aspects of NFT platforms, NFTs, media wallets, blockchain configurations, reporting structures, and maintenance systems are discussed above, NFT platforms and different components that can be utilized within NFT platforms in accordance with various embodiments of the invention are discussed further below.

NFT Platforms

An NFT platform in accordance with an embodiment of the invention is illustrated in FIG. 1. The NFT platform 100 utilizes one or more immutable ledgers (e.g., one or more blockchains) to enable a number of verified content creators 104 to access an NFT registry service to mint NFTs 106 in a variety of forms including (but not limited to) celebrity NFTs 122, character NFTs from games 126, NFTs that are redeemable within games 126, NFTs that contain and/or enable access to collectibles 124, and NFTs that have evolutionary capabilities representative of the change from one NFT state to another NFT state.

Issuance of NFTs 106 via the NFT platform 100 enables verification of the authenticity of NFTs independently of the content creator 104 by confirming that transactions written to one or more of the immutable ledgers are consistent with the smart contracts 108 underlying the NFTs.

As is discussed further below, content creators 104 can provide the NFTs 106 to users to reward and/or incentivize engagement with particular pieces of content and/or other user behavior including (but not limited to) the sharing of user personal information (e.g., contact information or user ID information on particular services), demographic information, and/or media consumption data with the content creator and/or other entities. In addition, the smart contracts 108 underlying the NFTs can cause payments of residual royalties 116 when users engage in specific transactions involving NFTs (e.g., transfer of ownership of the NFT).

In a number of embodiments, users utilize media wallet applications 110 on their devices to store NFTs 106 distributed using the NFT platform 100. Users can use media wallet applications 110 to obtain and/or transfer NFTs 106. In facilitating the retention or transfer of NFTs 106, media wallet applications may utilize wallet user interfaces that engage in transactional restrictions through either uniform or personalized settings. Media wallet applications 110 in accordance with some embodiments may incorporate NFT filtering systems to avoid unrequested NFT assignment. Methods for increased wallet privacy may also operate through multiple associated wallets with varying capabilities. As can readily be appreciated, NFTs 106 that are implemented using smart contracts 108 having interfaces that comply with open standards are not limited to being stored within media wallets and can be stored in any of a variety of wallet applications as appropriate to the requirements of a given application. Furthermore, a number of embodiments of the invention support movement of NFTs 106 between different immutable ledgers. Processes for moving NFTs between multiple immutable ledgers in accordance with various embodiments of the invention are discussed further below.

In several embodiments, content creators 104 can incentivize users to grant access to media consumption data using offers including (but not limited to) offers of fungible tokens 118 and/or NFTs 106. In this way, the ability of the content creators to mint NFTs enables consumers to engage directly with the content creators and can be utilized to incentivize users to share with content creators' data concerning user interactions with additional content. The permissions granted by individual users may enable the content creators 104 to directly access data written to an immutable ledger. In many embodiments, the permissions granted by individual users enable authorized computing systems to access data within an immutable ledger and content creators 104 can query the authorized computing systems to obtain aggregated information. Numerous other example functions for content creators 104 are possible, some of which are discussed below.

NFT blockchains in accordance with various embodiments of the invention enable issuance of NFTs by verified users. In many embodiments, the verified users can be content creators that are vetted by an administrator of networks that may be responsible for deploying and maintaining the NFT blockchain. Once the NFTs are minted, users can obtain and conduct transactions with the NFTs. In several embodiments, the NFTs may be redeemable for items or services in the real world such as (but not limited to) admission to movie screenings, concerts, and/or merchandise.

As illustrated in FIG. 1, users can install the media wallet application 110 onto their devices and use the media wallet application 110 to purchase fungible tokens. The media wallet application could also be provided by a browser, or by a dedicated hardware unit executing instructions provided by a wallet manufacturer. The different types of wallets may have slightly different security profiles and may offer different features, but would all be able to be used to initiate the change of ownership of tokens, such as NFTs. In many embodiments, the fungible tokens can be fully converted into fiat currency and/or other cryptocurrency. In several embodiments, the fungible tokens are implemented using split blockchain models in which the fungible tokens can be issued to multiple blockchains (e.g., Ethereum). As can readily be appreciated, the fungible tokens and/or NFTs utilized within an NFT platform in accordance with various embodiments of the invention are largely dependent upon the requirements of a given application.

In several embodiments, the media wallet application is capable of accessing multiple blockchains by deriving accounts from each of the various immutable ledgers used within an NFT platform. For each of these blockchains, the media wallet application can automatically provide simplified views whereby fungible tokens and NFTs across multiple accounts and/or multiple blockchains can be rendered as single user profiles and/or wallets. In many embodiments, the single view can be achieved using deep-indexing of the relevant blockchains and API services that can rapidly provide information to media wallet applications in response to user interactions. In certain embodiments, the accounts across the multiple blockchains can be derived using BIP32 deterministic wallet key. In other embodiments, any of a variety of techniques can be utilized by the media wallet application to access one or more immutable ledgers as appropriate to the requirements of a given application.

NFTs can be purchased by way of exchanges 130 and/or from other users 128. In addition, content creators can directly issue NFTs to the media wallets of specific users (e.g., by way of push download or AirDrop). In many embodiments, the NFTs are digital collectibles such as celebrity NFTs 122, character NFTs from games 126, NFTs that are redeemable within games 126, and/or NFTs that contain and/or enable access to collectibles 124. It should be appreciated that a variety of NFTs are described throughout the discussion of the various embodiments described herein and can be utilized in any NFT platform and/or with any media wallet application.

While the NFTs are shown as static in the illustrated embodiment, content creators can utilize users' ownership of NFTs to engage in additional interactions with the user. In this way, the relationship between users and particular pieces of content and/or particular content creators can evolve over time around interactions driven by NFTs. In a number of embodiments, collection of NFTs can be gamified to enable unlocking of additional NFTs. In addition, leaderboards can be established with respect to particular content and/or franchises based upon users' aggregation of NFTs. As is discussed further below, NFTs and/or fungible tokens can also be utilized by content creators to incentivize users to share data.

NFTs minted in accordance with several embodiments of the invention may incorporate a series of instances of digital content elements in order to represent the evolution of the digital content over time. Each one of these digital elements can have multiple numbered copies, just like a lithograph, and each such version can have a serial number associated with it, and/or digital signatures authenticating its validity. The digital signature can associate the corresponding image to an identity, such as the identity of the artist. The evolution of digital content may correspond to the transition from one representation to another representation. This evolution may be triggered by the artist, by an event associated with the owner of the artwork, by an external event measured by platforms associated with the content, and/or by specific combinations or sequences of event triggers. Some such NFTs may also have corresponding series of physical embodiments. These may be physical and numbered images that are identical to the digital instances described above. They may also be physical representations of another type, e.g., clay figures or statues, whereas the digital representations may be drawings. The physical embodiments may further be of different aspects that relate to the digital series. Evolution in compliance with some embodiments may also be used to spawn additional content, for example, one NFT directly creating one or more secondary NFTs.

When the user wishes to purchase an NFT using fungible tokens, media wallet applications can request authentication of the NFT directly based upon the public key of the content creator and/or indirectly based upon transaction records within the NFT blockchain. As discussed above, minted NFTs can be signed by content creators and administrators of the NFT blockchain. In addition, users can verify the authenticity of particular NFTs without the assistance of entities that minted the NFT by verifying that the transaction records involving the NFT within the NFT blockchain are consistent with the various royalty payment transactions required to occur in conjunction with transfer of ownership of the NFT by the smart contract underlying the NFT.

In several embodiments, an NFT platform (e.g., NFT platform 100) can include additional components, such as the components described in FIGS. 18-38.

Applications and methods in accordance with various embodiments of the invention are not limited to media wallet applications or use within NFT platforms. Accordingly, it should be appreciated that the data collection capabilities of any media wallet application described herein can also be implemented outside the context of an NFT platform and/or in a dedicated application and/or in an application unrelated to the storage of fungible tokens and/or NFTs. Various systems and methods for implementing NFT platforms and media wallet applications in accordance with various embodiments of the invention are discussed further below.

NFT Platform Network Architectures

NFT platforms in accordance with many embodiments of the invention utilize public blockchains and permissioned blockchains. In several embodiments, the public blockchain is decentralized and universally accessible. Additionally, in a number of embodiments, private/permissioned blockchains are closed systems that are limited to publicly inaccessible transactions. In many embodiments, the permissioned blockchain can be in the form of distributed ledgers, while the blockchain may alternatively be centralized in a single entity.

Figure 2:
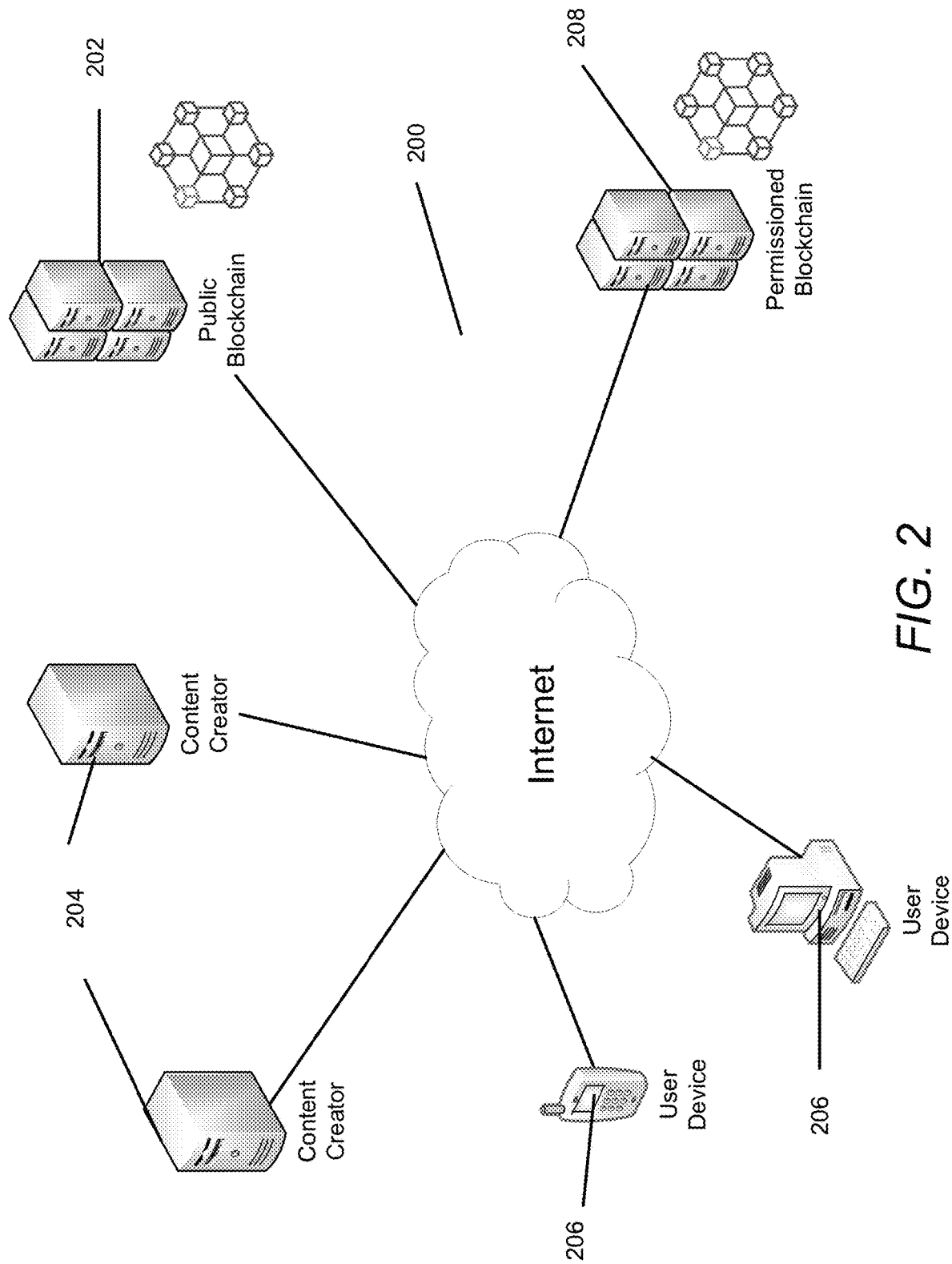
FIG. 2 is a network architecture diagram of an NFT platform in accordance with an embodiment of the invention.

An example of network architecture that can be utilized to implement an NFT platform including a public blockchain and a permissioned blockchain in accordance with several embodiments of the invention is illustrated in FIG. 2. The NFT platform 200 utilizes computer systems implementing a public blockchain 202 such as (but not limited to) Ethereum and Solana. A benefit of supporting interactions with public blockchains 202 is that the NFT platform 200 can support minting of standards based NFTs that can be utilized in an interchangeable manner with NFTs minted by sources outside of the NFT platform on the public blockchain. In this way, the NFT platform 200 and the NFTs minted within the NFT platform are not part of a walled garden, but are instead part of a broader blockchain-based ecosystem. The ability of holders of NFTs minted within the NFT platform 200 to transact via the public blockchain 202 increases the likelihood that individuals acquiring NFTs will become users of the NFT platform. Initial NFTs minted outside the NFT platform can also be developed through later minted NFTs, with the initial NFTs being used to further identify and interact with the user based upon their ownership of both NFTs. Various systems and methods for facilitating the relationships between NFTs, both outside and within the NFT platform are discussed further below.

Users can utilize user devices configured with appropriate applications including (but not limited to) media wallet applications to obtain NFTs. In many embodiments, media wallets are smart device enabled, front-end applications for fans and/or consumers, central to all user activity on an NFT platform. As is discussed in detail below, different embodiments of media wallet applications can provide any of a variety of functionality that can be determined as appropriate to the requirements of a given application. In the illustrated embodiment, the user devices 206 are shown as mobile phones and personal computers. As can readily be appreciated user devices can be implemented using any class of consumer electronics device including (but not limited to) tablet computers, laptop computers, televisions, game consoles, virtual reality headsets, mixed reality headsets, augmented reality headsets, media extenders, and/or set top boxes as appropriate to the requirements of a given application.

In many embodiments, NFT transaction data entries in the permissioned blockchain 208 are encrypted using users' public keys so that the NFT transaction data can be accessed by the media wallet application. In this way, users control access to entries in the permissioned blockchain 208 describing the user's NFT transaction. In several embodiments, users can authorize content creators 204 to access NFT transaction data recorded within the permissioned blockchain 208 using one of a number of appropriate mechanisms including (but not limited to) compound identities where the user is the owner of the data and the user can authorize other entities as guests that can also access the data. As can readily be appreciated, particular content creators' access to the data can be revoked by revoking their status as guests within the compound entity authorized to access the NFT transaction data within the permissioned blockchain 208. In certain embodiments, compound identities are implemented by writing authorized access records to the permissioned blockchain using the user's public key and the public keys of the other members of the compound entity.

When content creators wish to access particular pieces of data stored within the permissioned blockchain 208, they can make a request to a data access service. The data access service may grant access to data stored using the permissioned blockchain 208 when the content creators' public keys correspond to public keys of guests. In a number of embodiments, guests may be defined within a compound identity. The access record for the compound entity may also authorize the compound entity to access the particular piece of data. In this way, the user has complete control over access to their data at any time by admitting or revoking content creators to a compound entity, and/or modifying the access policies defined within the permissioned blockchain 208 for the compound entity. In several embodiments, the permissioned blockchain 208 supports access control lists and users can utilize a media wallet application to modify permissions granted by way of the access control list. In many embodiments, the manner in which access permissions are defined enables different restrictions to be placed on particular pieces of information within a particular NFT transaction data record within the permissioned blockchain 208. As can readily be appreciated, the manner in which NFT platforms and/or immutable ledgers provide fine-grained data access permissions largely depends upon the requirements of a given application.

In many embodiments, storage nodes within the permissioned blockchain 208 do not provide content creators with access to entire NFT transaction histories. Instead, the storage nodes simply provide access to encrypted records. In several embodiments, the hash of the collection of records from the permissioned blockchain is broadcast. Therefore, the record is verifiably immutable and each result includes the hash of the record and the previous/next hashes. As noted above, the use of compound identities and/or access control lists can enable users to grant permission to decrypt certain pieces of information or individual records within the permissioned blockchain. In several embodiments, the access to the data is determined by computer systems that implement permission-based data access services.

In many embodiments, the permissioned blockchain 208 can be implemented using any blockchain technology appropriate to the requirements of a given application. As noted above, the information and processes described herein are not limited to data written to permissioned blockchains 208, and NFT transaction data simply provides an example. Systems and methods in accordance with various embodiments of the invention can be utilized to enable applications to provide fine-grained permission to any of a variety of different types of data stored in an immutable ledger as appropriate to the requirements of a given application in accordance with various embodiments of the invention.

While various implementations of NFT platforms are described above with reference to FIG. 2, NFT platforms can be implemented using any number of immutable and pseudo-immutable ledgers as appropriate to the requirements of specific applications in accordance with various embodiments of the invention. Blockchain databases in accordance with various embodiments of the invention may be managed autonomously using peer-to-peer networks and distributed timestamping servers. In some embodiments, any of a variety of consensus mechanisms may be used by public blockchains, including but not limited to Proof of Space mechanisms, Proof of Work mechanisms, Proof of Stake mechanisms, and hybrid mechanisms.

NFT platforms in accordance with many embodiments of the invention may benefit from the oversight and increased security of private blockchains. As can readily be appreciated, a variety of approaches can be taken to the writing of data to permissioned blockchains and the particular approach is largely determined by the requirements of particular applications. As such, computer systems in accordance with various embodiments of the invention can have the capacity to create verified NFT entries written to permissioned blockchains.

Figure 3:
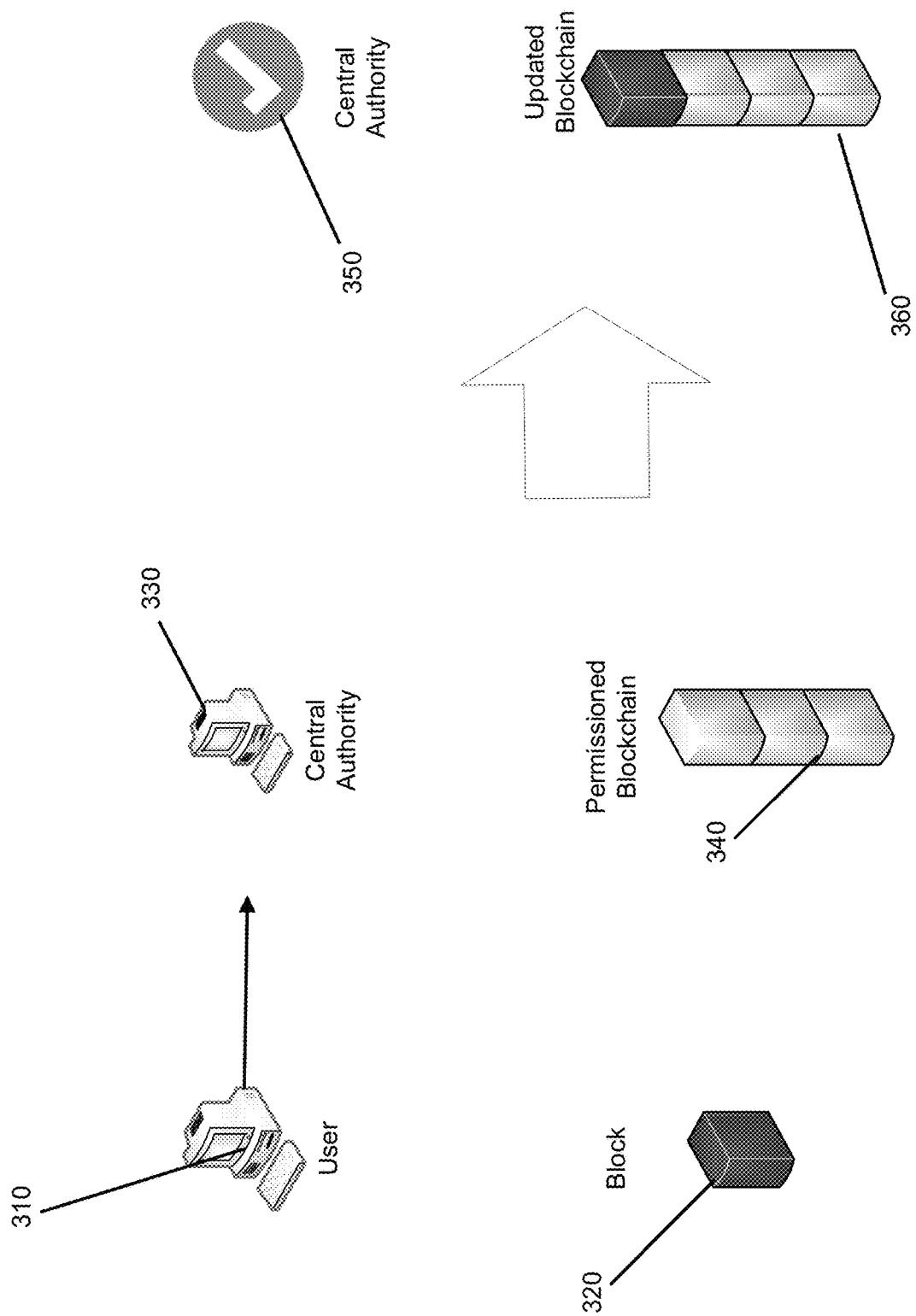
FIG. 3 is a conceptual diagram of a permissioned blockchain in accordance with an embodiment of the invention.

An implementation of permissioned (or private) blockchains in accordance with some embodiments of the invention is illustrated in FIG. 3. Permissioned blockchains 340 can typically function as closed computing systems in which each participant is well defined. In several embodiments, private blockchain networks may require invitations. In a number of embodiments, entries, or blocks 320, to private blockchains can be validated. In some embodiments, the validation may come from central authorities 330. Private blockchains can allow an organization or a consortium of organizations to efficiently exchange information and record transactions. Specifically, in a permissioned blockchain, a preapproved central authority 330 (which should be understood as potentially encompassing multiple distinct authorized authorities) can approve a change to the blockchain. In a number of embodiments, approval may come without the use of a consensus mechanism involving multiple authorities. As such, through a direct request from users 310 to the central authority 330, the determination of whether blocks 320 can be allowed access to the permissioned blockchain 340 can be determined. Blocks 320 needing to be added, eliminated, relocated, and/or prevented from access may be controlled through these means. In doing so the central authority 330 may manage accessing and controlling the network blocks incorporated into the permissioned blockchain 340. Upon the approval 350 of the central authority, the now updated blockchain 360 can reflect the added block 320.

NFT platforms in accordance with many embodiments of the invention may also benefit from the anonymity and accessibility of a public blockchain. Therefore, NFT platforms in accordance with many embodiments of the invention can have the capacity to create verified NFT entries written to a permissioned blockchain.

Figure 4:
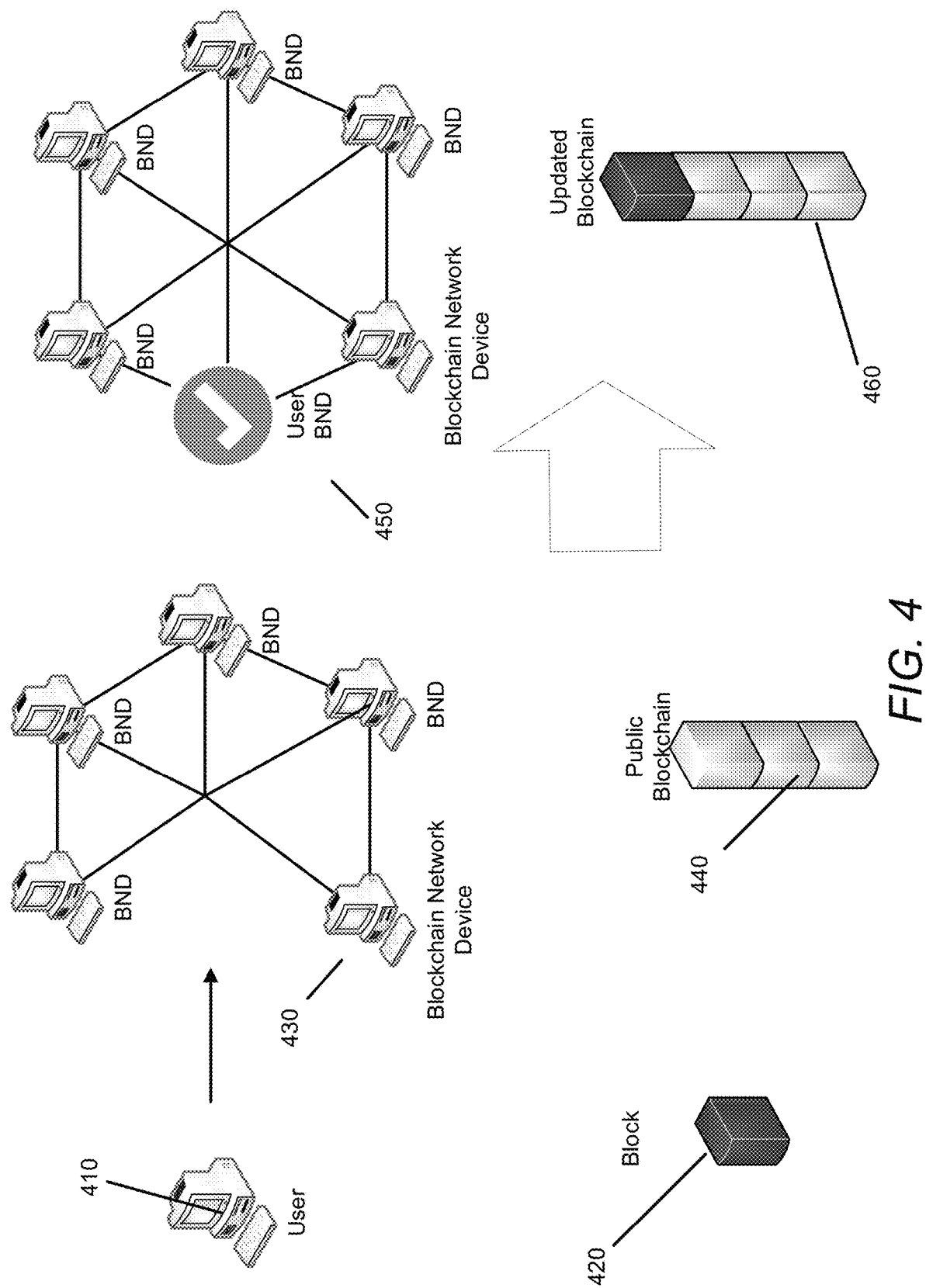
FIG. 4 is a conceptual diagram of a permissionless blockchain in accordance with an embodiment of the invention.

An implementation of a permissionless, decentralized, or public blockchain in accordance with an embodiment of the invention is illustrated in FIG. 4. In a permissionless blockchain, individual users 410 can directly participate in relevant networks and operate as blockchain network devices 430. As blockchain network devices 430, parties would have the capacity to participate in changes to the blockchain and participate in transaction verifications (via the mining mechanism). Transactions are broadcast over the computer network and data quality is maintained by massive database replication and computational trust. Despite being decentralized, an updated blockchain 460 cannot remove entries, even if anonymously made, making it immutable. In many decentralized blockchains, many blockchain network devices 430, in the decentralized system may have copies of the blockchain, allowing the ability to validate transactions. In many instances, the blockchain network device 430 can personally add transactions, in the form of blocks 420 appended to the public blockchain 440. To do so, the blockchain network device 430 would take steps to allow for the transactions to be validated 450 through various consensus mechanisms (Proof of Work, Proof of Stake, etc.). A number of consensus mechanisms in accordance with various embodiments of the invention are discussed further below.

Additionally, in the context of blockchain configurations, the term smart contract is often used to refer to software programs that run on blockchains. While a standard legal contract outlines the terms of a relationship (usually one enforceable by law), a smart contract enforces a set of rules using self-executing code within NFT platforms. As such, smart contracts may have the means to automatically enforce specific programmatic rules through platforms. Smart contracts are often developed as high-level programming abstractions that can be compiled down to bytecode. Said bytecode may be deployed to blockchains for execution by computer systems using any number of mechanisms deployed in conjunction with the blockchain. In many instances, smart contracts execute by leveraging the code of other smart contracts in a manner similar to calling upon a software library.

A number of existing decentralized blockchain technologies intentionally exclude or prevent rich media assets from existing within the blockchain, because they would need to address content that is not static (e.g., images, videos, music files). Therefore, NFT platforms in accordance with many embodiments of the invention may address this with blockchain mechanisms, that preclude general changes but account for updated content.

NFT platforms in accordance with many embodiments of the invention can therefore incorporate decentralized storage pseudo-immutable dual blockchains. In some embodiments, two or more blockchains may be interconnected such that traditional blockchain consensus algorithms support a first blockchain serving as an index to a second, or more, blockchains serving to contain and protect resources, such as the rich media content associated with NFTs.

In storing rich media using blockchain, several components may be utilized by an entity ("miner") adding transactions to said blockchain. References, such as URLs, may be stored in the blockchain to identify assets. Multiple URLs may also be stored when the asset is separated into pieces. An alternative or complementary option may be the use of APIs to return either the asset or a URL for the asset. In accordance with many embodiments of the invention, references can be stored by adding a ledger entry incorporating the reference enabling the entry to be timestamped. In doing so, the URL, which typically accounts for domain names, can be resolved to IP addresses. However, when only files of certain types are located on particular resources, or where small portions of individual assets are stored at different locations, users may require methods to locate assets stored on highly-splintered decentralized storage systems. To do so, systems may identify at least primary asset destinations and update those primary asset destinations as necessary when storage resources change. The mechanisms used to identify primary asset destinations may take a variety of forms including, but not limited to, smart contracts.

Figure 5A:
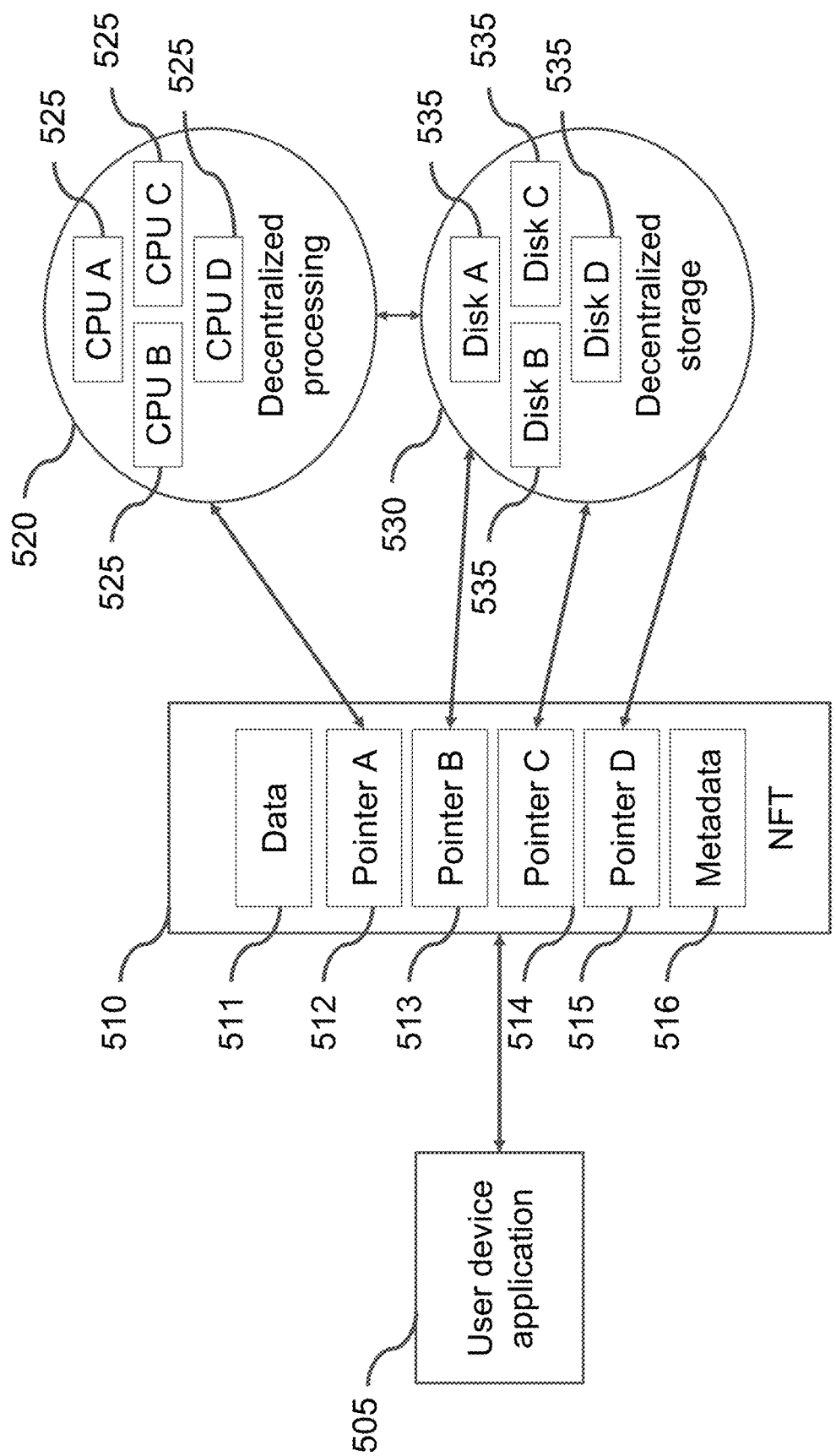
FIGS. 5A-5B are diagrams of a dual blockchain in accordance with a number of embodiments of the invention.

A dual blockchain, including decentralized processing 520 and decentralized storage 530 blockchains, in accordance with some embodiments of the invention is illustrated in FIG. 5A. Application running on devices 505, may interact with or make a request related to NFTs 510 interacting with such a blockchain. An NFT 510 in accordance with several embodiments of the invention may include many values including generalized data 511 (e.g., URLs), and pointers such as pointer A 512, pointer B 513, pointer C 514, and pointer D 515. In accordance with many embodiments of the invention, the generalized data 511 may be used to access corresponding rich media through the NFT 510. The NFT 510 may additionally have associated metadata 516.

Pointers within the NFT 510 may direct an inquiry toward a variety of on or off-ledger resources. In some embodiments of the invention, as illustrated FIG. 5A, pointer A 512 can direct the need for processing to the decentralized processing network 520. Processing systems are illustrated as CPU A, CPU B, CPU C, and CPU D 525. The CPUs 525 may be personal computers, server computers, mobile devices, edge IoT devices, etc. Pointer A may select one or more processors at random to perform the execution of a given smart contract. The code may be secure or nonsecure and the CPU may be a trusted execution environment (TEE), depending upon the needs of the request. In the example reflected in FIG. 5A, pointer B 513, pointer C 514, and pointer D 515 all point to a decentralized storage network 530 including remote off-ledger resources including storage systems illustrated as Disks A, B, C, and D 535.

The decentralized storage system may co-mingle with the decentralized processing system as the individual storage systems utilize CPU resources and connectivity to perform their function. From a functional perspective, the two decentralized systems may also be separate. Pointer B 513 may point to one or more decentralized storage networks 530 for the purposes of maintaining an off-chain log file of token activity and requests. Pointer C 514 may point to executable code within one or more decentralized storage networks 530. And Pointer D 515 may point to rights management data, security keys, and/or configuration data within one or more decentralized storage networks 530.

Figure 5B:
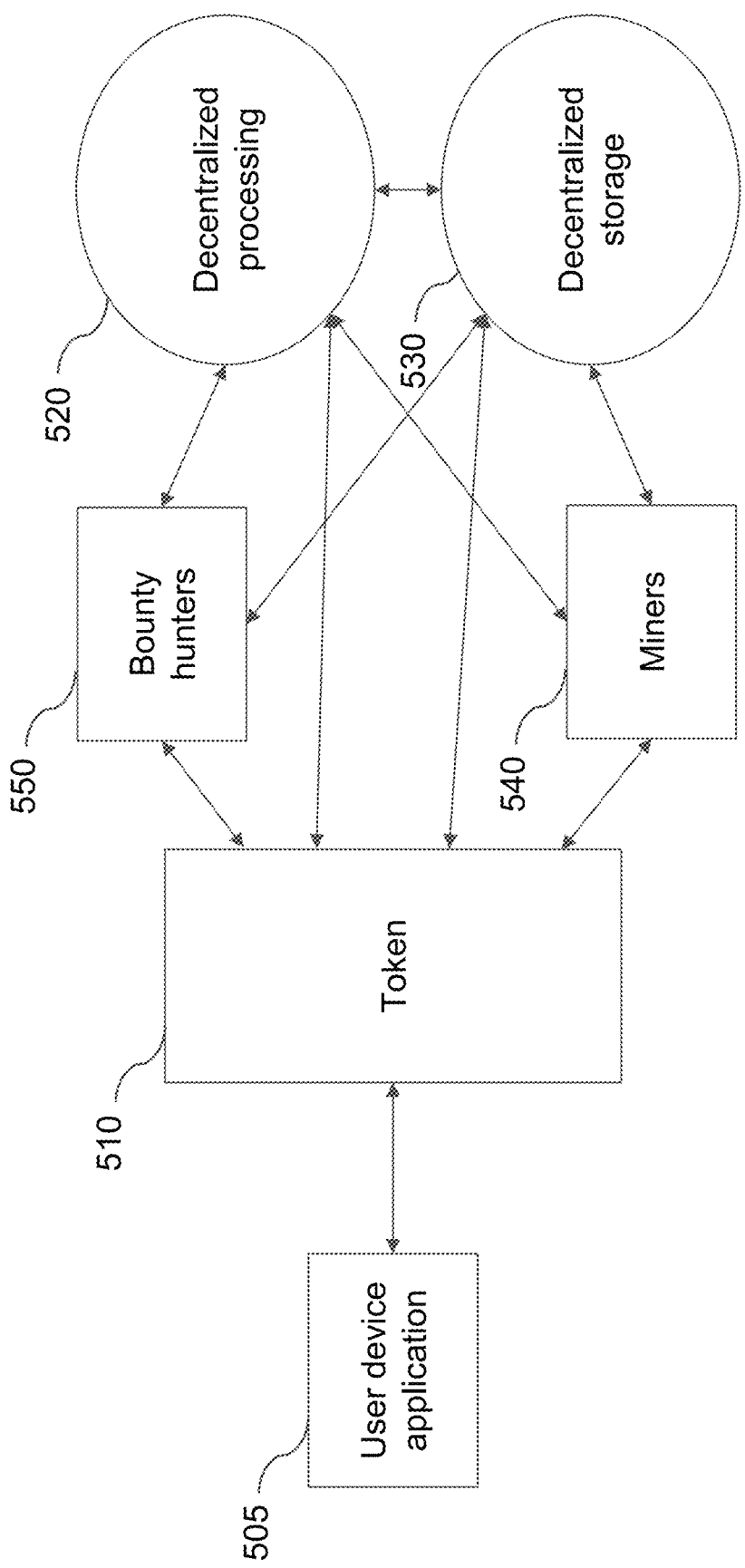

Dual blockchains may additionally incorporate methods for detection of abuse, essentially operating as a "bounty hunter" 550. FIG. 5B illustrates the inclusion of bounty hunters 550 within dual blockchain structures implemented in accordance with an embodiment of the invention. Bounty hunters 550 allow NFTs 510, which can point to networks that may include decentralized processing 520 and/or storage networks 530, to be monitored. The bounty hunter's 550 objective may be to locate incorrectly listed or missing data and executable code within the NFT 510 or associated networks. Additionally, the miner 540 can have the capacity to perform all necessary minting processes or any process within the architecture that involves a consensus mechanism.

Bounty hunters 550 may also choose to verify each step of a computation, and if they find an error, submit evidence of this in return for some reward. This can have the effect of invalidating the incorrect ledger entry and, potentially based on policies, all subsequent ledger entries. Such evidence can be submitted in a manner that is associated with a public key, in which the bounty hunter 550 proves knowledge of the error, thereby assigning value (namely the bounty) with the public key.

Assertions made by bounty hunters 550 may be provided directly to miners 540 by broadcasting the assertion. Assertions may be broadcast in a manner including, but not limited to posting it to a bulletin board. In some embodiments of the invention, assertions may be posted to ledgers of blockchains, for instance, the blockchain on which the miners 540 operate. If the evidence in question has not been submitted before, this can automatically invalidate the ledger entry that is proven wrong and provide the bounty hunter 550 with some benefit.

Applications and methods in accordance with various embodiments of the invention are not limited to use within NFT platforms. Accordingly, it should be appreciated that the capabilities of any blockchain configuration described herein can also be implemented outside the context of an NFT platform network architecture unrelated to the storage of fungible tokens and/or NFTs. A variety of components, mechanisms, and blockchain configurations that can be utilized within NFT platforms are discussed further below. Moreover, any of the blockchain configurations described herein with reference to FIGS. 3-5B (including permissioned, permissionless, and/or hybrid mechanisms) can be utilized within any of the networks implemented within the NFT platforms described above.

NFT Platform Consensus Mechanisms

NFT platforms in accordance with many embodiments of the invention can depend on consensus mechanisms to achieve agreement on network state, through proof resolution, to validate transactions. In accordance with many embodiments of the invention, Proof of Work (PoW) mechanisms may be used as a means of demonstrating non-trivial allocations of processing power. Proof of Space (PoS) mechanisms may be used as a means of demonstrating non-trivial allocations of memory or disk space. As a third possible approach, Proof of Stake mechanisms may be used as a means of demonstrating non-trivial allocations of fungible tokens and/or NFTs as a form of collateral. Numerous consensus mechanisms are possible in accordance with various embodiments of the invention, some of which are expounded on below.

Traditional mining schemes, such as Bitcoin, are based on Proof of Work, based on performing the aforementioned large computational tasks. The cost of such tasks may not only be computational effort, but also energy expenditure, a significant environmental concern. To address this problem, mining methods operating in accordance with many embodiments of the invention may instead operate using Proof of Space mechanisms to accomplish network consensus, wherein the distinguishing factor can be memory rather than processing power. Specifically, Proof of Space mechanisms can perform this through network optimization challenges. In several embodiments the network optimization challenge may be selected from any of a number of different challenges appropriate to the requirements of specific applications including graph pebbling. In some embodiments, graph pebbling may refer to a resource allocation game played on discrete mathematics graphs, ending with a labeled graph disclosing how a player might get at least one pebble to every vertex of the graph.

Figure 6:
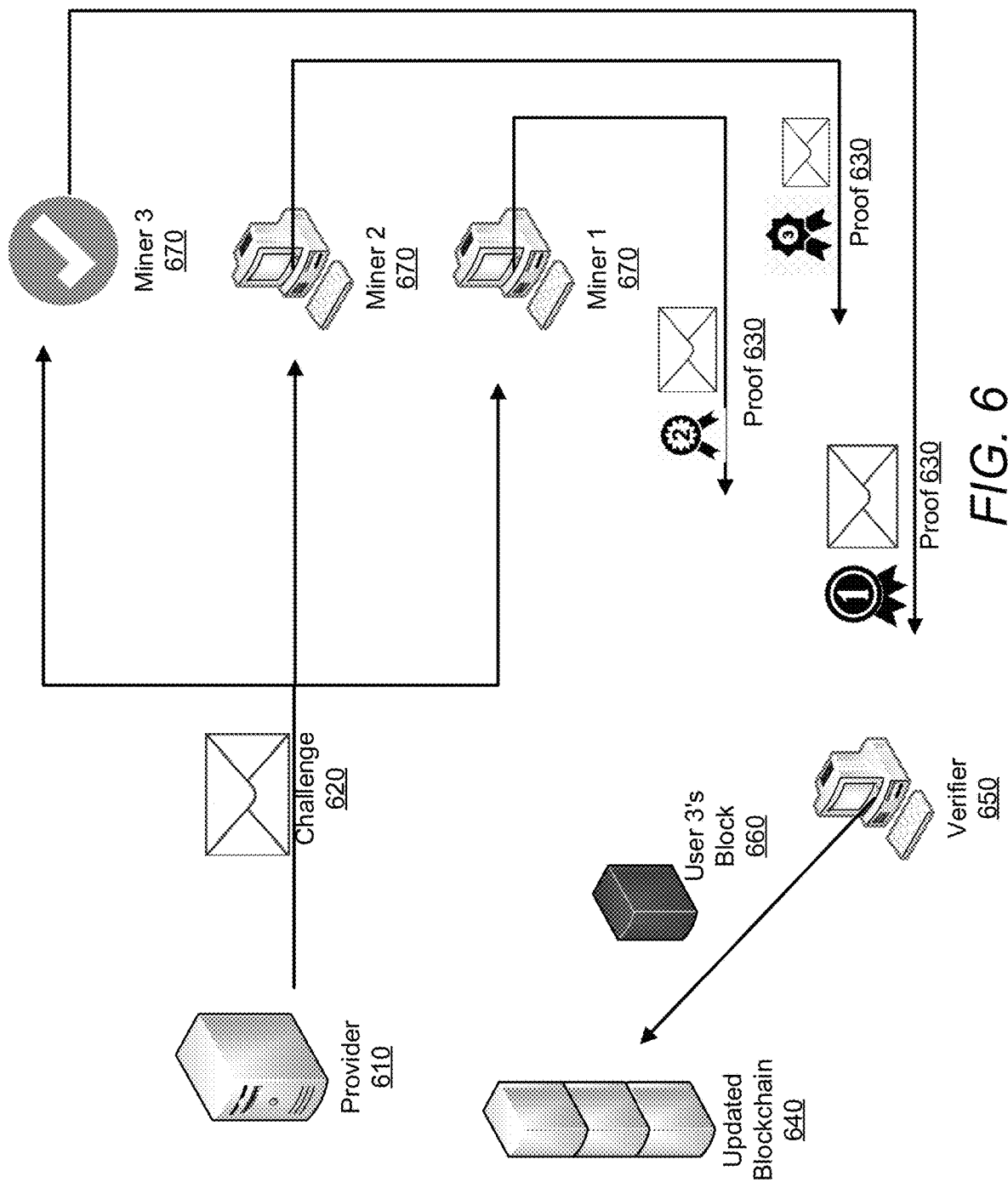
FIG. 6 conceptually illustrates a process followed by a Proof of Work consensus mechanism in accordance with an embodiment of the invention.

An example of Proof of Work consensus mechanisms that may be implemented in decentralized blockchains, in accordance with a number of embodiments of the invention, is conceptually illustrated in FIG. 6. The example disclosed in this figure is a challenge—response authentication, a protocol classification in which one party presents a complex problem ("challenge") 610 and another party must broadcast a valid answer ("proof") 620 to have clearance to add a block to the decentralized ledger that makes up the blockchain 630. As a number of miners may be competing to have this ability, there may be a need for determining factors for the addition to be added first, which in this case is processing power. Once an output is produced, verifiers 640 in the network can verify the proof, something which typically requires much less processing power, to determine the first device that would have the right to add the winning block 650 to the blockchain 630. As such, under a Proof of Work consensus mechanism, each miner involved can have a success probability proportional to the computational effort expended.

Figure 7:
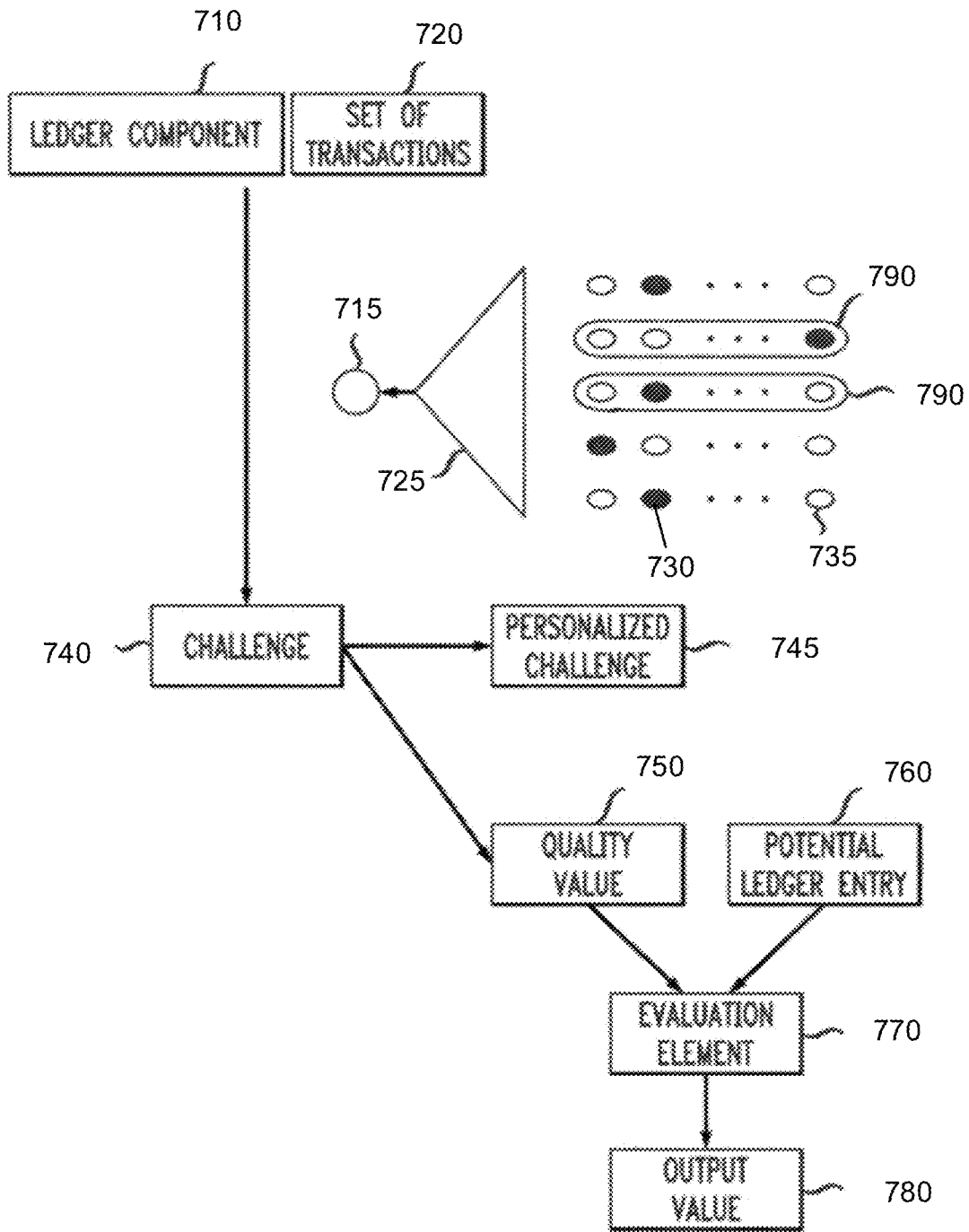
FIG. 7 conceptually illustrates a process followed by a Proof of Space consensus mechanism in accordance with an embodiment of the invention.

An example of Proof of Space implementations on devices in accordance with some embodiments of the invention is conceptually illustrated in FIG. 7. The implementation includes a ledger component 710, a set of transactions 720, and a challenge 740 computed from a portion of the ledger component 710. A representation 715 of a miner's state may also be recorded in the ledger component 710 and be publicly available.

In some embodiments, the material stored on the memory of the device includes a collection of nodes 730, 735, where nodes that depend on other nodes have values that are functions of the values of the associated nodes on which they depend. For example, functions may be one-way functions, such as cryptographic hash functions. In several embodiments the cryptographic hash function may be selected from any of a number of different cryptographic hash functions appropriate to the requirements of specific applications including (but not limited to) the SHA1 cryptographic hash function. In such an example, one node in the network may be a function of three other nodes. Moreover, the node may be computed by concatenating the values associated with these three nodes and applying the cryptographic hash function, assigning the result of the computation to the node depending on these three parent nodes. In this example, the nodes are arranged in rows, where two rows 790 are shown. The nodes are stored by the miner, and can be used to compute values at a setup time. This can be done using Merkle tree hash-based data structures 725, or another structure such as a compression function and/or a hash function.

Challenges 740 may be processed by the miner to obtain personalized challenges 745, made to the device according to the miner's storage capacity. The personalized challenge 745 can be the same or have a negligible change, but could also undergo an adjustment to account for the storage space accessible by the miner, as represented by the nodes the miner stores. For example, when the miner does not have a large amount of storage available or designated for use with the Proof of Space system, a personalized challenge 745 may adjust challenges 740 to take this into consideration, thereby making a personalized challenge 745 suitable for the miner's memory configuration.

In some embodiments, the personalized challenge 745 can indicate a selection of nodes 730, denoted in FIG. 7 by filled-in circles. In the FIG. 7 example specifically, the personalized challenge corresponds to one node per row. The collection of nodes selected as a result of computing the personalized challenge 745 can correspond to a valid potential ledger entry 760. However, here a quality value 750 (also referred to herein as a qualifying function value) can also be computed from the challenge 740, or from other public information that is preferably not under the control of any one miner.

A miner may perform matching evaluations 770 to determine whether the set of selected nodes 730 matches the quality value 750. This process can take into consideration what the memory constraints of the miner are, causing the evaluation 770 to succeed with a greater frequency for larger memory configurations than for smaller memory configurations. This can simultaneously level the playing field to make the likelihood of the evaluation 770 succeeding roughly proportional to the size of the memory used to store the nodes used by the miner. In some embodiments, non-proportional relationships may be created by modifying the function used to compute the quality value 750. When the evaluation 770 results in success, then the output value 780 may be used to confirm the suitability of the memory configuration and validate the corresponding transaction.

In many embodiments, nodes 730 and 735 can also correspond to public keys. The miner may submit valid ledger entries, corresponding to a challenge-response pair including one of these nodes. In that case, public key values can become associated with the obtained NFT. As such, miners can use a corresponding secret/private key to sign transaction requests, such as purchases. Additionally, any type of digital signature can be used in this context, such as RSA signatures, Merkle signatures, DSS signatures, etc. Further, the nodes 730 and 735 may correspond to different public keys or to the same public key, the latter preferably augmented with a counter and/or other location indicator such as a matrix position indicator, as described above. Location indicators in accordance with many embodiments of the invention may be applied to point to locations within a given ledger. In accordance with some embodiments of the invention, numerous Proof of Space consensus configurations are possible, some of which are discussed below.

Hybrid methods of evaluating Proof of Space problems can also be implemented in accordance with many embodiments of the invention. In many embodiments, hybrid methods can be utilized that conceptually correspond to modifications of Proof of Space protocols in which extra effort is expanded to increase the probability of success, or to compress the amount of space that may be applied to the challenge. Both come at a cost of computational effort, thereby allowing miners to improve their odds of winning by spending greater computational effort. Accordingly, in many embodiments of the invention dual proof-based systems may be used to reduce said computational effort. Such systems may be applied to Proof of Work and Proof of Space schemes, as well as to any other type of mining-based scheme.

When utilizing dual proofs in accordance with various embodiments of the invention, the constituent proofs may have varying structures. For example, one may be based on Proof of Work, another on Proof of Space, and a third may be a system that relies on a trusted organization for controlling the operation, as opposed to relying on mining for the closing of ledgers. Yet other proof structures can be combined in this way. The result of the combination will inherit properties of its components. In many embodiments, the hybrid mechanism may incorporate a first and a second consensus mechanism. In several embodiments, the hybrid mechanism includes a first, a second, and a third consensus mechanisms. In a number of embodiments, the hybrid mechanism includes more than three consensus mechanisms. Any of these embodiments can utilize consensus mechanisms selected from the group including (but not limited to) Proof of Work, Proof of Space, and Proof of Stake without departing from the scope of the invention. Depending on how each component system is parametrized, different aspects of the inherited properties will dominate over other aspects.

Figure 8:
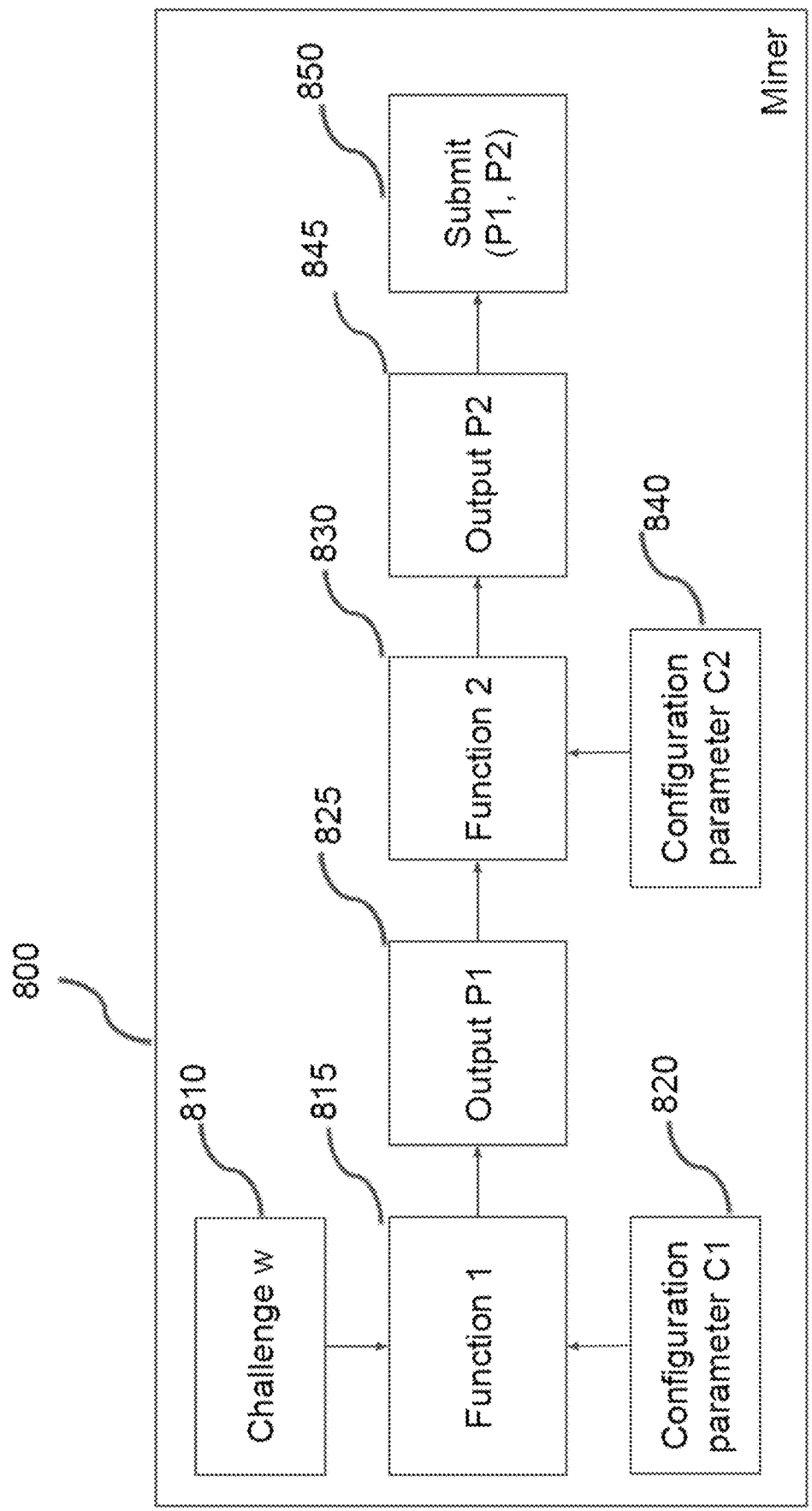
FIG. 8 illustrates a dual proof consensus mechanism configuration in accordance with an embodiment of the invention.

Dual proof configurations in accordance with a number of embodiments of the invention is illustrated in FIG. 8. A proof configuration in accordance with some embodiments of the invention may tend to use the notion of quality functions for tie-breaking among multiple competing correct proofs relative to a given challenge (w) 810. This classification of proof can be described as a qualitative proof, inclusive of proofs of work and proofs of space. In the example reflected in FIG. 8, proofs P1 and P2 are each one of a Proof of Work, Proof of Space, Proof of Stake, and/or any other proof related to a constrained resource, wherein P2 may be of a different type than P1, or may be of the same type.

Systems in accordance with many embodiments of the invention may introduce the notion of a qualifying proof, which, unlike qualitative proofs, are either valid or not valid, using no tie-breaking mechanism. Said systems may include a combination of one or more qualitative proofs and one or more qualifying proofs. For example, it may use one qualitative proof that is combined with one qualifying proof, where the qualifying proof is performed conditional on the successful creation of a qualitative proof. FIG. 8 illustrates challenge w 810, as described above, with a function 1 815, which is a qualitative function, and function 2 830, which is a qualifying function.

To stop miners from expending effort after a certain amount of effort has been spent, thereby reducing the environmental impact of mining, systems in accordance with a number of embodiments of the invention can constrain the search space for the mining effort. This can be done using a configuration parameter that controls the range of random or pseudo-random numbers that can be used in a proof. Upon challenge w 810 being issued to one or more miners 800, it can be input to Function 1 815 along with configuration parameter C1 820. Function 1 815 may output proof P1 825, in this example the qualifying proof to Function 2 830. Function 2 830 is also provided with configuration parameter C2 840 and computes qualifying proof P2 845. The miner 800 can then submit the combination of proofs (P1, P2) 850 to a verifier, in order to validate a ledger associated with challenge w 810. In some embodiments, miner 800 can also submit the proofs (P1, P2) 850 to be accessed by a 3rd-party verifier.

NFT platforms in accordance with many embodiments of the invention may additionally benefit from alternative energy-efficient consensus mechanisms. Therefore, computer systems in accordance with several embodiments of the invention may instead use consensus-based methods alongside or in place of proof-of-space and proof-of-space based mining. In particular, consensus mechanisms based instead on the existence of a Trusted Execution Environment (TEE), such as ARM TrustZone™ or Intel SGX™ may provide assurances exist of integrity by virtue of incorporating private/isolated processing environments.

Figure 9:
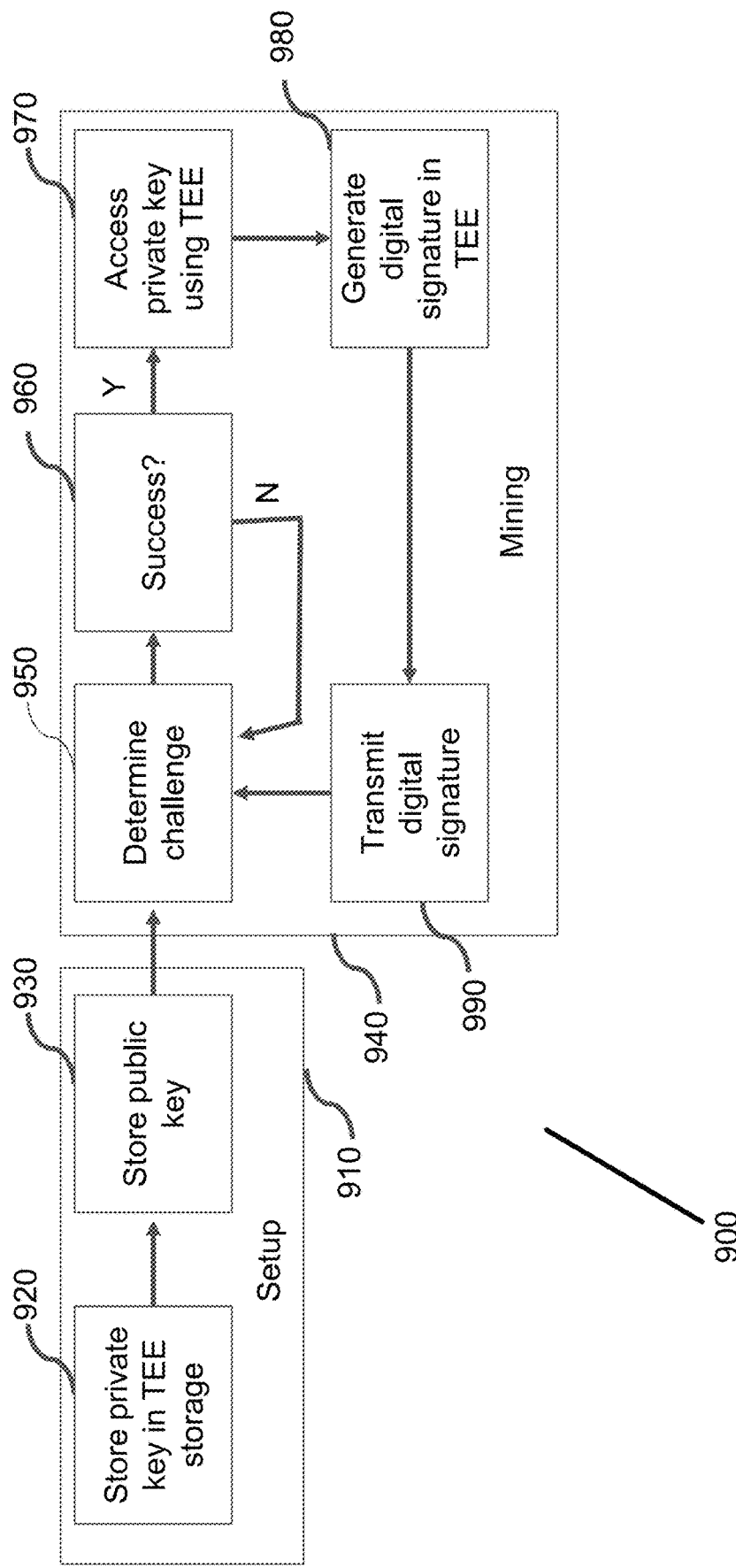
FIG. 9 illustrates a process followed by a Trusted Execution Environment-based consensus mechanism in accordance with some embodiments of the invention.

An illustration of sample process 900 undergone by TEE-based consensus mechanisms in accordance with some embodiments of the invention is depicted in FIG. 9. In some such configurations, a setup 910 may be performed by an original equipment manufacturer (OEM) or a party performing configurations of equipment provided by an OEM. Once a private key/public key pair is generated in the secure environment, process 900 may store (920) the private key in TEE storage (i.e. storage associated with the Trusted Execution Environment). While storage may be accessible from the TEE, it can be shielded from applications running outside the TEE. Additionally, processes can store (930) the public key associated with the TEE in any storage associated with the device containing the TEE. Unlike the private key, the public key may also be accessible from applications outside the TEE. In a number of embodiments, the public key may also be certified. Certification may come from OEMs or trusted entities associated with the OEMs, wherein the certificate can be stored with the public key.

In many embodiments of the invention, mining-directed steps can also be influenced by the TEE. In the illustrated embodiment, the process 900 can determine (950) a challenge. For example, this may be by computing a hash of the contents of a ledger. In doing so, process 900 may also determine whether the challenge corresponds to success 960. In some embodiments of the invention, the determination of success may result from some pre-set portion of the challenge matching a pre-set portion of the public key, e.g., the last 20 bits of the two values matching. In several embodiments the success determination mechanism may be selected from any of a number of alternate approaches appropriate to the requirements of specific applications. The matching conditions may also be modified over time. For example, modification may result from an announcement from a trusted party or based on a determination of a number of participants having reached a threshold value.

When the challenge does not correspond to a success 960, process 900 can return to determine (950) a new challenge. In this context, process 900 can determine (950) a new challenge after the ledger contents have been updated and/or a time-based observation is performed. In several embodiments the determination of a new challenge may come from any of a number of approaches appropriate to the requirements of specific applications, including, but not limited to, the observation of as a second elapsing since the last challenge. If the challenge corresponds to a success 960, then the processing can continue on to access (970) the private key using the TEE.

When the private key is accessed, process can generate (980) a digital signature using the TEE. The digital signature may be on a message that includes the challenge and/or which otherwise references the ledger entry being closed. Process 900 can also transmit (980) the digital signature to other participants implementing the consensus mechanism. In cases where multiple digital signatures are received and found to be valid, a tie-breaking mechanism can be used to evaluate the consensus. For example, one possible tie-breaking mechanism may be to select the winner as the party with the digital signature that represents the smallest numerical value when interpreted as a number. In several embodiments the tie-breaking mechanism may be selected from any of a number of alternate tie-breaking mechanisms appropriate to the requirements at specific applications.

Applications and methods in accordance with various embodiments of the invention are not limited to use within NFT platforms. Accordingly, it should be appreciated that consensus mechanisms described herein can also be implemented outside the context of an NFT platform network architecture unrelated to the storage of fungible tokens and/or NFTs. Moreover, any of the consensus mechanisms described herein with reference to FIGS. 6-9 (including Proof of Work, Proof of Space, Proof of Stake, and/or hybrid mechanisms) can be utilized within any of the blockchains implemented within the NFT platforms described above with reference to FIGS. 3-5B. Various systems and methods for implementing NFT platforms and applications in accordance with numerous embodiments of the invention are discussed further below.

NFT Platform Constituent Devices and Applications

A variety of computer systems that can be utilized within NFT platforms and systems that utilize NFT blockchains in accordance with various embodiments of the invention are illustrated below. The computer systems in accordance with many embodiments of the invention may implement a processing system 1010, 1120, 1220 using one or more CPUs, GPUs, ASICs, FPGAs, and/or any of a variety of other devices and/or combinations of devices that are typically utilized to perform digital computations. As can readily be appreciated each of these computer systems can be implemented using one or more of any of a variety of classes of computing devices including (but not limited to) mobile phone handsets, tablet computers, laptop computers, personal computers, gaming consoles, televisions, set top boxes and/or other classes of computing device.

Figure 10:
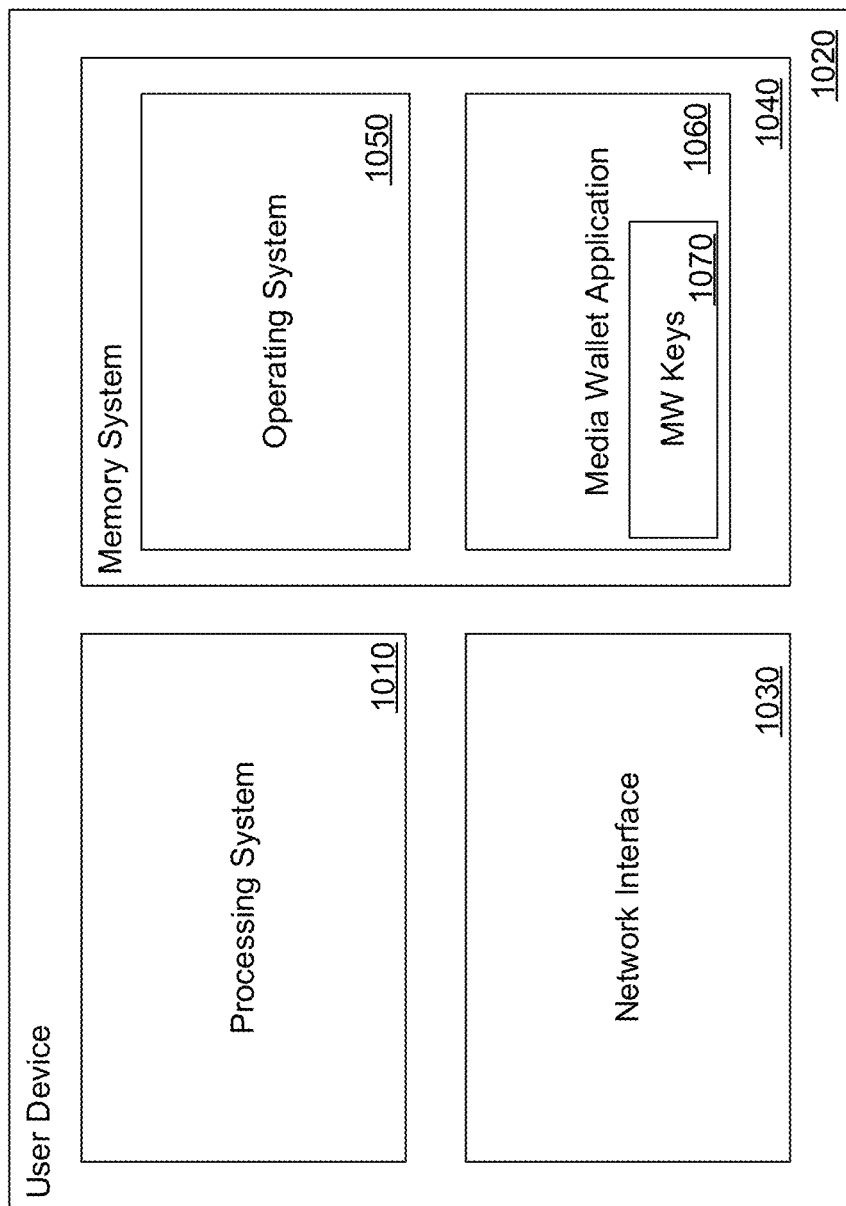
FIGS. 10-12 depicts various devices that can be utilized alongside an NFT platform in accordance with various embodiments of the invention.

A user device capable of communicating with an NFT platform in accordance with an embodiment of the invention is illustrated in FIG. 10. The memory system 1040 of particular user devices may include an operating system 1050 and media wallet applications 1060. Media wallet applications may include sets of media wallet (MW) keys 1070 that can include public key/private key pairs. The set of MW keys may be used by the media wallet application to perform a variety of actions including, but not limited to, encrypting and signing data. In many embodiments, the media wallet application enables the user device to obtain and conduct transactions with respect to NFTs by communicating with an NFT blockchain via the network interface 1030. In some embodiments, the media wallet applications are capable of enabling the purchase of NFTs using fungible tokens via at least one distributed exchange. User devices may implement some or all of the various functions described above with reference to media wallet applications as appropriate to the requirements of a given application in accordance with various embodiments of the invention.

Figure 11:
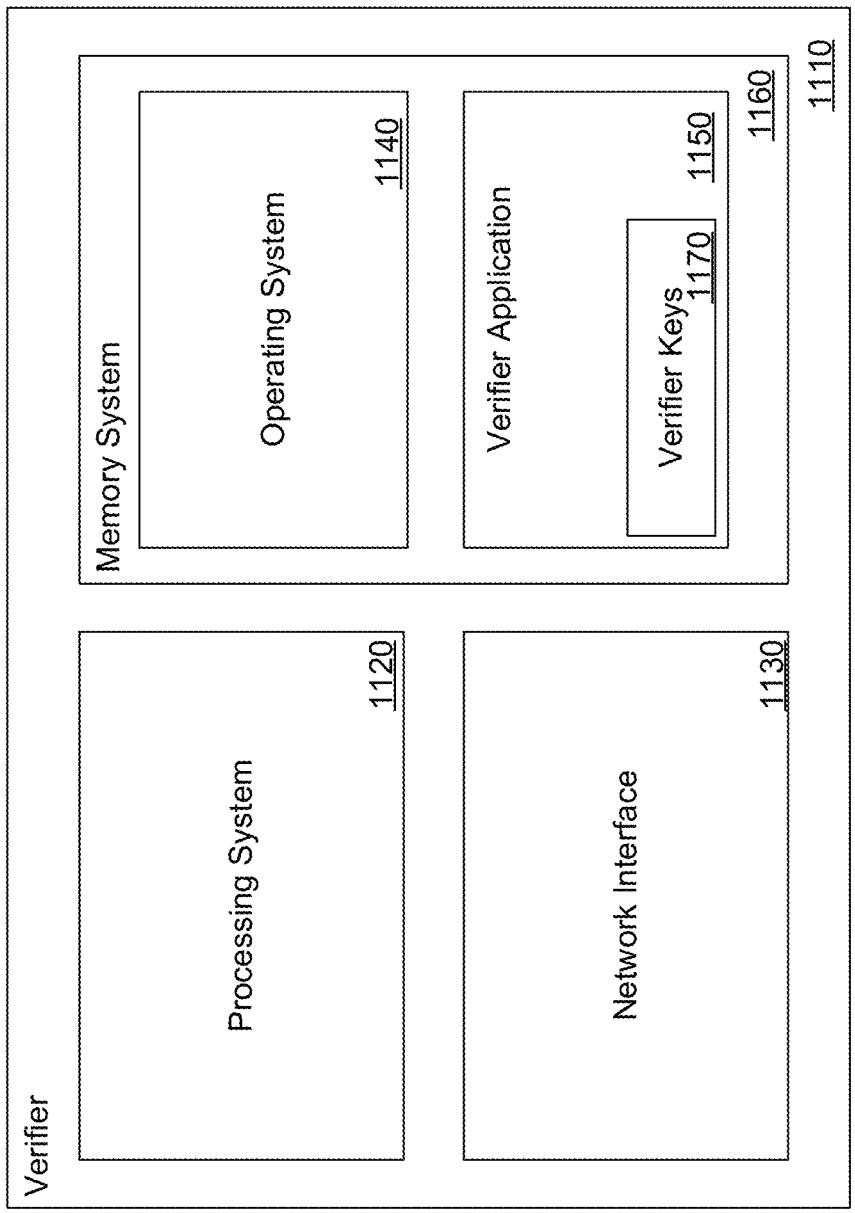

A verifier 1110 capable of verifying blockchain transactions in an NFT platform in accordance with many embodiments of the invention is illustrated in FIG. 11. The memory system 1160 of the verifier computer system includes an operating system 1140 and a verifier application 1150 that enables the verifier 1110 computer system to access a decentralized blockchain in accordance with various embodiments of the invention. Accordingly, the verifier application 1150 may utilize a set of verifier keys 1170 to affirm blockchain entries. When blockchain entries can be verified, the verifier application 1150 may transmit blocks to the corresponding blockchains. The verifier application 1150 can also implement some or all of the various functions described above with reference to verifiers as appropriate to the requirements of a given application in accordance with various embodiments of the invention.

Figure 12:
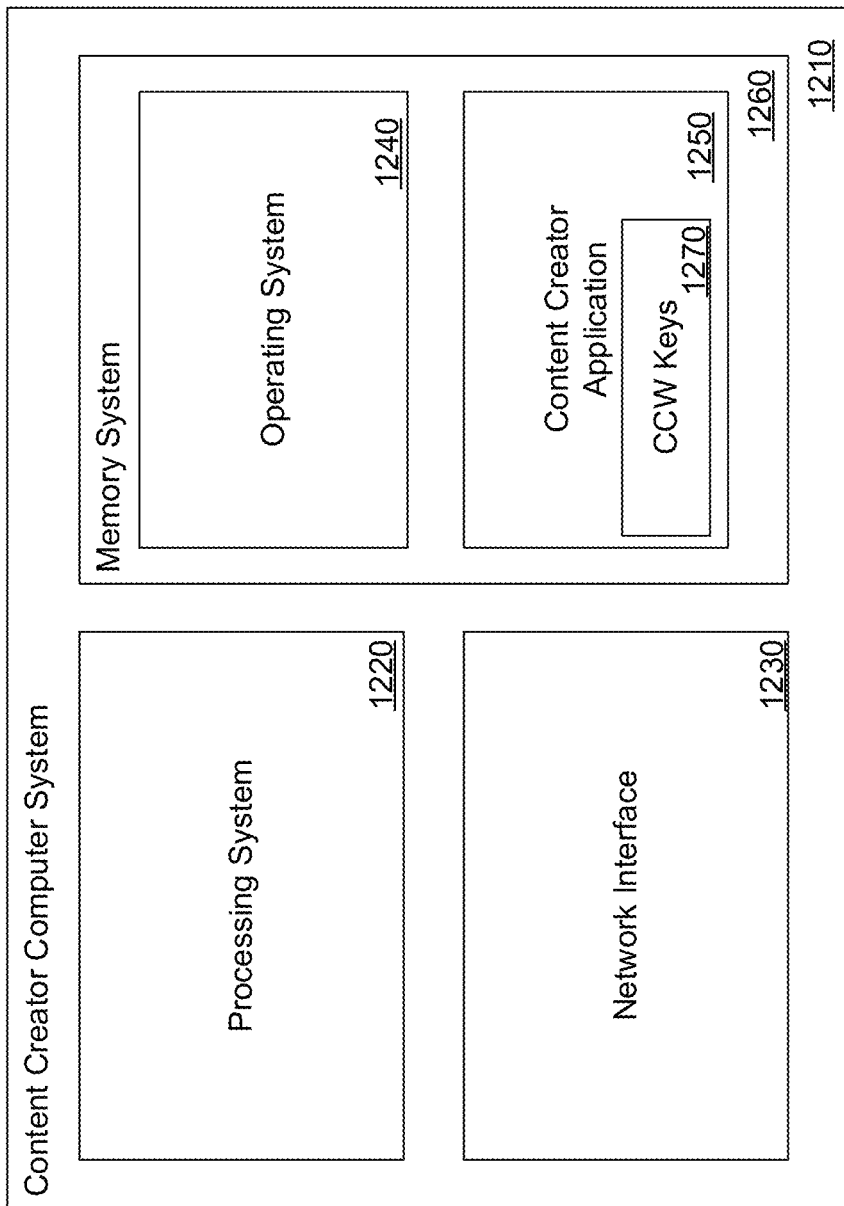

A content creator system 1210 capable of disseminating content in an NFT platform in accordance with an embodiment of the invention is illustrated in FIG. 12. The memory system 1260 of the content creator computer system may include an operating system 1240 and a content creator application 1250. The content creator application 1250 may enable the content creator computer system to mint NFTs by writing smart contracts to blockchains via the network interface 1230. The content creator application can include sets of content creator wallet (CCW) keys 1270 that can include a public key/private key pairs. Content creator applications may use these keys to sign NFTs minted by the content creator application. The content creator application can also implement some or all of the various functions described above with reference to content creators as appropriate to the requirements of a given application in accordance with various embodiments of the invention.

Computer systems in accordance with many embodiments of the invention incorporate digital wallets (herein also referred to as "wallets" or "media wallets") for NFT and/or fungible token storage. In several embodiments, the digital wallet may securely store rich media NFTs and/or other tokens. Additionally, in some embodiments, the digital wallet may display user interface through which user instructions concerning data access permissions can be received.

In a number of embodiments of the invention, digital wallets may be used to store at least one type of token-directed content. Example content types may include, but are not limited to crypto currencies of one or more sorts; non-fungible tokens; and user profile data.

Example user profile data may incorporate logs of user actions. In accordance with some embodiments of the invention, example anonymized user profile data may include redacted, encrypted, and/or otherwise obfuscated user data. User profile data in accordance with some embodiments may include, but are not limited to, information related to classifications of interests, determinations of a post-advertisement purchases, and/or characterizations of wallet contents.

Media wallets, when storing content, may store direct references to content. Media wallets may also reference content through keys to decrypt and/or access the content. Media wallets may use such keys to additionally access metadata associated with the content. Example metadata may include, but is not limited to, classifications of content. In a number of embodiments, the classification metadata may govern access rights of other parties related to the content.

Access governance rights may include, but are not limited to, whether a party can indicate their relationship with the wallet; whether they can read summary data associated with the content; whether they have access to peruse the content; whether they can place bids to purchase the content; whether they can borrow the content, and/or whether they are biometrically authenticated.

Figure 13:
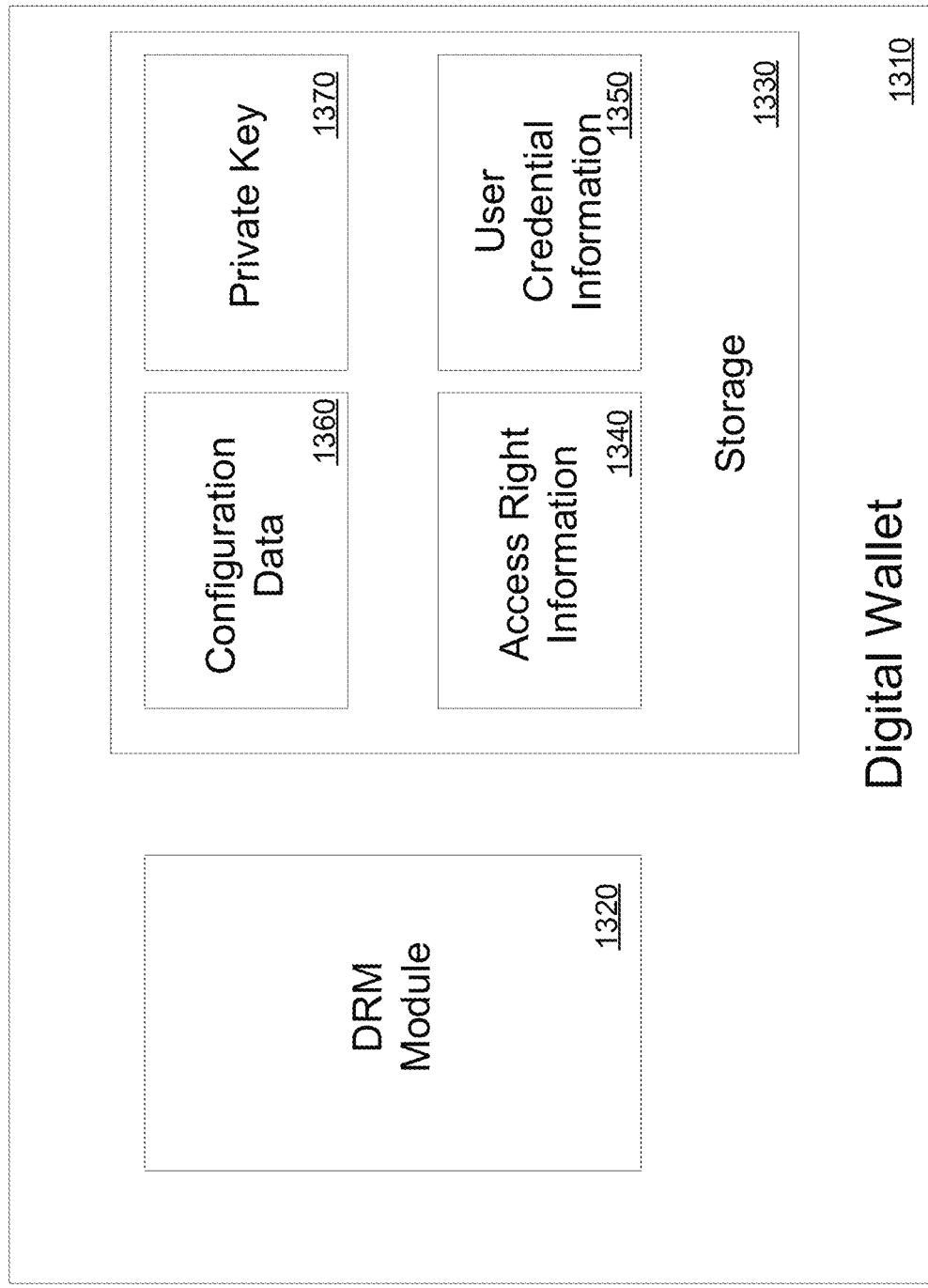
FIG. 13 depicts a media wallet application configuration in accordance with an embodiment of the invention.

An example of a media wallet 1310 capable of storing rich media NFTs in accordance with an embodiment of the invention is illustrated in FIG. 13. Media wallets 1310 may include a storage component 1330, including access right information 1340, user credential information 1350, token configuration data 1360, and/or at least one private key 1370. In accordance with many embodiments of the invention, a private key 1370 may be used to perform a plurality of actions on resources, including but not limited to decrypting NFT and/or fungible token content. Media wallets may also correspond to a public key, referred to as a wallet address. An action performed by private keys 1370 may be used to prove access rights to digital rights management modules. Additionally, private keys 1370 may be applied to initiating ownership transfers and granting NFT and/or fungible token access to alternate wallets. In accordance with some embodiments, access right information 1340 may include lists of elements that the wallet 1310 has access to. Access right information 1340 may also express the type of access provided to the wallet. Sample types of access include, but are not limited to, the right to transfer NFT and/or fungible ownership, the right to play rich media associated with a given NFT, and the right to use an NFT and/or fungible token. Different rights may be governed by different cryptographic keys. Additionally, the access right information 1340 associated with a given wallet 1310 may utilize user credential information 1350 from the party providing access.

In accordance with many embodiments of the invention, third parties initiating actions corresponding to requesting access to a given NFT may require user credential information 1350 of the party providing access to be verified. User credential information 1350 may be taken from the group including, but not limited to, a digital signature, hashed passwords, PINs, and biometric credentials. User credential information 1350 may be stored in a manner accessible only to approved devices. In accordance with some embodiments of the invention, user credential information 1350 may be encrypted using a decryption key held by trusted hardware, such as a trusted execution environment. Upon verification, user credential information 1350 may be used to authenticate wallet access.

Available access rights may be determined by digital rights management (DRM) modules 1320 of wallets 1310.

In the context of rich media, encryption may be used to secure content. As such, DRM systems may refer to technologies that control the distribution and use of keys required to decrypt and access content. DRM systems in accordance with many embodiments of the invention may require a trusted execution zone. Additionally, said systems may require one or more keys (typically a certificate containing a public key/private key pair) that can be used to communicate with and register with DRM servers. DRM modules 1320 in some embodiments may also use one or more keys to communicate with a DRM server. In several embodiments, the DRM modules 1320 may include code used for performing sensitive transactions for wallets including, but not limited to, content access. In accordance with a number of embodiments of the invention, the DRM module 1320 may execute in a Trusted Execution Environment. In a number of embodiments, the DRM may be facilitated by an Operating System (OS) that enables separation of processes and processing storage from other processes and their processing storage.

Figure 14B:
FIGS. 14A-14C depicts user interfaces of various media wallet applications in accordance with a number of embodiments of the invention.
Figure 14A:
Figure 14C:

Operation of media wallet applications implemented in accordance with some embodiments of the invention is conceptually illustrated by way of the user interfaces shown in FIGS. 14A-14C. In many embodiments, media wallet applications can refer to applications that are installed upon user devices such as (but not limited to) mobile phones and tablet computers running the iOS, Android and/or similar operating systems. Launching media wallet applications can provide a number of user interface contexts. In many embodiments, transitions between these user interface contexts can be initiated in response to gestures including (but not limited to) swipe gestures received via a touch user interface. As can readily be appreciated, the specific manner in which user interfaces operate through media wallet applications is largely dependent upon the user input capabilities of the underlying user device. In several embodiments, a first user interface context is a dashboard (see, FIGS. 14A, 14C) that can include a gallery view of NFTs owned by the user. In several embodiments, the NFT listings can be organized into category index cards. Category index cards may include, but are not limited to digital merchandise/collectibles, special event access/digital tickets, fan leaderboards. In certain embodiments, a second user interface context (see, for example, FIG. 14B) may display individual NFTs. In a number of embodiments, each NFT can be main-staged in said display with its status and relevant information shown. Users can swipe through each collectible and interacting with the user interface can launch a collectible user interface enabling greater interaction with a particular collectible in a manner that can be determined based upon the smart contract underlying the NFT.

A participant of an NFT platform may use a digital wallet to classify wallet content, including NFTs, fungible tokens, content that is not expressed as tokens such as content that has not yet been minted but for which the wallet can initiate minting, and other non-token content, including executable content, webpages, configuration data, history files and logs. This classification may be performed using a visual user interface. Users interface may enable users to create a visual partition of a space. In some embodiments of the invention, a visual partition may in turn be partitioned into sub-partitions. In some embodiments, a partition of content may separate wallet content into content that is not visible to the outside world ("invisible partition"), and content that is visible at least to some extent by the outside world ("visible partition"). Some of the wallet content may require the wallet use to have an access code such as a password or a biometric credential to access, view the existence of, or perform transactions on. A visible partition may be subdivided into two or more partitions, where the first one corresponds to content that can be seen by anybody, the second partition corresponds to content that can be seen by members of a first group, and/or the third partition corresponds to content that can be seen by members of a second group.

For example, the first group may be users with which the user has created a bond, and invited to be able to see content. The second group may be users who have a membership and/or ownership that may not be controlled by the user. An example membership may be users who own non-fungible tokens (NFTs) from a particular content creator. Content elements, through icons representing the elements, may be relocated into various partitions of the space representing the user wallet. By doing so, content elements may be associated with access rights governed by rules and policies of the given partition.

One additional type of visibility may be partial visibility. Partial visibility can correspond to a capability to access metadata associated with an item, such as an NFT and/or a quantity of crypto funds, but not carry the capacity to read the content, lend it out, or transfer ownership of it. As applied to a video NFT, an observer to a partition with partial visibility may not be able to render the video being encoded in the NFT but see a still image of it and a description indicating its source.

Similarly, a party may have access to a first anonymized profile which states that the user associated with the wallet is associated with a given demographic. The party with this access may also be able to determine that a second anonymized profile including additional data is available for purchase. This second anonymized profile may be kept in a sub-partition to which only people who pay a fee have access, thereby expressing a form of membership. Alternatively, only users that have agreed to share usage logs, aspects of usage logs or parts thereof may be allowed to access a given sub-partition. By agreeing to share usage log information with the wallet comprising the sub-partition, this wallet learns of the profiles of users accessing various forms of content, allowing the wallet to customize content, including by incorporating advertisements, and to determine what content to acquire to attract users of certain demographics.

Another type of membership may be held by advertisers who have sent promotional content to the user. These advertisers may be allowed to access a partition that stores advertisement data. Such advertisement data may be encoded in the form of anonymized profiles. In a number of embodiments, a given sub-partition may be accessible only to the advertiser to whom the advertisement data pertains. Elements describing advertisement data may be automatically placed in their associated partitions, after permission has been given by the user. This partition may either be visible to the user. Visibility may also depend on a direct request to see "system partitions." A first partition may correspond to material associated with a first set of public keys, a second partition to material associated with a second set of public keys not overlapping with the first set of public keys, wherein such material may comprise tokens such as crypto coins and NFTs. A third partition may correspond to usage data associated with the wallet user, and a fourth partition may correspond to demographic data and/or preference data associated with the wallet user. Yet other partitions may correspond to classifications of content, e.g., child-friendly vs. adult; classifications of whether associated items are for sale or not, etc.

The placing of content in a given partition may be performed by a drag-and-drop action performed on a visual interface. By selecting items and clusters and performing a drag-and-drop to another partition and/or to a sub-partition, the visual interface may allow movement including, but not limited to, one item, a cluster of items, and a multiplicity of items and clusters of items. The selection of items can be performed using a lasso approach in which items and partitions are circled as they are displayed. The selection of items may also be performed by alternative methods for selecting multiple items in a visual interface, as will be appreciated by a person of skill in the art.

Some content classifications may be automated in part or full. For example, when user place ten artifacts, such as NFTs describing in-game capabilities, in a particular partition, they may be asked if additional content that are also in-game capabilities should be automatically placed in the same partition as they are acquired and associated with the wallet. When "yes" is selected, then this placement may be automated in the future. When "yes, but confirm for each NFT" is selected, then users can be asked, for each automatically classified element, to confirm its placement. Before the user confirms, the element may remain in a queue that corresponds to not being visible to the outside world. When users decline given classifications, they may be asked whether alternative classifications should be automatically performed for such elements onwards. In some embodiments, the selection of alternative classifications may be based on manual user classification taking place subsequent to the refusal.

Automatic classification of elements may be used to perform associations with partitions and/or folders. The automatic classification may be based on machine learning (ML) techniques considering characteristics including, but not limited to, usage behaviors exhibited by the user relative to the content to be classified, labels associated with the content, usage statistics; and/or manual user classifications of related content.

Multiple views of wallets may also be accessible. One such view can correspond to the classifications described above, which indicates the actions and interactions others can perform relative to elements. Another view may correspond to a classification of content based on use, type, and/or users-specified criterion. For example, all game NFTs may be displayed in one collection view. The collection view may further subdivide the game NFTs into associations with different games or collections of games. Another collection may show all audio content, clustered based on genre. users-specified classification may be whether the content is for purposes of personal use, investment, or both. A content element may show up in multiple views. users can search the contents of his or her wallet by using search terms that result in potential matches.

Alternatively, the collection of content can be navigated based the described views of particular wallets, allowing access to content. Once a content element has been located, the content may be interacted with. For example, located content elements may be rendered. One view may be switched to another after a specific item is found. For example, this may occur through locating an item based on its genre and after the item is found, switching to the partitioned view described above. In some embodiments, wallet content may be rendered using two or more views in a simultaneous manner. They may also select items using one view.

Media wallet applications in accordance with various embodiments of the invention are not limited to use within NFT platforms. Accordingly, it should be appreciated that applications described herein can also be implemented outside the context of an NFT platform network architecture unrelated to the storage of fungible tokens and/or NFTs. Moreover, any of the computer systems described herein with reference to FIGS. 10-14C can be utilized within any of the NFT platforms described above.

NFT Platform NFT Interactions

NFT platforms in accordance with many embodiments of the invention may incorporate a wide variety of rich media NFT configurations. The term "Rich Media Non-Fungible Tokens" can be used to refer to blockchain-based cryptographic tokens created with respect to a specific piece of rich media content and which incorporate programmatically defined digital rights management. In some embodiments of the invention, each NFT may have a unique serial number and be associated with a smart contract defining an interface that enables the NFT to be managed, owned and/or traded.

Under a rich media blockchain in accordance with many embodiments of the invention, a wide variety of NFT configurations may be implemented. Some NFTs may be referred to as anchored NFTs (or anchored tokens), used to tie some element, such as a physical entity, to an identifier. Of this classification, one sub-category may be used to tie users' real-world identities and/or identifiers to a system identifier, such as a public key. In this disclosure, this type of NFT applied to identifying users, may be called a social NFT, identity NFT, identity token, and a social token. In accordance with many embodiments of the invention, an individual's personally identifiable characteristics may be contained, maintained, and managed throughout their lifetime so as to connect new information and/or NFTs to the individual's identity. A social NFT's information may include, but are not limited to, personally identifiable characteristics such as name, place and date of birth, and/or biometrics.

An example social NFT may assign a DNA print to a newborn's identity. In accordance with a number of embodiments of the invention, this first social NFT might then be used in the assignment process of a social security number NFT from the federal government. In some embodiments, the first social NFT may then be associated with some rights and capabilities, which may be expressed in other NFTs. Additional rights and capabilities may also be directly encoded in a policy of the social security number NFT.

Figure 15:
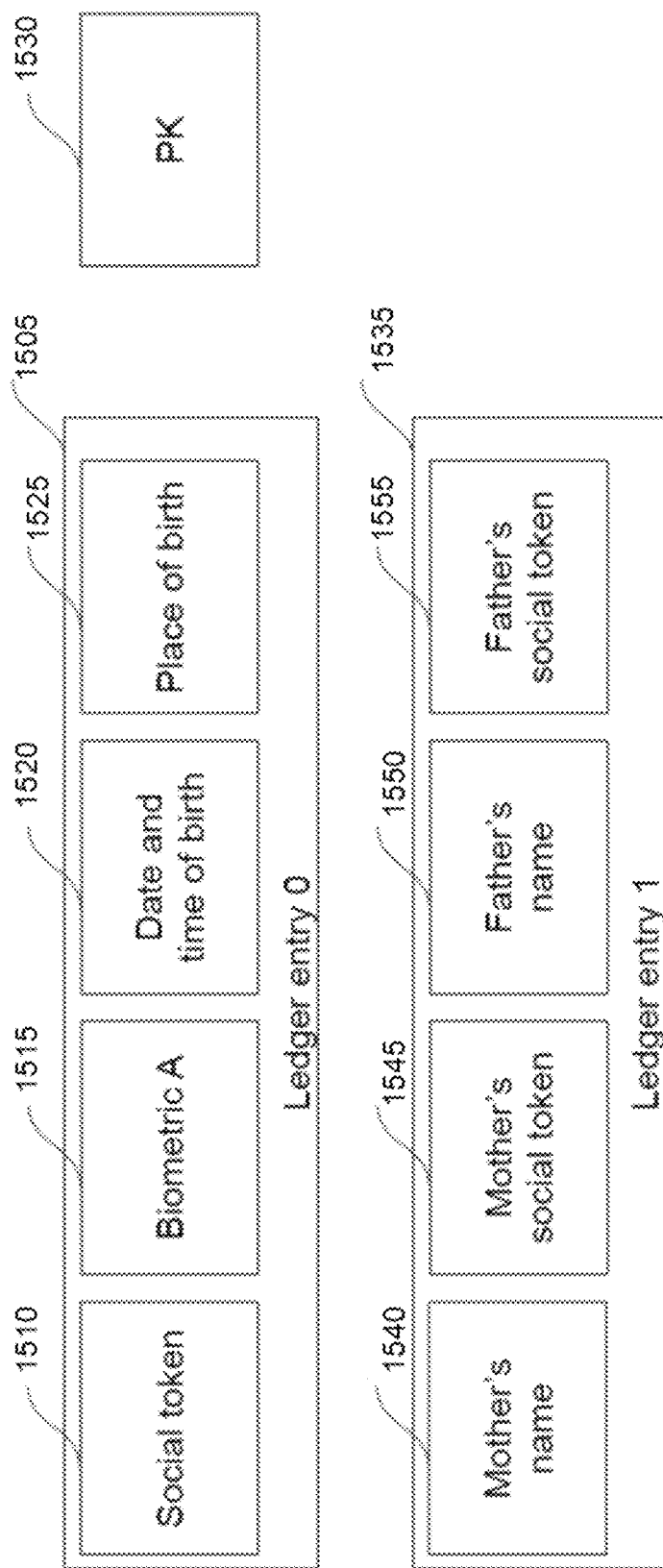
FIG. 15 illustrates an NFT ledger entry corresponding to an NFT identifier.

A social NFT may exist on a personalized branch of a centralized and/or decentralized blockchain. Ledger entries related to an individual's social NFT in accordance with several embodiments of the invention are depicted in FIG. 15. Ledger entries of this type may be used to build an immutable identity foundation whereby biometrics, birth and parental information are associated with an NFT. As such, this information may also be protected with encryption using a private key 1530. The initial entry in a ledger, "ledger entry 0" 1505, may represent a social token 1510 assignment to an individual with a biometric "A" 1515. In this embodiment, the biometric may include but is not limited to a footprint, a DNA print, and a fingerprint. The greater record may also include the individual's date and time of birth 1520 and place of birth 1525. A subsequent ledger entry 1 1535 may append parental information including but not limited to mothers' name 1540, mother's social token 1545, father's name 1550, and father's social token 1555.

In a number of embodiments, the various components that make up a social NFT may vary from situation to situation. In a number of embodiments, biometrics and/or parental information may be unavailable in a given situation and/or period of time. Other information including, but not limited to, race, gender, and governmental number assignments such as social security numbers, may be desirable to include in the ledger. In a blockchain, future NFT creation may create a life-long ledger record of an individual's public and private activities. In accordance with some embodiments, the record may be associated with information including, but not limited to, identity, purchases, health and medical records, access NFTs, family records such as future offspring, marriages, familial history, photographs, videos, tax filings, and/or patent filings. The management and/or maintenance of an individual's biometrics throughout the individual's life may be immutably connected to the first social NFT given the use of a decentralized blockchain ledger.

In some embodiments, a certifying third party may generate an NFT associated with certain rights upon the occurrence of a specific event. In one such embodiment, the DMV may be the certifying party and generate an NFT associated with the right to drive a car upon issuing a traditional driver's license. In another embodiment, the certifying third party may be a bank that verifies a person's identity papers and generates an NFT in response to a successful verification. In a third embodiment, the certifying party may be a car manufacturer, who generates an NFT and associates it with the purchase and/or lease of a car.

In many embodiments, a rule may specify what types of policies the certifying party may associate with the NFT. Additionally, a non-certified entity may also generate an NFT and assert its validity. This may require putting up some form of security. In one example, security may come in the form of a conditional payment associated with the NFT generated by the non-certified entity. In this case, the conditional payment may be exchangeable for funds if abuse can be detected by a bounty hunter and/or some alternate entity. Non-certified entities may also relate to a publicly accessible reputation record describing the non-certified entity's reputability.

Anchored NFTs may additionally be applied to automatic enforcement of programming rules in resource transfers. NFTs of this type may be referred to as promise NFTs. A promise NFT may include an agreement expressed in a machine-readable form and/or in a human-accessible form. In a number of embodiments, the machine-readable and human-readable elements can be generated one from the other. In some embodiments, an agreement in a machine-readable form may include, but is not limited to, a policy and/or an executable script. In some embodiments, an agreement in a human-readable form may include, but is not limited to, a text and/or voice-based statement of the promise.

In some embodiments, regardless of whether the machine-readable and human-readable elements are generated from each other, one can be verified based on the other. Smart contracts including both machine-readable statements and human-accessible statements may also be used outside the implementation of promise NFTs. Moreover, promise NFTs may be used outside actions taken by individual NFTs and/or NFT-owners. In some embodiments, promise NFTs may relate to general conditions, and may be used as part of a marketplace.

In one such example, horse betting may be performed through generating a first promise NFT that offers a payment of $10 if a horse does not win. Payment may occur under the condition that the first promise NFT is matched with a second promise NFT that causes a transfer of funds to a public key specified with the first promise NFT if horse X wins.

A promise NFT may be associated with actions that cause the execution of a policy and/or rule indicated by the promise NFT. In some embodiments of the invention, a promise of paying a charity may be associated with the sharing of an NFT. In this embodiment, the associated promise NFT may identify a situation that satisfies the rule associated with the promise NFT, thereby causing the transfer of funds when the condition is satisfied (as described above). One method of implementation may be embedding in and/or associating a conditional payment with the promise NFT. A conditional payment NFT may induce a contract causing the transfer of funds by performing a match. In some such methods, the match may be between the promise NFT and inputs that identify that the conditions are satisfied, where said input can take the form of another NFT. In a number of embodiments, one or more NFTs may also relate to investment opportunities.

For example, a first NFT may represent a deed to a first building, and a second NFT a deed to a second building. Moreover, the deed represented by the first NFT may indicate that a first party owns the first property. The deed represented by the second NFT may indicate that a second party owns the second property. A third NFT may represent one or more valuations of the first building. The third NFT may in turn be associated with a fourth NFT that may represent credentials of a party performing such a valuation. A fifth NFT may represent one or more valuations of the second building. A sixth may represent the credentials of one of the parties performing a valuation. The fourth and sixth NFTs may be associated with one or more insurance policies, asserting that if the parties performing the valuation are mistaken beyond a specified error tolerance, then the insurer would pay up to a specified amount.

A seventh NFT may then represent a contract that relates to the planned acquisition of the second building by the first party, from the second party, at a specified price. The seventh NFT may make the contract conditional provided a sufficient investment and/or verification by a third party. A third party may evaluate the contract of the seventh NFT, and determine whether the terms are reasonable. After the evaluation, the third party may then verify the other NFTs to ensure that the terms stated in the contract of the seventh NFT agree. If the third party determines that the contract exceeds a threshold in terms of value to risk, as assessed in the seventh NFT, then executable elements of the seventh NFT may cause transfers of funds to an escrow party specified in the contract of the sixth NFT.

Alternatively, the first party may initiate the commitment of funds, conditional on the remaining funds being raised within a specified time interval. The commitment of funds may occur through posting the commitment to a ledger. Committing funds may produce smart contracts that are conditional on other events, namely the payments needed to complete the real estate transaction. The smart contract also may have one or more additional conditions associated with it. For example, an additional condition may be the reversal of the payment if, after a specified amount of time, the other funds have not been raised. Another condition may be related to the satisfactory completion of an inspection and/or additional valuation.

NFTs may also be used to assert ownership of virtual property. Virtual property in this instance may include, but is not limited to, rights associated with an NFT, rights associated with patents, and rights associated with pending patents. In a number of embodiments, the entities involved in property ownership may be engaged in fractional ownership. In some such embodiments, two parties may wish to purchase an expensive work of digital artwork represented by an NFT. The parties can enter into smart contracts to fund and purchase valuable works. After a purchase, an additional NFT may represent each party's contribution to the purchase and equivalent fractional share of ownership.

Another type of NFTs that may relate to anchored NFTs may be called "relative NFTs." This may refer to NFTs that relate two or more NFTs to each other. Relative NFTs associated with social NFTs may include digital signatures that is verified using a public key of a specific social NFT. In some embodiments, an example of a relative NFT may be an assertion of presence in a specific location, by a person corresponding to the social NFT. This type of relative NFT may also be referred to as a location NFT and a presence NFT. Conversely, a signature verified using a public key embedded in a location NFT may be used as proof that an entity sensed by the location NFT is present. Relative NFTs are derived from other NFTs, namely those they relate to, and therefore may also be referred to as derived NFTs. An anchored NFT may tie to another NFT, which may make it both anchored and relative. An example of such may be called pseudonym NFTs.

Pseudonym NFTs may be a kind of relative NFT acting as a pseudonym identifier associated with a given social NFT. In some embodiments, pseudonym NFTs may, after a limited time and/or a limited number of transactions, be replaced by a newly derived NFTs expressing new pseudonym identifiers. This may disassociate users from a series of recorded events, each one of which may be associated with different pseudonym identifiers. A pseudonym NFT may include an identifier that is accessible to biometric verification NFTs. Biometric verification NFTs may be associated with a TEE and/or DRM which is associated with one or more biometric sensors. Pseudonym NFTs may be output by social NFTs and/or pseudonym NFTs.

Inheritance NFTs may be another form of relative NFTs, that transfers rights associated with a first NFT to a second NFT. For example, computers, represented by an anchored NFT that is related to a physical entity (the hardware), may have access rights to WiFi networks. When computers are replaced with newer models, users may want to maintain all old relationships, for the new computer. For example, users may want to retain WiFi hotspots. For this to be facilitated, a new computer can be represented by an inheritance NFT, inheriting rights from the anchored NFT related to the old computer. An inheritance NFT may acquire some or all pre-existing rights associated with the NFT of the old computer, and associate those with the NFT associated with the new computer.

More generally, multiple inheritance NFTs can be used to selectively transfer rights associated with one NFT to one or more NFTs, where such NFTs may correspond to users, devices, and/or other entities, when such assignments of rights are applicable. Inheritance NFTs can also be used to transfer property. One way to implement the transfer of property can be to create digital signatures using private keys. These private keys may be associated with NFTs associated with the rights. In accordance with a number of embodiments, transfer information may include the assignment of included rights, under what conditions the transfer may happen, and to what NFT(s) the transfer may happen. In this transfer, the assigned NFTs may be represented by identifies unique to these, such as public keys. The digital signature and message may then be in the form of an inheritance NFT, or part of an inheritance NFT. As rights are assigned, they may be transferred away from previous owners to new owners through respective NFTs. Access to financial resources is one such example.

However, sometimes rights may be assigned to new parties without taking the same rights away from the party (i.e., NFT) from which the rights come. One example of this may be the right to listen to a song, when a license to the song is sold by the artist to consumers. However, if the seller sells exclusive rights, this causes the seller not to have the rights anymore.

In accordance with many embodiments of the invention, multiple alternative NFT configurations may be implemented. One classification of NFT may be an employee NFT or employee token. Employee NFTs may be used by entities including, but not limited to, business employees, students, and organization members. Employee NFTs may operate in a manner analogous to key card photo identifications. In a number of embodiments, employee NFTs may reference information including, but not limited to, company information, employee identity information and/or individual identity NFTs.

Additionally, employee NFTs may include associated access NFT information including but not limited to, what portions of a building employees may access, and what computer system employees may utilize. In several embodiments, employee NFTs may incorporate their owner's biometrics, such as a face image. In a number of embodiments, employee NFTs may operate as a form of promise NFT. In some embodiments, employee NFT may comprise policies or rules of employing organization. In a number of embodiments, the employee NFT may reference a collection of other NFTs.

Another type of NFT may be referred to as the promotional NFT or promotional token. Promotional NFTs may be used to provide verification that promoters provide promotion winners with promised goods. In some embodiments, promotional NFTs may operate through decentralized applications for which access restricted to those using an identity NFT. The use of a smart contract with a promotional NFT may be used to allow for a verifiable release of winnings. These winnings may include, but are not limited to, cryptocurrency, money, and gift card NFTs useful to purchase specified goods. Smart contracts used alongside promotional NFTs may be constructed for winners selected through random number generation.

Another type of NFT may be called the script NFT or script token. Script tokens may incorporate script elements including, but not limited to, story scripts, plotlines, scene details, image elements, avatar models, sound profiles, and voice data for avatars. Script tokens may also utilize rules and policies that describe how script elements are combined. Script tokens may also include rightsholder information, including but not limited to, licensing and copyright information. Executable elements of script tokens may include instructions for how to process inputs; how to configure other elements associated with the script tokens; and how to process information from other tokens used in combination with script tokens.

Script tokens may be applied to generate presentations of information. In accordance with some embodiments, these presentations may be developed on devices including but not limited to traditional computers, mobile computers, and virtual reality display devices. Script tokens may be used to provide the content for game avatars, digital assistant avatars, and/or instructor avatars. Script tokens may comprise audio-visual information describing how input text is presented, along with the input text that provides the material to be presented. It may also comprise what may be thought of as the personality of the avatar, including how the avatar may react to various types of input from an associated user.

In some embodiments, script NFTs may be applied to govern behavior within an organization. For example, this may be done through digital signatures asserting the provenance of the scripts. Script NFTs may also, in full and/or in part, be generated by freelancers. For example, a text script related to a movie, an interactive experience, a tutorial, and/or other material, may be created by an individual content creator. This information may then be combined with a voice model or avatar model created by an established content producer. The information may then be combined with a background created by additional parties. Various content producers can generate parts of the content, allowing for large-scale content collaboration.

Features of other NFTs can be incorporated in a new NFT using techniques related to inheritance NFTs, and/or by making references to other NFTs. As script NFTs may consist of multiple elements, creators with special skills related to one particular element may generate and combine elements. This may be used to democratize not only the writing of storylines for content, but also outsourcing for content production. For each such element, an identifier establishing the origin or provenance of the element may be included. Policy elements can also be incorporated that identify the conditions under which a given script element may be used. Conditions may be related to, but are not limited to execution environments, trusts, licenses, logging, financial terms for use, and various requirements for the script NFTs. Requirements may concern, but are not limited to, what other types of elements the given element are compatible with, what is allowed to be combined with according the terms of service, and/or local copyright laws that must be obeyed.

Evaluation units may be used with various NFT classifications to collect information on their use. Evaluation units may take a graph representing subsets of existing NFTs and make inferences from the observed graph component. From this, valuable insights into NFT value may be derived. For example, evaluation units may be used to identify NFTs whose popularity is increasing or waning. In that context, popularity may be expressed as, but not limited to, the number of derivations of the NFT that are made; the number of renderings, executions or other uses are made; and the total revenue that is generated to one or more parties based on renderings, executions or other uses.

Evaluation units may make their determination through specific windows of time and/or specific collections of end-users associated with the consumption of NFT data in the NFTs. Evaluation units may limit assessments to specific NFTs (e.g., script NFTs). This may be applied to identify NFTs that are likely to be of interest to various users. In addition, the system may use rule-based approaches to identify NFTs of importance, wherein importance may be ascribed to, but is not limited to, the origination of the NFTs, the use of the NFTs, the velocity of content creation of identified clusters or classes, the actions taken by consumers of NFT, including reuse of NFTs, the lack of reuse of NFTs, and the increased or decreased use of NFTs in selected social networks.

Evaluations may be repurposed through recommendation mechanisms for individual content consumers and/or as content originators. Another example may address the identification of potential combination opportunities, by allowing ranking based on compatibility. Accordingly, content creators such as artists, musicians and programmers can identify how to make their content more desirable to intended target groups.

The generation of evaluations can be supported by methods including, but not limited to machine learning (ML) methods, artificial intelligence (AI) methods, and/or statistical methods. Anomaly detection methods developed to identify fraud can be repurposed to identify outliers. This can be done to flag abuse risks or to improve the evaluation effort.

Multiple competing evaluation units can make competing predictions using alternative and proprietary algorithms. Thus, different evaluation units may be created to identify different types of events to different types of subscribers, monetizing their insights related to the data they access.

In a number of embodiments, evaluation units may be a form of NFTs that derive insights from massive amounts of input data. Input data may correspond, but is not limited to the graph component being analyzed. Such NFTs may be referred to as evaluation unit NFTs.

The minting of NFTs may associate rights with first owners and/or with an optional one or more policies and protection modes. An example policy and/or protection mode directed to financial information may express royalty requirements. An example policy and/or protection mode directed to non-financial requirements may express restrictions on access and/or reproduction. An example policy directed to data collection may express listings of user information that may be collected and disseminated to other participants of the NFT platform.

Figure 16A:
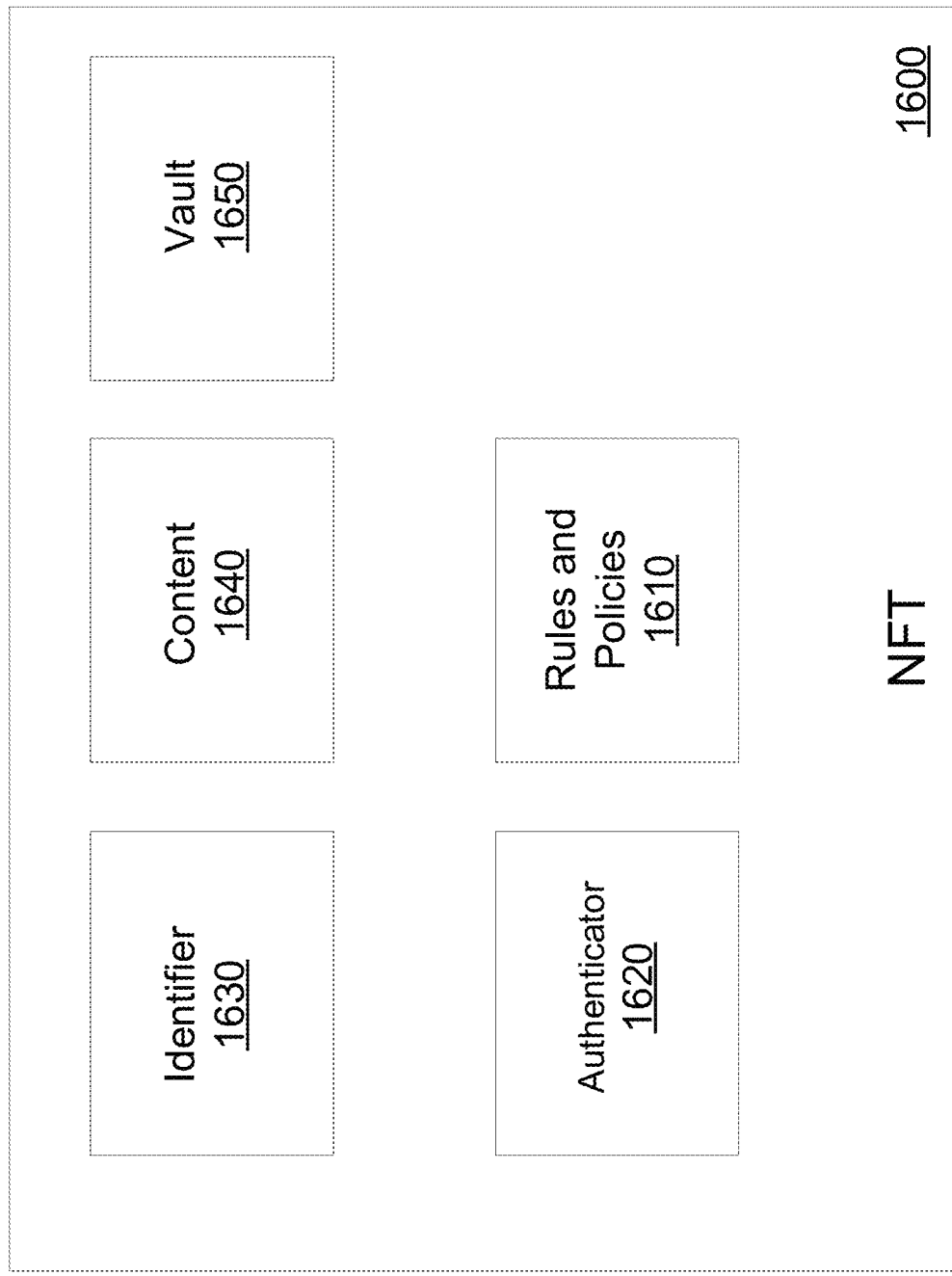
FIGS. 16A-16B illustrate an NFT arrangement relationship with corresponding physical content in accordance with an embodiment of the invention.
Figure 16B:
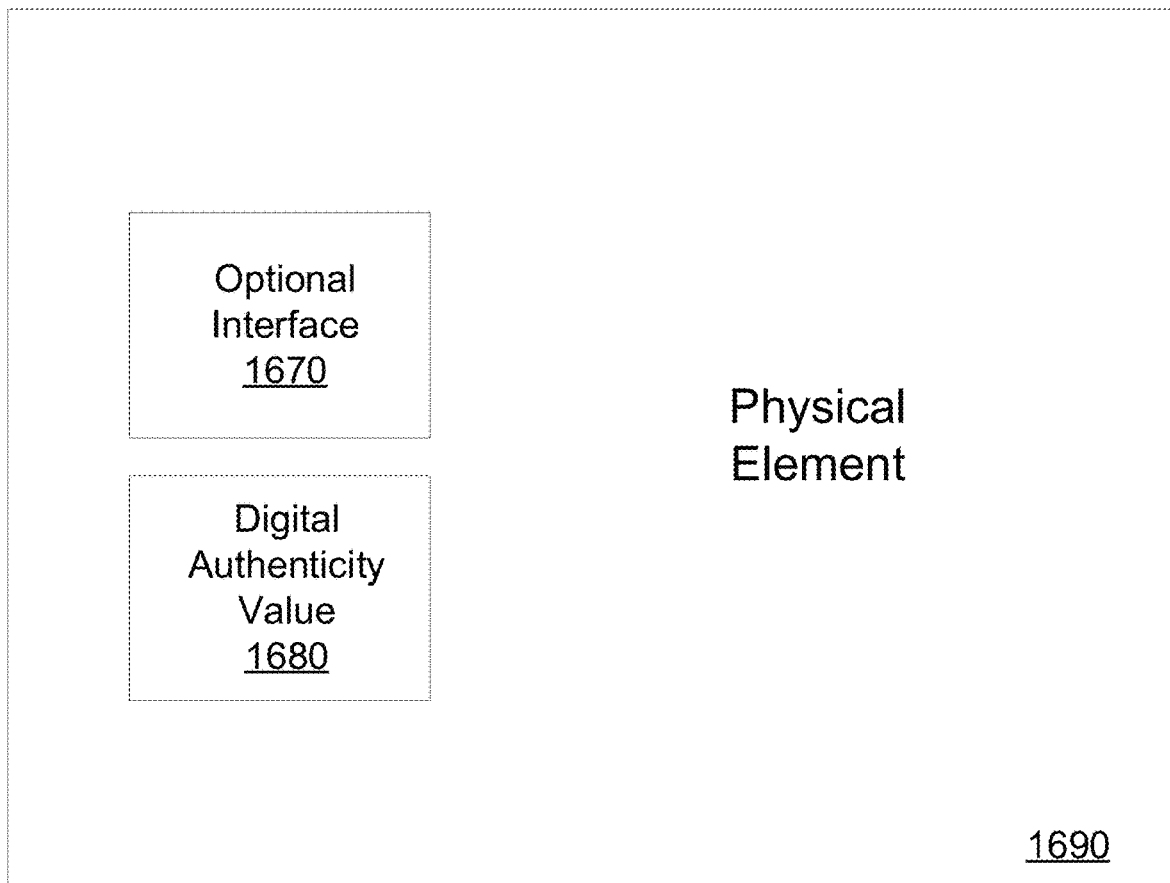

An example NFT which may be associated with specific content in accordance with several embodiments of the invention is illustrated in FIG. 16. In some embodiments, an NFT 1600 may utilize a vault 1650, which may control access to external data storage areas. Methods of controlling access may include, but are not limited to, user credential information 1350. In accordance with a number of embodiments of the invention, control access may be managed through encrypting content 1640. As such, NFTs 1600 can incorporate content 1640, which may be encrypted, not encrypted, yet otherwise accessible, or encrypted in part. In accordance with some embodiments, an NFT 1600 may be associated with one or more content 1640 elements, which may be contained in or referenced by the NFT. A content 1640 element may include, but is not limited to, an image, an audio file, a script, a biometric user identifier, and/or data derived from an alternative source. An example alternative source may be a hash of biometric information). An NFT 1600 may also include an authenticator 1620 capable of affirming that specific NFTs are valid.

In accordance with many embodiments of the invention, NFTs may include a number of rules and policies 1610. Rules and policies 1610 may include, but are not limited to access rights information 1340. In some embodiments, rules and policies 1610 may also state terms of usage, royalty requirements, and/or transfer restrictions. An NFT 1600 may also include an identifier 1630 to affirm ownership status. In accordance with many embodiments of the invention, ownership status may be expressed by linking the identifier 1630 to an address associated with a blockchain entry.

In accordance with a number of embodiments of the invention, NFTs may represent static creative content. NFTs may also be representative of dynamic creative content, which changes over time. In accordance with many examples of the invention, the content associated with an NFT may be a digital content element.

One example of a digital content element in accordance with some embodiments may be a set of five images of a mouse. In this example, the first image may be an image of the mouse being alive. The second may be an image of the mouse eating poison. The third may be an image of the mouse not feeling well. The fourth image may be of the mouse, dead. The fifth image may be of a decaying mouse.

The user credential information 1350 of an NFT may associate each image to an identity, such as of the artist. In accordance with a number of embodiments of the invention, NFT digital content can correspond to transitions from one representation (e.g., an image of the mouse, being alive) to another representation (e.g., of the mouse eating poison). In this disclosure, digital content transitioning from one representation to another may be referred to as a state change and/or an evolution. In a number of embodiments, an evolution may be triggered by the artist, by an event associated with the owner of the artwork, randomly, and/or by an external event.

When NFTs representing digital content are acquired in accordance with some embodiments of the invention, they may also be associated with the transfer of corresponding physical artwork, and/or the rights to said artwork. The first ownership records for NFTs may correspond to when the NFT was minted, at which time its ownership can be assigned to the content creator. Additionally, in the case of "lazy" minting, rights may be directly assigned to a buyer.

In some embodiments, as a piece of digital content evolves, it may also change its representation. The change in NFTs may also send a signal to an owner after it has evolved. In doing so, a signal may indicate that the owner has the right to acquire the physical content corresponding to the new state of the digital content. Under an earlier example, buying a live mouse artwork, as an NFT, may also carry the corresponding painting, and/or the rights to it. A physical embodiment of an artwork that corresponds to that same NFT may also be able to replace the physical artwork when the digital content of the NFT evolves. For example, should the live mouse artwork NFT change states to a decaying mouse, an exchange may be performed of the corresponding painting for a painting of a decaying mouse.

The validity of one of the elements, such as the physical element, can be governed by conditions related to an item with which it is associated. For example, a physical painting may have a digital authenticity value that attests to the identity of the content creator associated with the physical painting.

An example of a physical element 1690 corresponding to an NFT, in accordance with some embodiments of the invention is illustrated in FIG. 16. A physical element 1690 may be a physical artwork including, but not limited to, a drawing, a statue, and/or another physical representation of art. In a number of embodiments, physical representations of the content (which may correspond to a series of paintings) may each be embedded with a digital authenticity value (or a validator value) value. In accordance with many embodiments of the invention, a digital authenticity value (DAV) 1680 may be therefore be associated with a physical element 1690 and a digital element. A digital authenticity value may be a value that includes an identifier and a digital signature on the identifier. In some embodiments the identifier may specify information related to the creation of the content. This information may include the name of the artist, the identifier 1630 of the digital element corresponding to the physical content, a serial number, information such as when it was created, and/or a reference to a database in which sales data for the content is maintained. A digital signature element affirming the physical element may be made by the content creator and/or by an authority associating the content with the content creator.

In some embodiments, the digital authenticity value 1680 of the physical element 1690 can be expressed using a visible representation. The visible representation may be an optional physical interface 1670 taken from a group including, but not limited to, a barcode and a quick response (QR) code encoding the digital authenticity value. In some embodiments, the encoded value may also be represented in an authenticity database. Moreover, the physical interface 1670 may be physically associated with the physical element. One example of such may be a QR tag being glued to or printed on the back of a canvas. In some embodiments of the invention, the physical interface 1670 may be possible to physically disassociate from the physical item it is attached to. However, if a DAV 1680 is used to express authenticity of two or more physical items, the authenticity database may detect and block a new entry during the registration of the second of the two physical items. For example, if a very believable forgery is made of a painting the forged painting may not be considered authentic without the QR code associated with the digital element.

In a number of embodiments, the verification of the validity of a physical item, such as a piece of artwork, may be determined by scanning the DAV. In some embodiments, scanning the DAV may be used to determine whether ownership has already been assigned. Using techniques like this, each physical item can be associated with a control that prevents forgeries to be registered as legitimate, and therefore, makes them not valid. In the context of a content creator receiving a physical element from an owner, the content creator can deregister the physical element 1690 by causing its representation to be erased from the authenticity database used to track ownership. Alternatively, in the case of an immutable blockchain record, the ownership blockchain may be appended with new information. Additionally, in instances where the owner returns a physical element, such as a painting, to a content creator in order for the content creator to replace it with an "evolved" version, the owner may be required to transfer the ownership of the initial physical element to the content creator, and/or place the physical element in a stage of being evolved.

Figure 17:
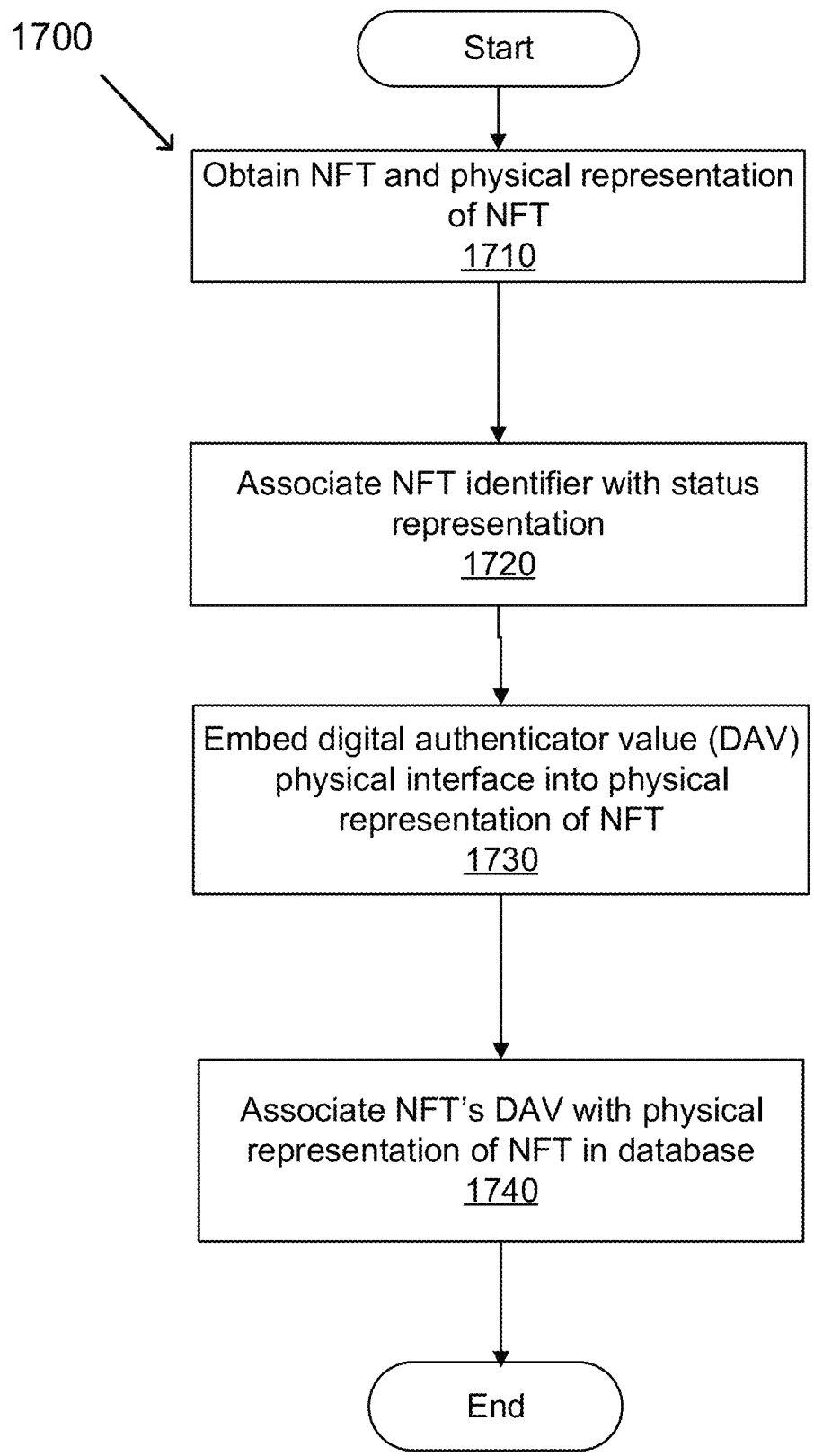
FIG. 17 illustrates a process for establishing a relationship between an NFT and corresponding physical content.
Figure 18:
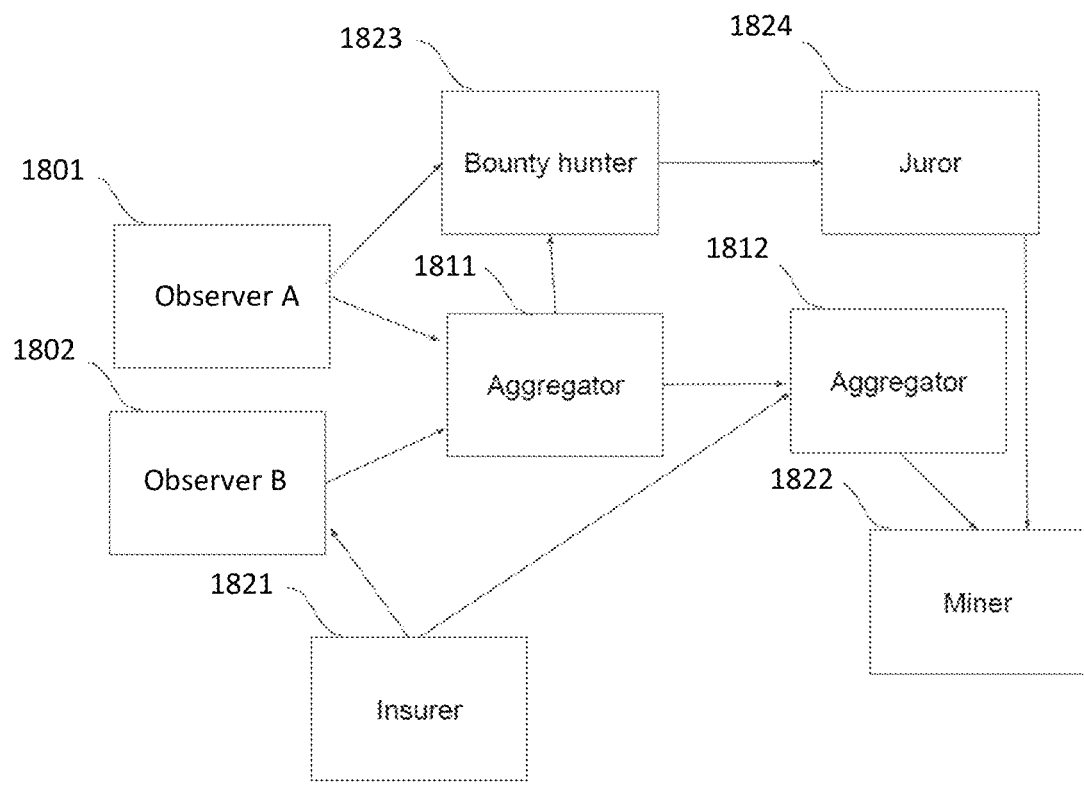
FIG. 18 conceptually illustrates an example observation aggregation system.
Figure 19:
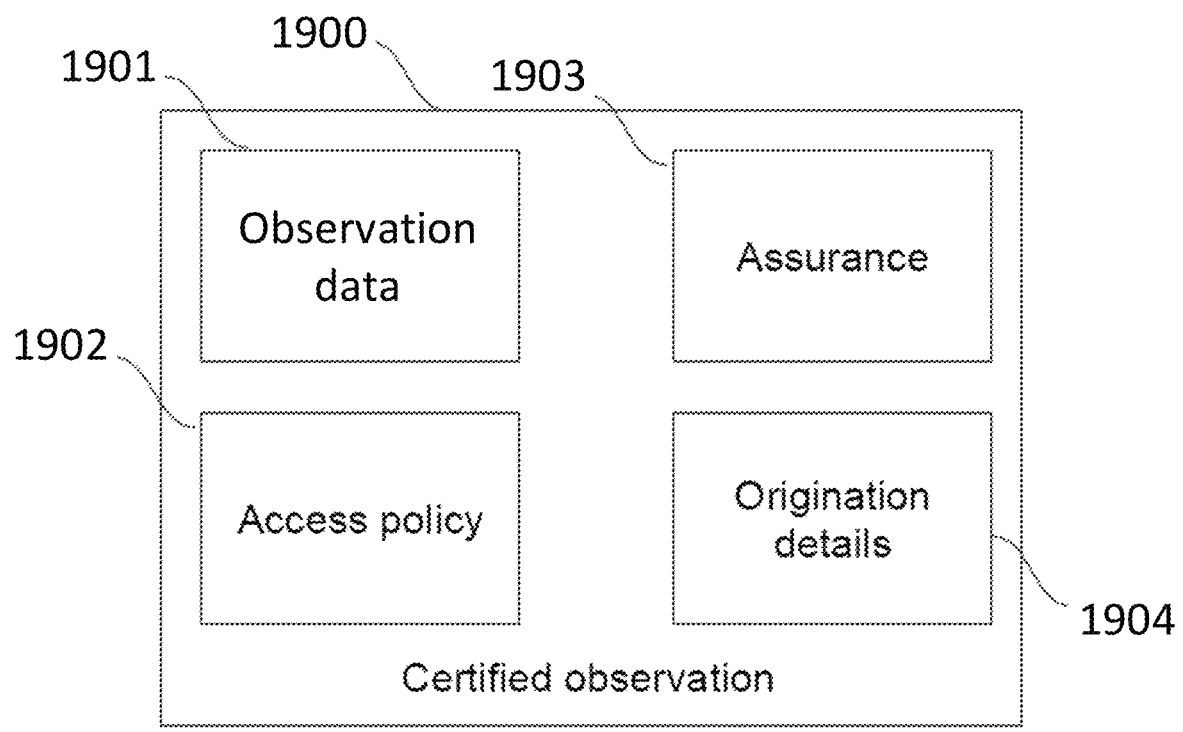
FIG. 19 conceptually illustrates an example of a certified observation.
Figure 20:
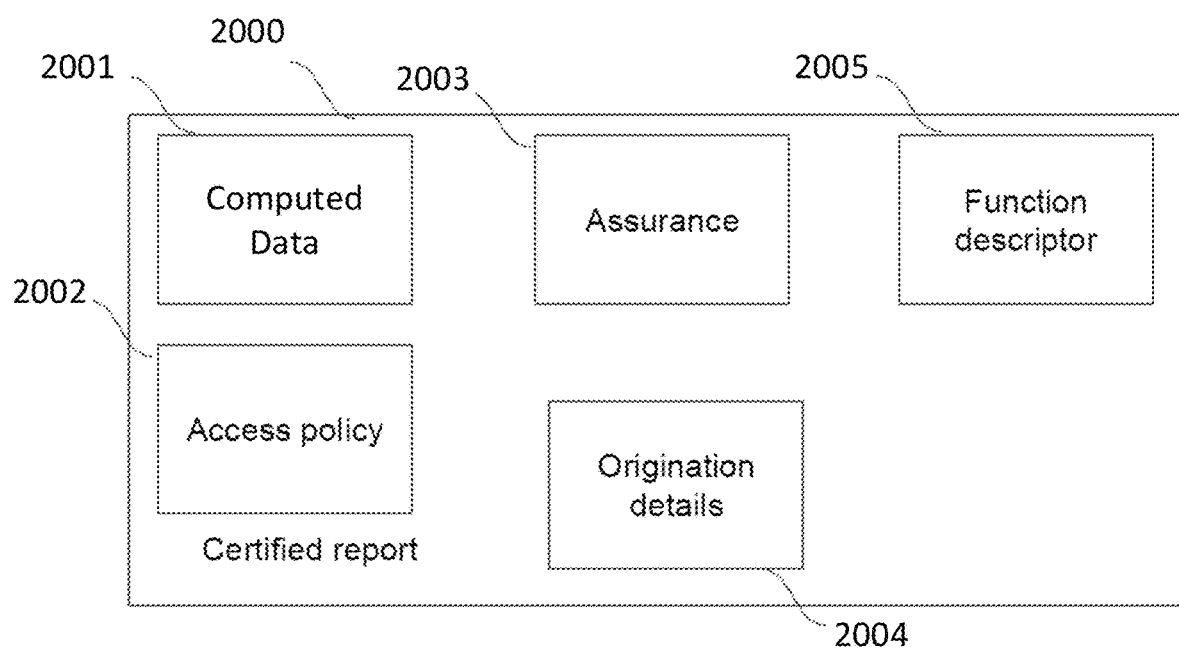
FIG. 20 conceptually illustrates an example of a certified report.
Figure 21:
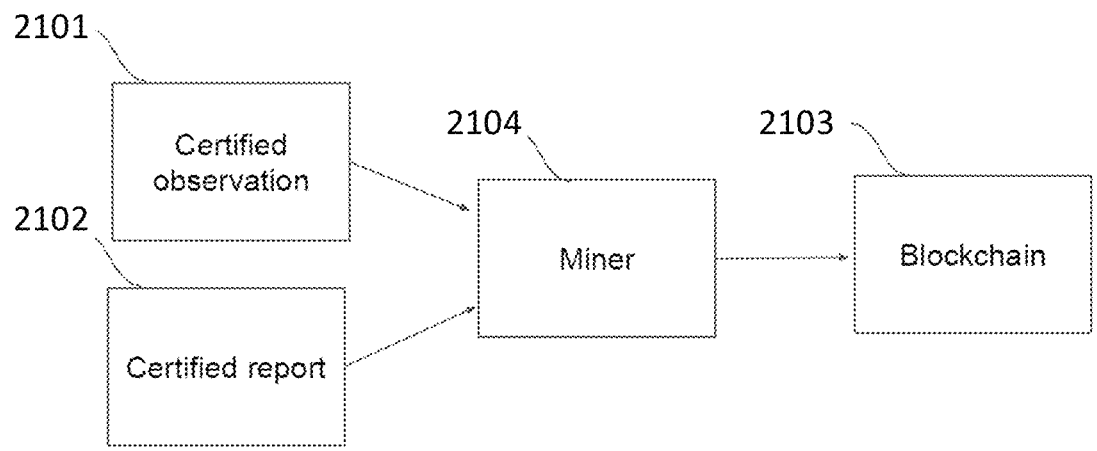
FIG. 21 conceptually illustrates incorporation of data from a certified observation and/or a certified report on a blockchain by a miner.
Figure 22:
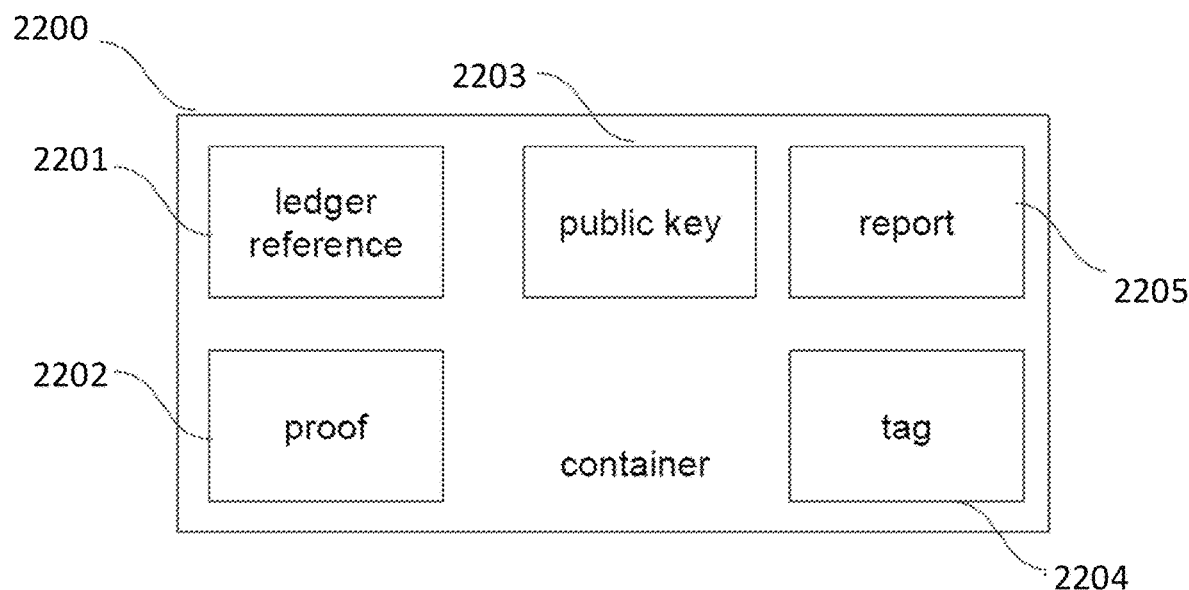
FIG. 22 conceptually illustrates an example of a container.
Figure 23:
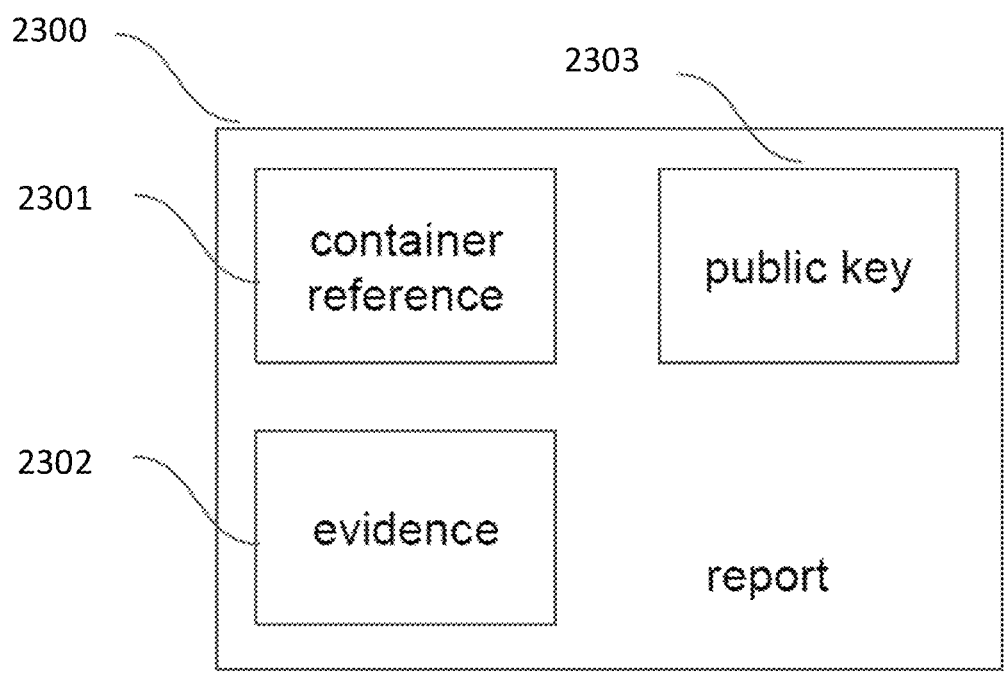
FIG. 23 conceptually illustrates an example of a report including a container.
Figure 24:
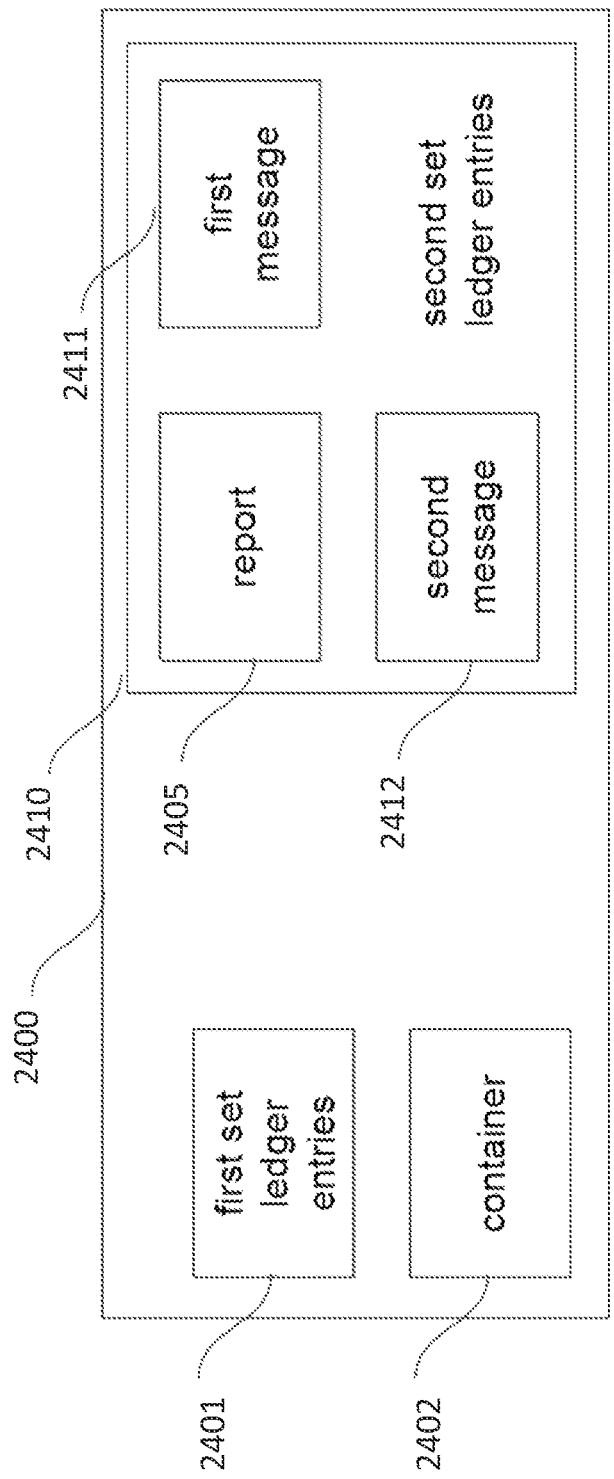
FIG. 24 conceptually illustrates an example ledger (e.g., distributed ledger) including a container irrevocably associating a set of ledger entries with a ledger.
Figure 25:
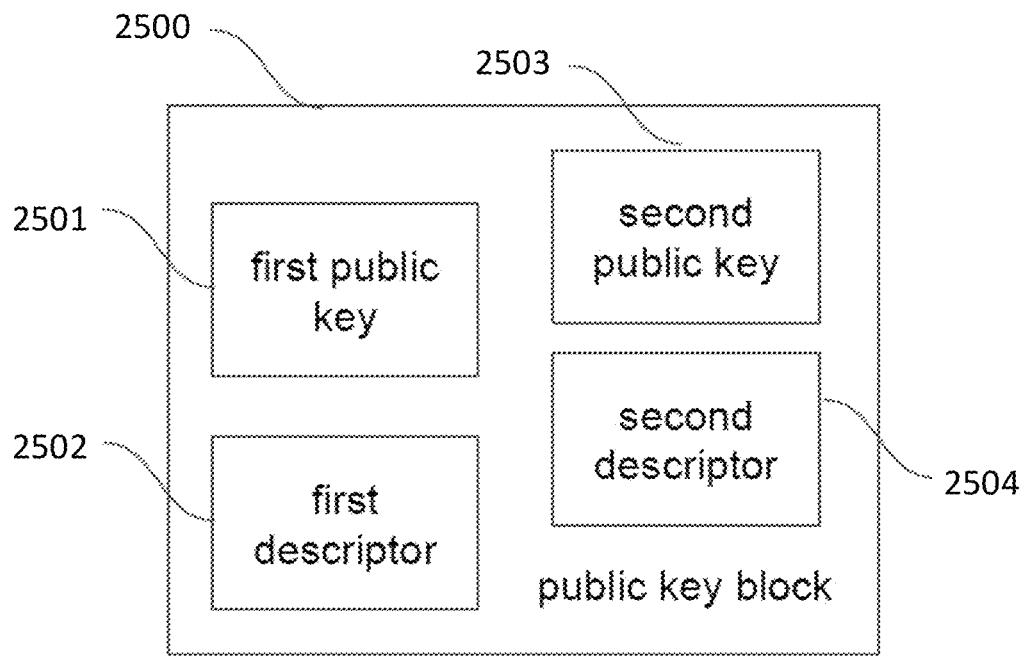
FIG. 25 conceptually illustrates an example public key block.
Figure 26:
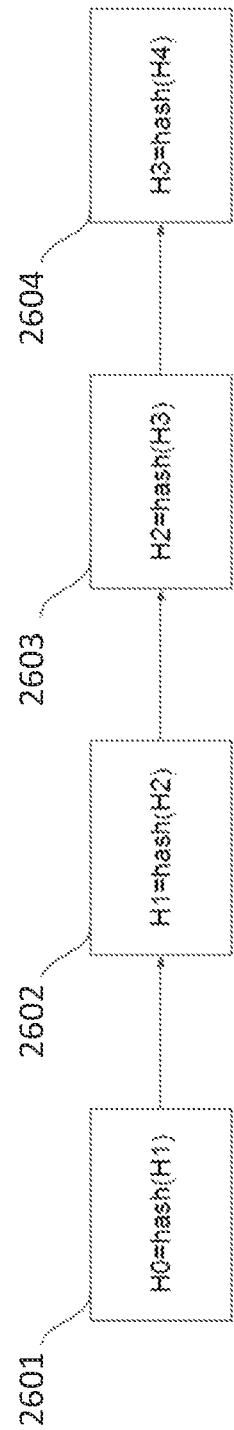
FIG. 26 conceptually illustrates an example of a series of version identifiers.
Figure 27:
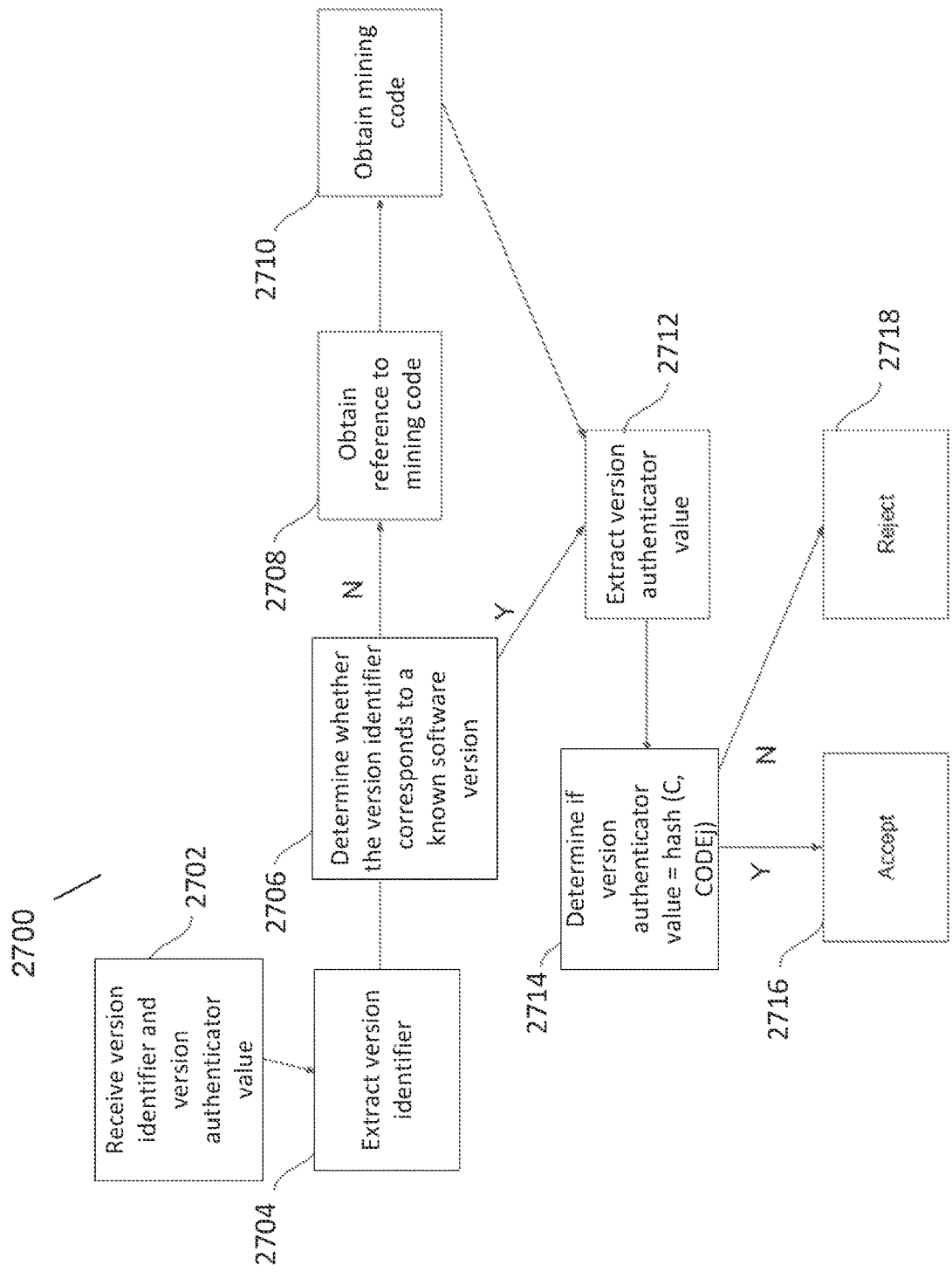
FIG. 27 conceptually illustrates an example process for checking the acceptability of version identifiers and version authenticators.
Figure 28:
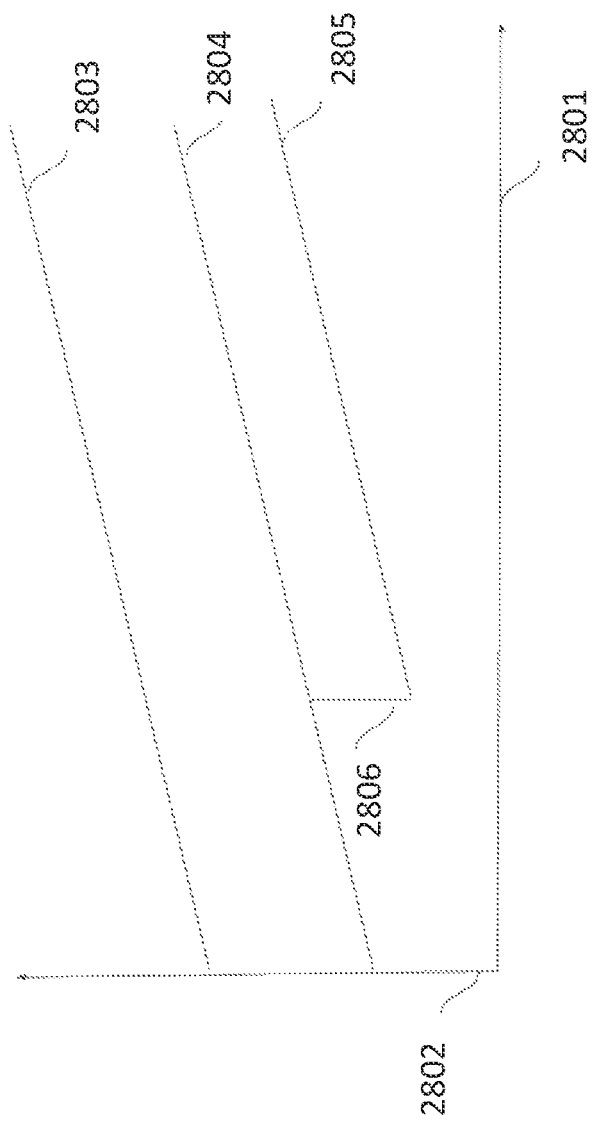
FIG. 28 conceptually illustrates an example of a series of restriction values and the associated limitation values for two example miners.
Figure 29:
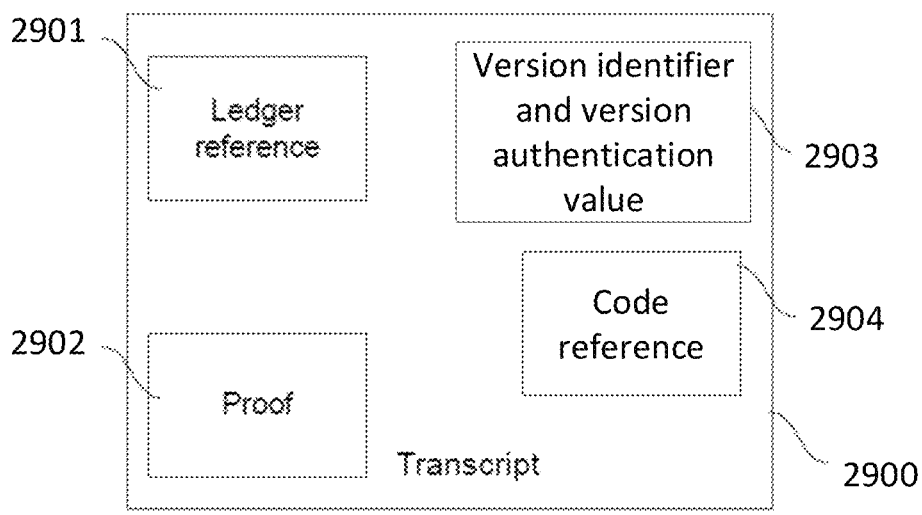
FIG. 29 conceptually illustrates an example of a transcript.
Figure 30:
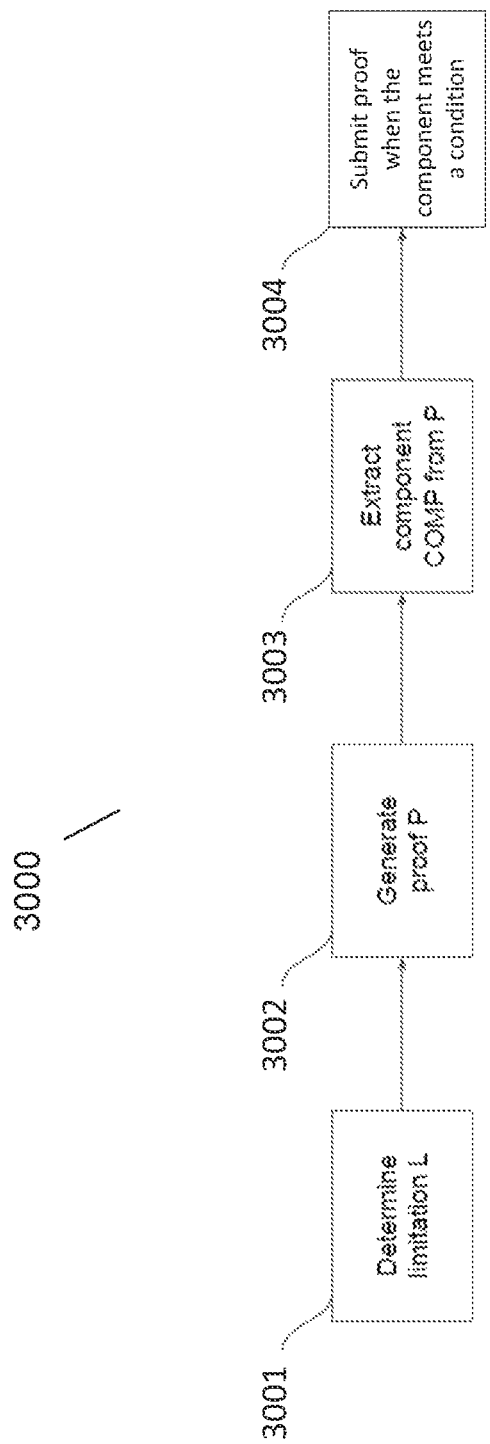
FIG. 30 conceptually illustrates an example process for generating a proof subject to a limitation.
Figure 31:
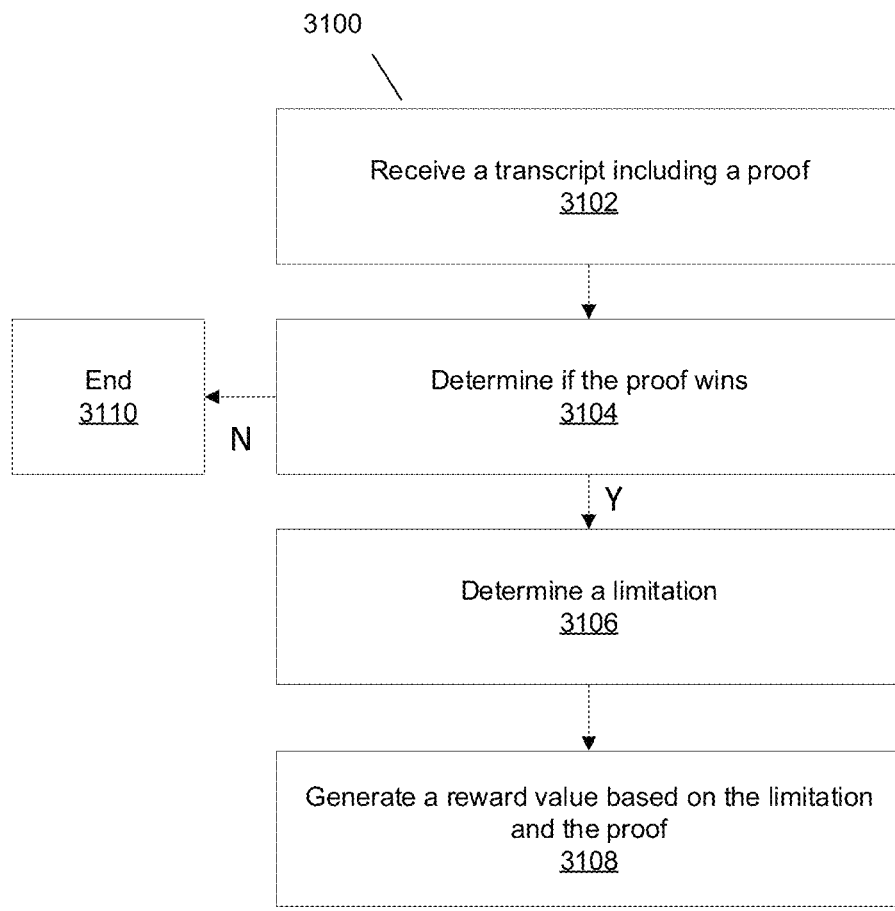
FIG. 31 conceptually illustrates an example process applying limitations to mining rewards.
Figure 32:
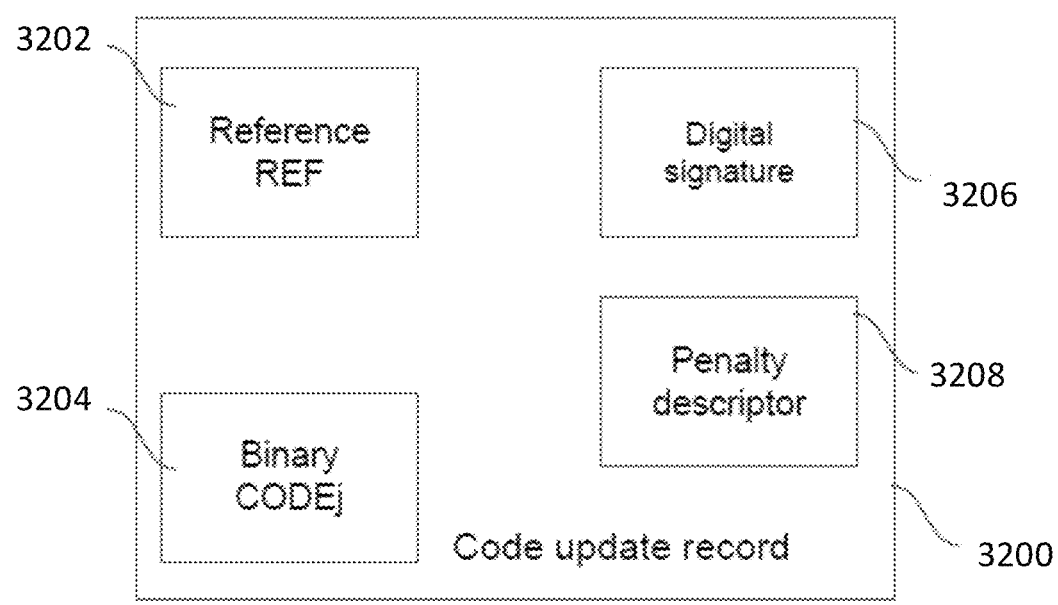
FIG. 32 conceptually illustrates an example code update record.
Figure 33:
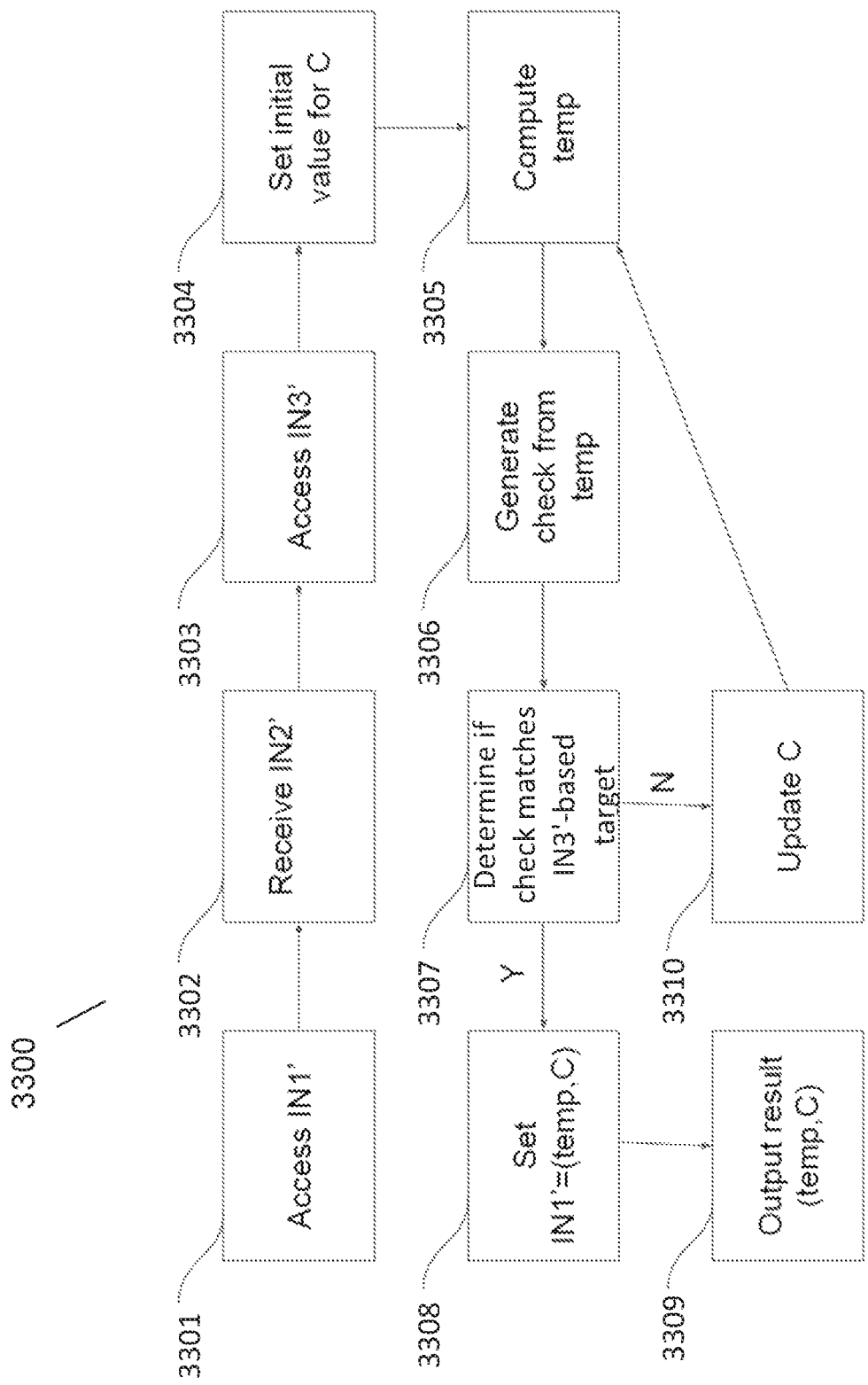
FIG. 33 conceptually illustrates an example process for evaluating a witness-based hash function without a witness.
Figure 34:
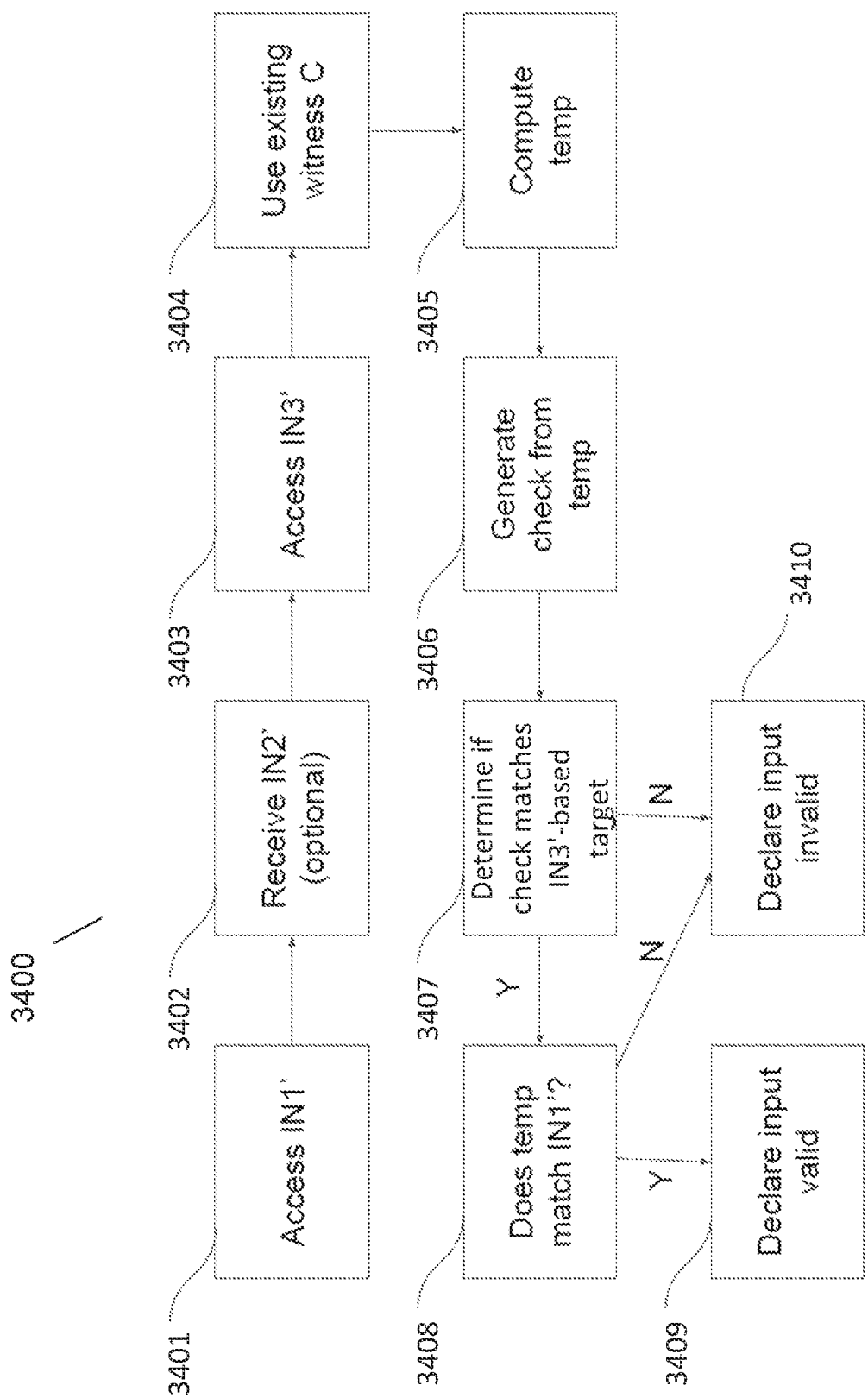
FIG. 34 conceptually illustrates an example process for evaluating a witness-based hash function with a witness.
Figure 35:
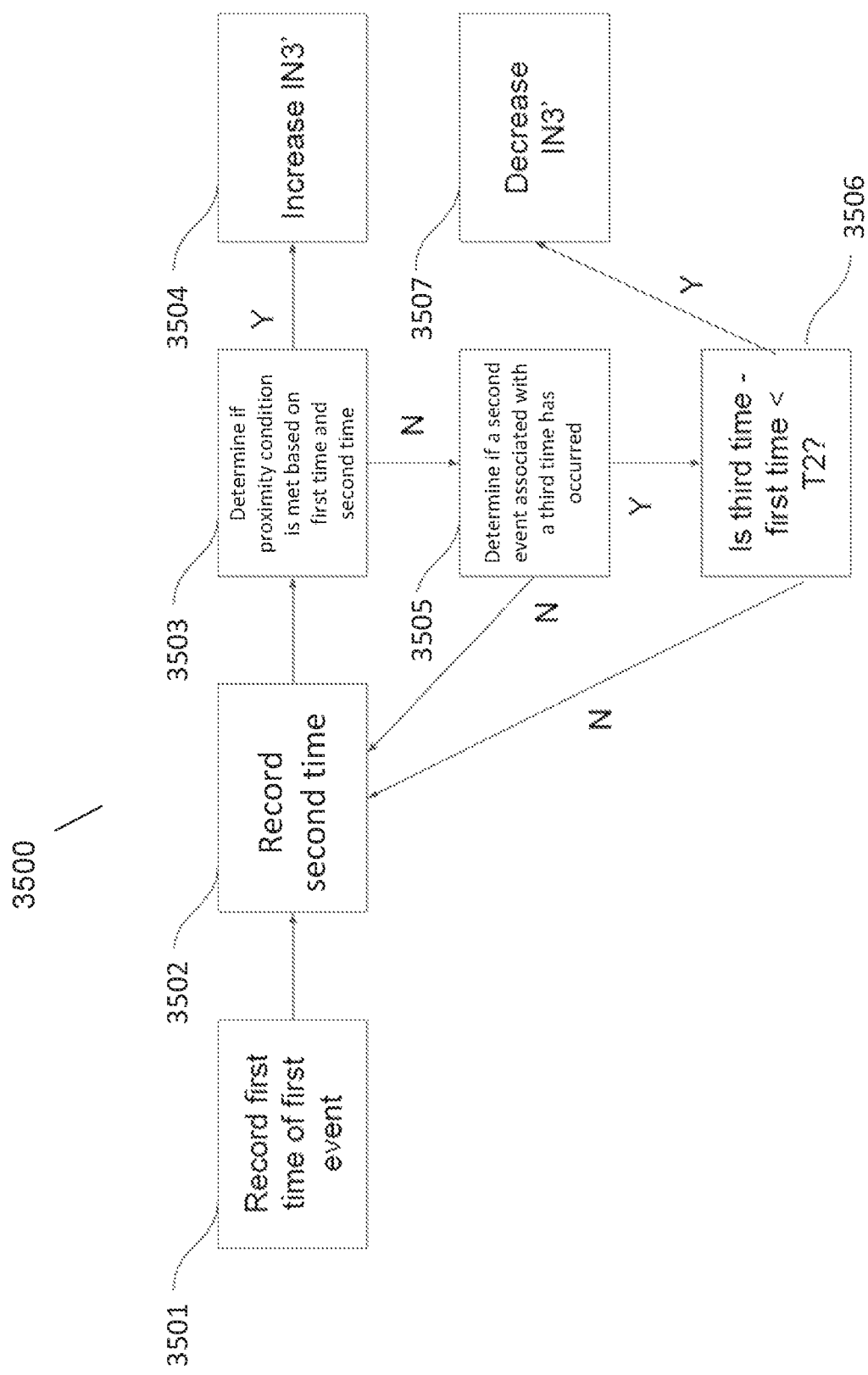
FIG. 35 conceptually illustrates an example process for modifying a hardness value.
Figure 36:
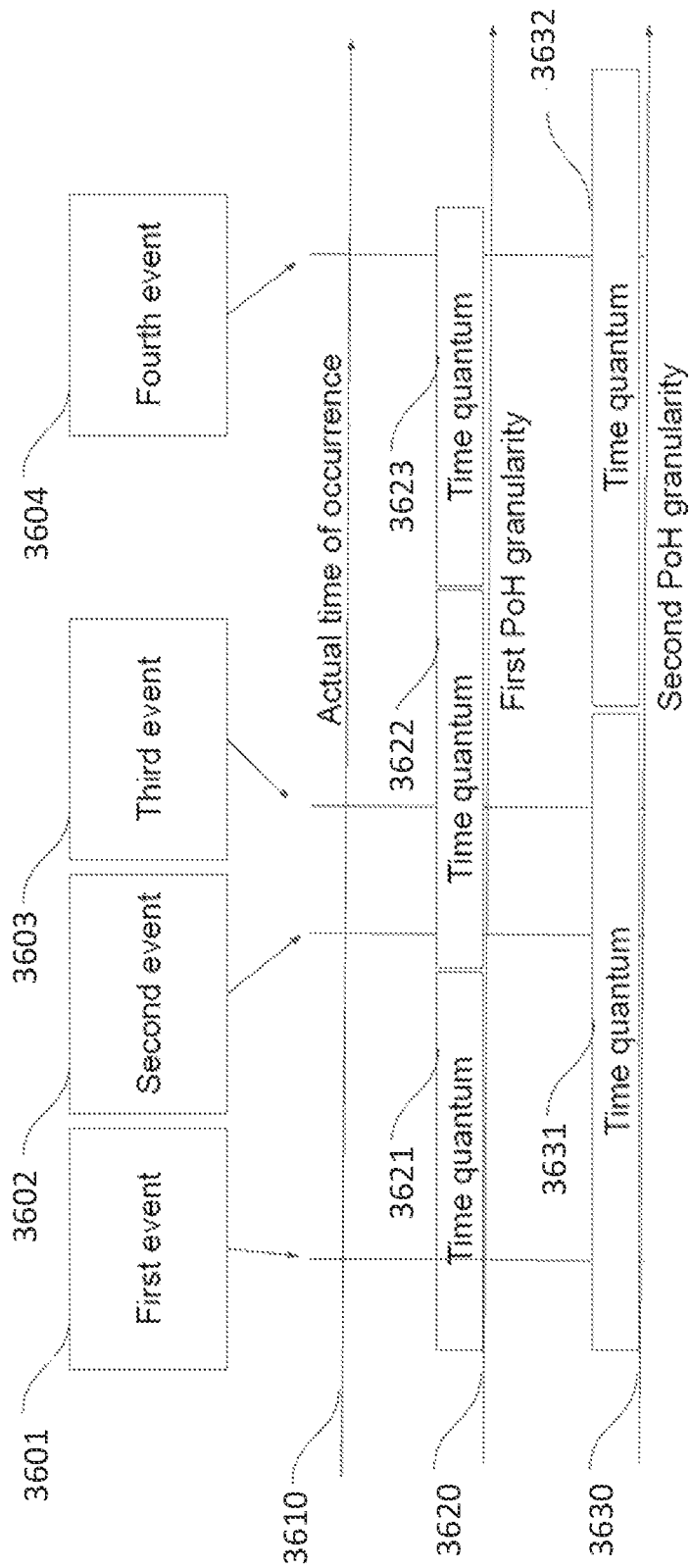
FIG. 36 conceptually illustrates the notion of collisions under two different PoH time granularity scales.

An example of a process for connecting an NFT digital element to physical content in accordance with some embodiments of the invention is illustrated in FIG. 17. Process 1700 may obtain (1710) an NFT and a physical representation of the NFT in connection with an NFT transaction. Under the earlier example, this may be a painting of a living mouse and an NFT of a living mouse. By virtue of establishing ownership of the NFT, the process 1700 may associate (1720) an NFT identifier with a status representation of the NFT. The NFT identifier may specify attributes including, but not limited to, the creator of the mouse painting and NFT ("Artist"), the blockchain the NFT is on ("NFT-Chain"), and an identifying value for the digital element ("no. 0001"). Meanwhile, the status representation may clarify the present state of the NFT ("alive mouse"). Process 1700 may also embed (1730) a DAV physical interface into the physical representation of the NFT. In a number of embodiments of the invention, this may be done by implanting a QR code into the back of the mouse painting. In affirming the connection between the NFT and painting, Process 1700 can associate (1740) the NFT's DAV with the physical representation of the NFT in a database. In some embodiments, the association can be performed through making note of the transaction and clarifying that it encapsulates both the mouse painting and the mouse NFT.

While specific processes are described above with reference to FIGS. 15-17, NFTs can be implemented in any of a number of different ways to enable as appropriate to the requirements of specific applications in accordance with various embodiments of the invention. Additionally, the specific manner in which NFTs can be utilized within NFT platforms in accordance with various embodiments of the invention is largely dependent upon the requirements of a given application.

Methods of Integrating Real-World Data and Measurements into Distributed and Consensus-Based Environments Observation aggregation systems can aggregate observations from observers and record observations to blockchains. In several embodiments, observation aggregation systems include interaction between various entities. An example observation aggregation system is conceptually illustrated in FIG. 18. Observer A 1801 and observer B 1802 can have sensors and/or input elements that receive information. In various embodiments, observers can periodically generate certified observations. Certified observations can be made available to various entities. Certified observations can be certified measurements. Certified observations can be made available by making them public (e.g., by storing certified observations in public databases, and/or by broadcasting certified observations). Aggregator 1811 can obtain a certified observation from observer A 1801. Bounty hunter 1823 can obtain a certified observation from observer A 1801. Aggregator 1811 can obtain a certified observation from observer B 1802. Observers can selectively transmit certified observations to one or more entities (e.g., subscribing entities), such as aggregators. Observer A 1802 can be insured by an insurer 1821. Aggregator 1812 can also be insured by the insurer 1821. Aggregator 1811 can receive certified observations from observer A 1801 and observer B 1802. In many embodiments, aggregators can generate certified reports based on certified observations. Certified reports generated by aggregators can be made public and/or can be sent to entities (e.g., subscribing entities). Aggregator 1812 receives a certified report from aggregator 1811. When bounty hunter 123 identifies an error that is not within a pre-specified error range, the bounty hunter 123 can report the error to juror 1824 and/or resolve the error automatically using a smart contract that takes evidence of the discrepancy as input. Identified errors can be in certified observations and/or in certified reports. Juror 1824 can collaborate with other jurors (not shown), and can transmit information to the miner 1822. The transmitted information can be related to the complaint received from bounty hunters. Aggregator 1812 can provide information (e.g., certified reports) to the miner 1822. Miners obtain certified reports. In several embodiments, using a cryptographic system (e.g., consensus mechanism), miners compute challenges based on received certified reports (e.g., based on data of pre-specified types from the certified report).

In some embodiments, aggregators include certified reports in ledger entries. Challenges can be generated based on these ledger entries. In several embodiments, miners can receive the ledger entries and/or generate challenges based on ledger entries.

In many embodiments, coin base transactions can be included in ledger entries. Coin base transactions can be transactions that can generate new tokens.

In several embodiments, observers can determine the values of data items (e.g., observe), and certify observations. In a number of embodiments, certified observations can include types associated with data items, values associated with data items, expected error ranges and/or other accuracy assessments associated with the certainty of the measurement of values being measured (e.g., data items), times associated with measurement of the data item (e.g., measurement times), details of how the measurement was performed, and/or information about the identity and/or reputation of observers. Certified observations can include a digital signature and/or other values used to authenticate the data items included in the certified observations. To avoid malicious modifications of certified observations, certified observations can include a digital signature and/or other values used to authenticate the data items included in the certified observations. Observation data can include data items.

In some embodiments, any entity can become an observer. In many embodiments, outputs generated by observers can be evaluated with reference to reputation scores associated with observers. Outputs by observers can include observation data, certified observations, and/or other outputs. In several embodiments, observers can post securities as assurances (e.g., new observers with no or low reputation scores can post securities instead). In some embodiments, when an observer is found to have output an incorrect measurement, the observer can be penalized by an automated forfeiture of a portion of a security. Securities can be expressed in terms of funds (e.g., currency or tokens) that are put up as a guarantee of performance, and/or by purchasing insurance from entities whose role is to assess the quality of observers. Assessments of the quality of observers can be based on equipment and a small number of provided measurements. Insurance can correspond to securities provided by a third party (e.g., the insurer), in return for payments of premiums by entities associated with observers. In some embodiments, securities can be expressions of reputation scores of insurers. When an observer posts an incorrect measurement, the insurer can suffer a reduction to their reputation score.

In some embodiments, insurance premiums can be determined based on reputations scores of the insured observers, on the type of measurements (observation data) being provided, and/or the risks associated with errors in the measurements.

In many embodiments, a third party can provide assurances related to observers (e.g., after a premium, subscription or membership is paid). In various embodiments, insurance tokens can include a digital signature on a message. The message can identify an insured party (e.g., by the public key of the insured party) The message can include a machine-readable policy that determines what an insurance statement relates to, the terms, and/or any limitations. Insurance can be insurance tokens. An insurance token can include an insurance statement. An example insurance statement may state that the insurance relates to including measurements relating to weather reports in the 94041 zip code; that the insured can report cloud coverage and temperature; and that if a certified observation of the insured, comprising a time stamp, is found to deviate from the right temperature by at least 2.5 F or by at least 10% cloud coverage, then the insurer will pay up to $5 to a data consumer that purchased a license to the certified data. Insurance tokens can be associated with insurers. Insurers can have reputation scores and/or insurance from other insurers. Insurance tokens can be arranged hierarchically.

In several embodiments, aggregators and/or miners can determine whether to use a given input value corresponding to a certified observation, a certified report, a complaint, and/or an output by a juror based on an assurance value associated with an entity that generated the input value. For example, an aggregator can have a policy only to rely on data from certified observations from observers that have a reputation score exceeding 76 out of 100 points, and/or from observers with an insurance that will pay at least $100 if an error is detected for an insured party. In another example, an aggregator can have a policy to rely on data coming from entities that put up a security of at least a security value (e.g., $500), and with an associated policy for accessing the funds that would enable the aggregator to be paid at least a payment value (e.g.,$5) if the data from an insured observer is found to be incorrect by at least a threshold amount (e.g., 0.5% of the stated data value). In various embodiments, miners can have policies that determine what data sources, including data from certified observations and/or certified reports, it will use. Different aggregators and miners can have different policies determining what data sources they will rely on. Some such entities (e.g., aggregators and miners) can have policies that are conditional. In certain embodiments a conditional policy can state that if there is a relevant data source (e.g., a certified observation and/or certified report) with an assurance meeting a first requirement (e.g., reputation score of at least 90 points), then this data source can be used, but if there is no relevant data source satisfying the first requirement, then a conditional policy can permit sources that satisfy a second requirement (e.g., have a reputation score of at least 65 points and an insurance that will cover at least 65% of all reasonable losses the entity suffers if the data relied on is incorrect by more than 5%). A person of skill in the art will recognize that there are countless variations of such policies, and that these are simply illustrative examples. For example, observers can generate observation data associated with a limited liability of use policy.

In many embodiments, aggregators can obtain data (e.g., observation data and/or certified observations) from observers (one or more observers), combine the obtained data, and output the combined data (e.g., output computed data and/or certified reports). In some embodiments, combining data can include concatenating obtained data items, such as in an array or a vector. In various embodiments, combining data can include computing a function of multiple data items (e.g., an average). The result of the function can be an output. Aggregators can aggregate the obtained data. Data aggregation can include combining data. Data aggregation can include obtaining multiple data items, determining weights for each data item, and/or computing a weighted average of data items. Weights can represent reliability or perceived accuracy of the various data items and/or reputations of associated originators of the data items. Functions, such as weighted averages, can be based on the computed weights. Originators of data items can be observers and/or aggregators (e.g., other aggregators). Data items can include certified observations, observation data, certified reports, computed data, and/or portions of any of these. Combining data can include performing computations on data.

In several embodiments, aggregators can execute scripts on received data, and output the results of the execution. In some embodiments, scripts can determine predictions for the types of data being processed based on current and recent data items of the same and/or related types. In many embodiments, machine learning techniques, artificial intelligence techniques, and/or statistical techniques such as time series analysis may be used to generate such predictions. In some embodiments, the outputs of at least some aggregators can be certified. The output aggregators outputting the data can be originators of the data. Originators and/or other aggregators can certify data (e.g., generate certified reports) by digitally signing an output container. The output container can include computed data, information about sources of computed data, information about when the processing took place, information about potential liabilities, terms of use or license information, and/or specifications of how the output may be used, including information about the potential TEE and/or DRM requirements. The certified outputs can be certified reports. In many instances, certified output containers can be certified reports. Aggregators can be insured to increase the trust that other parties consuming their outputs place in their certified outputs. Insurers can insure the output of both aggregators and observers in analogous manners. Insurers and insurance are described in more detail elsewhere herein.

In several embodiments, bounty hunters process certified data (e.g., certified observations and/or certified reports) output by data originators (e.g., observers) and/or aggregators and identify discrepancies. In various embodiments, discrepancies can be data (e.g., certified data) that are not consistent with other data (e.g., certified data) of the same type and/or for the same time period. In certain embodiments, discrepancies can be determined by identifying whether data (e.g., certified data) is inconsistent with other certified data (e.g., certified data). In various embodiments, discrepancies can be data (e.g., certified data) that are incorrectly generated from claimed inputs by faulty or corrupted data aggregators. Incorrect generation can be detected based on performing computations based on claimed inputs and determining that results are different from reported outputs. In many embodiments, aggregators and/or observers can use proprietary algorithms, secret inputs, and/or otherwise rely on input data that is not publicly available. In such a situation, bounty hunters can perform assessments based on other measurements and determine likelihoods that investigated outputs are correct. When it is found that investigated outputs are unlikely to be correct (e.g., a likelihood threshold is not satisfied), bounty hunters can report investigated outputs as likely discrepancies. Investigated outputs can include portions of certified observations and/or certified reports. Bounty hunters can submit complaints. Bounty hunter complaints can include references to data, proofs of faulty data, evidence of faulty data and/or bounty hunter identifier information.

In certain embodiments, bounty hunters can prove the correctness of their claims. In some embodiments, a bounty hunter proof can be automatically verified by a contract associated with the data. In many embodiments, rewards (e.g., bounties) can be generated and/or determined based upon liability statements associated with contracts. In some embodiments, there may not be explicit liability statements associated with certified data elements, but a third party can determine that the flawed entity should be penalized and causes this entity to forfeit something of value, whether a financial asset or part of a reputation score. In various embodiments, when bounty hunters file false complaints, the false filing bounty hunters can be penalized. The penalty can be similar to that described above. Bounty hunter complaints can include contracts (e.g., smart contracts) that enable transfers of funds and/or reductions of reputation scores if the complaint is found to be incorrect. In some embodiments, incorrectness can be determined by adjudicating entities. In various embodiments, correctness of bounty hunter complaints can be determined by collections of juror entities. In some embodiments, juror entities can determine entities at fault, based on provided data, and can cause penalties.

In many embodiments, juror entities can be associated with reputation scores. In some embodiments, juror reputation scores can be voted up or down by other juror entities. Reputation scores can be determined based on past performance. In some embodiments, where adjudications that are not consistent with the majority or weighted majority based on associated reputation can cause reductions of reputation scores and consistent adjudications can cause increased reputation scores. In certain embodiments, reputations can be determined by consensus methods. Consensus methods for setting reputation scores can include miners and/or verifiers selecting performance views for juror entities as inputs to computing challenges, thereby causing their preferred view to be expressed in the closing of ledgers. In some embodiments, performance views can include lists of juror entities that are believed to be in the right for one or more transactions. Transactions can correspond to situations in which juror entities evaluate one or more bounty hunter complaints. In several embodiments, consensus mechanisms by miners and/or verifiers are performed only when a threshold subset of jurors request it. A threshold subset can correspond to at least one third of the available jurors. A threshold subset can be a requirement based on weights assigned to jurors. Juror weights can be based on juror reputations. Juror entities can perform tasks, relative to complaints generated by bounty hunters that are analogous to the tasks performed by aggregators perform, relative to data originators (e.g., observers). Accordingly, similar techniques can be used by aggregators and jurors.

In some embodiments, when certified observations and/or certified reports are successfully challenged by bounty hunters, entities associated with the successfully challenged certified value can be penalized. The associated entities can include observers, aggregators and/or insurers. Penalties can be reputational and/or financial. Penalties can be automatically determined using smart contracts, determined using one or more jurors, and/or determined using a consensus of miners and verifiers. In several embodiments, when certified observations and/or reports are successfully challenged, associated incorrect data can be corrected. Correcting incorrect data can include entering corrections into ledgers (e.g., a blockchain.)

In several embodiments, incorrect data on ledgers can be marked as superseded, changed and/or redacted. Methods for marking up and redacting data are described in U.S. Provisional Patent Application No. 63/216,662 filed Jun. 30, 2021 titled "Pseudo-Immutable Blockchain Method" and U.S. patent application Ser. No. 17/810,085 filed Jun. 30, 2022 titled "Distributed Ledgers with Ledger Entries Containing Redactable Payloads," the disclosures of which are incorporated herein by reference in their entireties. Corrected data can be entered on ledgers and/or in traditional databases. In several embodiments, forward references to new entries can be added to the entries marked as superseded. In certain embodiments, when invalid data (e.g., data successfully challenged by bounty hunters) has been used for the generation of other related data (e.g., by aggregators for generating certified reports), the related data can be audited to determine whether it is invalidated by the successfully challenged data. If so, associated certified reports can be corrected using one of the methods described for the correction of the successfully challenged data. To the extent that aggregators using the challenged data can be determined to have been aware of the invalidity of the data at the time of creating their certified reports, they can be penalized. In some embodiments, awareness of invalidity of the data at time of certified report creation can be determined using jurors and consensus mechanisms.

In many embodiments, jurors can be automated entities (e.g., scripts). In several embodiments, jurors can be entities that provide assessments based on information they are presented with.

While specific systems and components for observation aggregation systems are described above, any of a variety of systems and components can be utilized for observation aggregation systems as appropriate to the requirements of specific applications. In certain embodiments components can be arranged in any order or sequence not limited to the order and sequence shown and described. In a number of embodiments, some of the above components may execute or perform processes substantially simultaneously where appropriate or in parallel to reduce latency and processing times. In some embodiments, one or more of the above components may be omitted. Although the above embodiments of the invention are described in reference to observation aggregation systems the techniques disclosed herein may be used in any of the rich media systems, permissioned blockchains, cryptographic systems, methods of integrating real-world data and measurements into distributed and consensus-based environments, methods for ensuring blockchain integrity and stability, robust enforcement of software update policies in consensus networks, Proof of History based blockchain verification and other systems and processes discussed herein.

In a number of embodiments, certified observations can include observation data, assurances, access policies, and/or origination details. An example of a certified observation is conceptually illustrated in FIG. 19. Certified observation 1900 includes observation data 1901, access policy 1902, assurance 1903, and origination details 1904. In several embodiments, observation data can include measurements and associated error rates. Observation data can be encrypted. In many embodiments, access policies describe the terms under which observation data can be used. In many embodiments, access policies can define identified entities that can access observation data, subscriptions and/or per-use fees required for access to observation data, and/or restrictions in terms of what type of environments (e.g., specified TEE and/or DRM types) may access observation data. Access policies can describe liability of originators of certified observations. Originators can be observers.

An example liability may include that if measurements associated with observation data are found to be erroneous and the discrepancy exceeds a threshold (e.g., is greater than a particular value or percentage), then originators and/or associated insurers can be required to pay specified amounts. The amounts can be specified in currency and/or tokens (e.g., $1000, 1 Eth). In several embodiments, the amount can be claimed, in part or in full by bounty hunters, and/or data consumers such as aggregators. In certain embodiments, aggregators can claim the insurance amount when they suffer a loss due to incorporating data from a certified report. In a number of embodiments, Assurances can be reputation scores associated with originators of certified observations and/or reputation score associated with insurers of certified observations and/or originators. In certain embodiments, assurances can include executable contracts (e.g., smart contracts) that carry a transfer accessible by providing, to the executable contract, evidence of error. Assurances can include references to insurers, and/or contracts (e.g., smart contracts) associating insurers with originators of certified observations. In several embodiments, origination details can describe methodologies of obtaining data. Methodologies of obtaining data can include (but are not limited to) types of measuring equipment used, measuring techniques used, descriptions of the source of the information, and other information describing how the data was obtained.

In accordance with several embodiments of the invention, data licenses can be associated with certified observations. Data licenses can be contracts that specify costs of using associated data (e.g., certified observations, certified reports), how associated data may be used (e.g., terms of use), and statements identifying liabilities associated with the associated data. In some embodiments, a cost of the associated data can include that an observer requires any entity operating on the data to have a subscription and/or pay a stated amount. In certain embodiments, terms of use can include a requirement that computations using the associated data must be executed in a Trusted Execution Environment (TEE) or a Digital Rights Management (DRM) unit meeting some particular specification. In a number of embodiments, statements identifying liabilities can state that if the data (e.g., certified observation, certified reports, measurement) is found be more than a threshold amount (e.g., 4%) off a real value, as determined by a trusted party and/or a consensus mechanism, then an entity (e.g., the observer) agrees to pay a specified penalty. The contract can be expressed as a token. Expressing contracts as tokens is described in U.S. Provisional Patent Application No. 63/213,251 filed Jun. 22, 2021 titled "Token Creation and Management Structure" and U.S. patent application Ser. No. 17/808,264 filed Jun. 22, 2022 titled "Systems and Methods for Token Creation and Management," the disclosures of which are incorporated herein by reference in their entireties. In many embodiments, contract tokens can include digital signatures, encrypted information that can only be decrypted in select environments, and/or protected keys that can be used to access certified observations. In various embodiments, entities with access to protected keys can access certified observations and/or certified reports using the protected keys. In several embodiments, keys can be protected by encrypting them using a key that is known or can be obtained by computational entities with a required TEE or DRM certification. Protecting keys by encrypting them using a key that is known or can be obtained by computational entities with a required TEE or DRM certification is disclosed in U.S. Provisional Patent Application No. 63/213,251 filed Jun. 22, 2021 titled "Token Creation and Management Structure" and U.S. patent application Ser. No. 17/808,264 filed Jun. 22, 2022 titled "Systems and Methods for Token Creation and Management," the disclosures of which are incorporated herein by reference in their entireties.

While specific systems and components of certified observations are described above, any of a variety of systems and components can be utilized for certified observations as appropriate to the requirements of specific applications. In certain embodiments components can be arranged in any order or sequence not limited to the order and sequence shown and described. In a number of embodiments, some of the above components may execute or perform processes substantially simultaneously where appropriate or in parallel to reduce latency and processing times. In some embodiments, one or more of the above components may be omitted. Although the above embodiments of the invention are described in reference to certified observations the techniques disclosed herein may be used in any of the rich media systems, permissioned blockchains, cryptographic systems, methods of integrating real-world data and measurements into distributed and consensus-based environments, methods for ensuring blockchain integrity and stability, robust enforcement of software update policies in consensus networks, Proof of History based blockchain verification and other systems and processes discussed herein.

In a number of embodiments, certified reports can include observation data, access policies, assurances, origination details, and/or function descriptors. An example certified report is conceptually illustrated in FIG. 20. Certified report 2000 can include computed data 2001, access policy 2002, assurance 2003, origination details 2004 and function descriptor 2005. In many embodiments, computed data can include measurements and associated error rates. Computed data can be encrypted. In many embodiments, access policies describe the terms under which computed data can be used. In many embodiments, access policies can define identified entities that can access computed data, subscriptions and/or per-use fees required for access to computed data, and/or restrictions in terms of what type of environments (e.g., specified TEE and/or DRM types) may access computed data. Access policies can describe liability of originators of certified reports. Originators can be aggregators. An example liability may include that if computed data are found to be erroneous and the discrepancy exceeds a threshold (e.g., is greater than a particular value or percentage), then originators and/or associated insurers can be required to pay specified amounts. The amounts can be specified in currency and/or tokens (e.g., $1000, 1 Eth). In several embodiments, the amount can be claimed, in part or in full by bounty hunters, and/or data consumers such as aggregators. In certain embodiments, aggregators can claim the insurance amount when they suffer a loss due to incorporating data from a certified report. In some embodiments, assurances can be reputation scores. Reputation scores can be associated with originators of certified reports and/or insurers of certified reports and/or originators.

In certain embodiments, assurances can include executable contracts (e.g., smart contracts) that carry a transfer accessible by providing, to the executable contract, evidence of error. Assurances can include references to insurers, and/or contracts (e.g., smart contracts) associating insurers with originators of certified observations. In several embodiments, origination details can describe methodologies of obtaining inputs and computing data. Methodologies of obtaining inputs can include types of measuring equipment used, measuring techniques used, descriptions of the source of the information, and other information describing how inputs were obtained. Origination details can describe techniques and equipment used to compute computed data. In some embodiments, sources of input data, can include references to certified data and/or observers. In several embodiments, function descriptors can state how data 301 was computed from its inputs (e.g., certified observations). Function descriptors can be expressed as references to scripts used, or references to meanings associated with computed data. Meanings associated with computed data can include indications that the computed data are indicative that particular certified observations are invalid, and/or evidence of invalidity of certified observations.

While specific systems and components of certified reports are described above, any of a variety of systems and components can be utilized for certified reports as appropriate to the requirements of specific applications. In certain embodiments components can be arranged in any order or sequence not limited to the order and sequence shown and described. In a number of embodiments, some of the above components may execute or perform processes substantially simultaneously where appropriate or in parallel to reduce latency and processing times. In some embodiments, one or more of the above components may be omitted. Although the above embodiments of the invention are described in reference to certified reports the techniques disclosed herein may be used in any of the rich media systems, permissioned blockchains, cryptographic systems, methods of integrating real-world data and measurements into distributed and consensus-based environments, methods for ensuring blockchain integrity and stability, robust enforcement of software update policies in consensus networks, Proof of History based blockchain verification and other systems and processes discussed herein.

In many embodiments, data associated with certified observations, and/or certified reports can be incorporated into blocks and added to blockchains by miners. Incorporation of data from a certified observation and/or a certified report on a blockchain by a miner is conceptually illustrated in FIG. 21. A miner 2104 can determine a challenge that is based on a certified observation 2101 and/or a certified report 2102. Based on the challenge, a block can be added to a blockchain 2103. In several embodiments, challenges can be based on entries on blockchains. Challenges can be used as inputs to the generation of proof. Proofs can be generated according to a cryptographic system. In some embodiments, a proof can include a proof of work, a proof of space, and/or a proof of stake. Proofs can cause blockchains to be closed, and can cause miners to obtain tokens. Tokens can be related to proofs. Proofs can be incorporated into blockchains. In several embodiments, integration of proofs, which are based on the certified observations and/or certified reports tie certified observations and/or certified reports to blockchains.

In various embodiments, miners and/or verifiers can generate challenges based on data (observation data, certified observations, computed data, certified reports, and/or other data as described elsewhere herein, and/or parts thereof) received from data originators, observers, aggregators, bounty hunters and/or jurors. Challenges can be used for generating mining attempts. When mining attempts succeed, the mining attempts close ledgers that, by the relationship between the data used and the challenge causes the data to be time-stamped. In some embodiments, data can be incorporated into challenges by placing the data in ledger entries. Data originator, observers, aggregator, jurors, and/or miners can place data in ledger entries. In many embodiments, time-stamping of data will succeed since other miners and verifiers can have the same view of the data available, and a consensus can therefore be established. In some embodiments, volatility of data as received by the distributed consensus mechanism using this approach can be controlled by sourcing data from aggregators, bounty hunters and/or jurors, which are each incentivized to perform valid computations, thereby reducing outliers and invalid data, and/or penalizing cheaters financially and/or in terms of reputational measures. Aggregators, bounty hunters and/or jurors can reduce the entropy of the data that is being "voted on" using the consensus mechanisms, as frequently many of the outliers and corrupted data can be weeded out and/or suppressed before the resulting information reaches the consensus layer.

In several embodiments, a feedback layer, in which invalid inputs are ignored and cheaters are penalized, includes aggregators, bounty hunters and/or jurors Feedback can include modifications to reputations, assignments of rewards, and aggregation of data.

While specific systems and components for incorporation of data from a certified observation and/or a certified report on a blockchain by a miner are described above, any of a variety of systems and components can be utilized for Incorporation of data from a certified observation and/or a certified report on a blockchain by a miner as appropriate to the requirements of specific applications. In certain embodiments components can be arranged in any order or sequence not limited to the order and sequence shown and described. In a number of embodiments, some of the above components may execute or perform processes substantially simultaneously where appropriate or in parallel to reduce latency and processing times. In some embodiments, one or more of the above components may be omitted. Although the above embodiments of the invention are described in reference to incorporation of data from a certified observation and/or a certified report on a blockchain by a miner the techniques disclosed herein may be used in any of the rich media systems, permissioned blockchains, cryptographic systems, methods of integrating real-world data and measurements into distributed and consensus-based environments, methods for ensuring blockchain integrity and stability, robust enforcement of software update policies in consensus networks, Proof of History based blockchain verification and other systems and processes discussed herein.

Methods for Ensuring Blockchain Integrity and Stability

In several embodiments, containers can include ledger references, public keys, reports, proofs, and/or tags. An example container is conceptually illustrated in FIG. 22. A container 2200 can include a reference 2201 to one or more ledger entries, a proof 2202, a public key 2203, a tag 2204 and/or a report 2205. In various embodiments, proofs can be proofs of work, proofs of space, proofs of stake, other proofs, and/or a combination of such proofs. In some embodiments, public keys can be part of, and/or associated with proofs. In many embodiments, associating public keys with proofs includes the public keys being inputs used in generating and/or verifying the proofs. In various embodiments, data related to ledger references are inputs to proof 2202. Proofs can be functions of data that are referenced using appropriate references. In some embodiments, tags can be functions of indications of versions of computational entities. In various embodiments, tags can describe aspects of software installations, and/or aspects of hardware environments used for execution of software units. Tags can include identifiers associated with execution environments. Tags can include sequence numbers, software version identifiers, hardware identifiers (e.g., serial numbers and/or version identifiers), hashes and/or other functions of a software unit, public keys, unique identifiers associated with agents, and/or combinations of such values. In several embodiments, components of tags can be encrypted using keys (e.g., private keys trusted parties). Components of tags can be authenticated (e.g., using a digital signature, a message authentication code (MAC), and/or an alternative authentication token).

In various embodiments, version identifiers can be associated with software versions. Version identifiers can be sequence numbers (e.g., such as 4.2.0, indicating a version in the manner that software engineers may use when referring to a software release). Version identifiers can be sequence numbers that are integers (e.g., 1, 2, 3 or 4). In various embodiments, new version identifiers can have sequence numbers that are one greater than the previous sequence number. In some embodiments, version identifiers can be determined based on code of software versions (e.g., the version identifiers can include a cryptographic hash of the code or a portion thereof). In many embodiments, version identifiers can be hash values in hash chains, where xi is the ith value in this chain, and x(i−1)=hash(xi). For instance, x0 can be associated with a first version of the software, and consecutive versions can have identifiers that are hash preimages of the preceding version identifier. Hashes can be generated using hash functions, such as (but not limited to) the SHA256 hash function. In certain embodiments, version identifiers can be values representing the software code, such as signatures of the types that can be used to characterize software and malware in anti-virus applications. A digital signature on the code can also be used to represent the code, where the version identifier can include at least a portion of the digital signature. In a number of embodiments, multiple version identifiers can be used at the same time. In some embodiments, software can have an integer (e.g., 5) for a first version identifier and can have a value from a hash chain (e.g., x5) for a second version identifier. Using two version identifiers can facilitate verification of the set of identifiers, for example, while the first version identifier (e.g., integer, 5) can be forged or accidentally modified, but random modifications to the second version identifier (e.g., a value from a hash chain, x5) can invalidate the second version identifier and make it effectively impossible to be verified.

In several embodiments, version identifiers can be associated with each deployed instance of code. Version identifiers can correspond to miners running code. Software can implement miners and/or other computational units that are associated with consensus mechanisms. Miners and/or other computational units associated with consensus mechanisms can be referred to as agents. In many embodiments, version identifiers of agents can indicate a software type as well as a version number. For example, version identifiers can include information that identifies agents as using particular cryptographic systems for mining (e.g., ABC miner) and/or a version of the particular cryptographic system (e.g., version 17). In some embodiments, version identifiers can include entity-specific digital signatures. Entity-specific digital signatures can identify the agent as certified. Entity-specific digital signatures can be based on a public key that is associated with the agent. In certain embodiments, digital signatures can be associated with permissions for agents to perform actions in given contexts. Contexts can include jurisdictions, times of the day, and/or descriptors related to content in ledgers. In some embodiments, version identifiers can include encrypted values (e.g., identity values). where the values (e.g., identity values) can be decrypted by authorized entities. The identity values can indicate an owner of the agent. In some embodiments, version identifiers can be generated for and/or by agents at a generation time and can then be used for a period of time until the software is updated or replaced. In several embodiments, version identifiers and/or portions of it, can be functions of current states of software corresponding to agents at times of generation of containers. Containers are described further elsewhere herein.

In certain embodiments, containers can be generated by agents. Containers can include tags. Containers can be generated by agents. In several embodiments, tags can be values that depend, at least in part, on the software version component of a version identifier associated with the software version. Tags can be explicit tags. Explicit tags can include at least a portion of the version identifier. In several embodiments, tags can be values that are functions of the version identifier and/or have additional functionality.

In certain embodiments, tags can be portions of containers that are generated by miners. Miners can use the containers and/or tags to close the ledger of a blockchain (e.g., containers and/or tags can be used to generate challenges). In various embodiments, tags are publicly accessible by entities with access to the container. In some embodiments, Miners and/or verifiers that are validating containers can have access to associated tags. In several embodiments, miners and/or verifiers can determine, based on tags, information related to agents that generated related containers.

In several embodiments, containers and tags can be used with systems not related to mining of cryptocurrency but which still depend on a consensus mechanism. In certain embodiments, tags can be part of containers that are generated by actions of agent. Containers and/or tags can be accessible by at least some other entities, such as other agents. In many embodiments, version information and/or associated hash, and/or version identifier can be stored within ledgers. In various embodiments, storing version information and/or associated hash, and/or version identifier can include permanently storing out of date or consensus participating disqualifying information.

While specific systems and components for containers including ledger references, public keys, reports, proofs, and/or tags are described above, any of a variety of systems and components can be utilized for containers including ledger references, public keys, reports, proofs, and/or tags are described above as appropriate to the requirements of specific applications. In certain embodiments components can be arranged in any order or sequence not limited to the order and sequence shown and described. In a number of embodiments, some of the above components may execute or perform processes substantially simultaneously where appropriate or in parallel to reduce latency and processing times. In some embodiments, one or more of the above components may be omitted. Although the above embodiments of the invention are described in reference to containers including ledger references, public keys, reports, proofs, and/or tags are described above the techniques disclosed herein may be used in any of the rich media systems, permissioned blockchains, cryptographic systems, methods of integrating real-world data and measurements into distributed and consensus-based environments, methods for ensuring blockchain integrity and stability, robust enforcement of software update policies in consensus networks, Proof of History based blockchain verification and other systems and processes discussed herein.

In various embodiments, reports can include data indicating that containers match conditions. Reports can include evidence, container references and public keys. An example of a report is conceptually depicted in FIG. 23. A report 2300 can include a container reference 2301, evidence 2302, and a public key 2303. In several embodiments, container references can indicate containers that match one or more conditions. In many embodiments, evidence can include indications of the type of conditions that are matched, and/or values that can be used to verify that containers indicated by container references match conditions. In several embodiments, public keys can be associated with bounty hunters that helped generate reports and/or report contents. In many embodiments, when reports are found to be valid, and determinations indicate that rewards are required, then resources can be associated with public keys. Resources can include amounts of crypto currency, and/or permission to perform certain actions. In some embodiments, when resources are associated with public keys, private keys corresponding to the public keys can be used to gain access to the resources or to perform the certain actions. For example, generating a digital signature using the private key associated with a public key can allow for the digital signature to be verified using the public key. In some embodiments, a bounty hunter associated with a public key can be the same entity as a miner that generates a container in which a report is incorporated. In various embodiments, reports can include public key blocks instead of or in addition to public keys. Public key blocks are described elsewhere herein.

In some embodiments, bounty hunters can be miners, verifiers, and/or other entities. Bounty hunters can access containers and/or extract tags. In various embodiments, bounty hunters can determine whether extracted tags are consistent with indicators associated with preferred and/or allowed tags. In certain embodiments, bounty hunters can determine whether tags correspond to special situations. Special situations can correspond to bounty hunters determining whether tags correspond to version identifiers that are associated with outdated software version, permission indicators that do not support that the associated agent has the right to perform an action, and/or another state related to the tag that is undesirable, not allowed, an anomaly, never previously observed, and/or another type of special situation. Special situations can include (but are not limited to) identification of containers associated with transactions and/or versions causing forks.

When special situations are detected by bounty hunters, bounty hunters can report the container. In some embodiments, reports can specify that the associated agent uses software that is no longer supported; software that has known weaknesses; software that has been modified by malware; software that soon will not be in compliance with a requirement, or another condition related to software associated with the agents that create, at least in part, containers with tags identified as corresponding to special situations. In various embodiments, special situations can require reporting by bounty hunters. In certain embodiments, special situations can be identified based on containers and/or tags matching one or more conditions. Bounty hunters can assess containers and/or associated tags with respect to conditions to identify containers and/or associated tags matching conditions. In certain embodiments, conditions can be described using rules, policies, and/or executable scripts that perform classifications. Examples of bounty hunters and their actions can be found in U.S. Provisional Patent Application No. 63/213,251 filed Jun. 22, 2021 titled "Token Creation and Management Structure" and U.S. patent application Ser. No. 17/808,264 filed Jun. 22, 2022 titled "Systems and Methods for Token Creation and Management," the disclosures of which are incorporated herein by reference in their entireties.

In several embodiments, reporting containers for which one or more tags associated with the containers match a condition can include generating complaints. Complaints and/or reports can include digitally signed descriptions of containers, matched tags of the containers, and/or indications of conditions that prompted the generation of the reports. Complaints and/or reports can include public keys associated with bounty hunters. In several embodiments, complaints and/or reports can be submitted to public databases (e.g., ledgers).

In many embodiments, methods can be used to avoid other entities front-running the bounty hunter by copying portions of the complaint. In some embodiments, bounty hunters can commit to the complaint in a first ledger entry and then decommit to it in a subsequent ledger entry. In various embodiments, the decommitment must be recorded within a pre-specified time and/or number of ledger entries relative and/or defined by the commitment. In several embodiments, a commitment can be used to identify one or more bounty hunters that first disclosed a match with a condition. Rewards can be assigned to the identified one or more bounty hunters. In many embodiments, rewards can be granted after verification of a complaint and/or report. Rewards can be payed to various entities as determined based on the nature of the complaint. In certain embodiments, when a miner is out of compliance, the miner can forfeit at least a portion of the reward associated with mining. In some embodiments, when a miner is found to have been infected by malware, an insurer may pay the bounty hunter for alerting the insurer of the risk posed by the agent that is infected with malware. In certain embodiments, various consequences can be paired with various special situations.

In additional embodiments, reporting containers whose tags match conditions can be performed by bounty hunters. Bounty hunters can be miners. Bounty hunters can collaborate with miners. In several embodiments, miners can identify the validity of complaints filed by bounty hunters as part of processes for scanning elements on ledger entries to be closed. Miners can notify other entities of the validity of reports filed by bounty hunters by including references to reports in data associated with ledger closings. In various embodiments, miners can include bounty hunter public keys in the data associated with ledger closings. Bounty hunter public keys can be included to enable value (e.g., tokens) to be associated with bounty hunters at the time of ledger closings. In several embodiments, the value (e.g., tokens) can be subtracted from rewards that would otherwise be provided to the miner that generated the container that caused the match (e.g., the miner that is affected by the condition that is being reported). In several embodiments, miners that collaborate with bounty hunters can be given extra awards for performing this service. In certain embodiments, as described elsewhere herein, bounty hunters can use commitment methods to avoid front-running, including by a miner that is not trustworthy. In some embodiments, when there is a trust relationship between the bounty hunter and the miner, or where the miner is the bounty hunter, then no commitment may be needed. Miners can include descriptions of matches in elements that are not entered on ledgers, but which are added to containers that close ledgers.

In certain embodiments, a value transferred to bounty hunters can depend on the condition detected. In some embodiments, when a miner typically receives a first amount of tokens (e.g., 1 token) upon successful mining, where the successful mining closes a ledger, a miner that is found to be out of compliance may only receive a first portion (e.g., ½) of the first amount for the same service. In several embodiments, miners that are found to have malware can receive only a second portion (e.g., 95%) of the first amount for the service. Different amounts can correspond to matches with different conditions. In some embodiments, bounties can vary according to matched conditions. In various embodiments, bounty hunters who report on a miner being out of compliance can receive a second amount (e.g., 0.45 coins) for the reporting service. In many embodiments, bounty hunters that discover malware can be given a third amount (e.g., 0.04 coins) as a reward. In some embodiments, miners that facilitate reporting can be paid a fourth amount (e.g., 0.01 coins) extra for including the bounty hunter report, in addition the first amount (e.g., 1 coin) paid to miners for closing the ledger. In numerous embodiments, funds not assigned to an entity can be assigned to a public pool that is used to pay for maintenance of the system, and/or other services that benefit the community.

Containers can include proofs. The proofs can be proof of work, proof of space, proof of stake, and/or any other proofs associated with cryptographic systems. Other mining approaches compatible with the disclosed approach are possible, as will be understood by a person of skill in the art. Examples of additional compatible mining approaches are described in U.S. Provisional Patent Application No. 63/210,037 filed Jun. 13, 2021 titled "Improved Coin Technology" and U.S. patent application Ser. No. 17/806,725 filed Jun. 13, 2022 titled "Grinding Resistant Cryptographic Systems and Cryptographic Systems Based on Certified Miners," in U.S. Provisional Patent Application No. 63/228,065 filed Jul. 31, 2021 titled "Secure Delay Function Method and Apparatus" and U.S. patent application Ser. No. 17/806,060 filed Jun. 8, 2022 titled "Composite Cryptographic Systems with Variable Configuration Parameters and Memory Bound Functions," in U.S. Provisional Patent Application No. 63/228,80W3 filed Aug. 3, 2021, titled "Practical Memory-Bound Delay Functions" and U.S. patent application Ser. No. 17/806,060 filed Jun. 8, 2022 titled "Composite Cryptographic Systems with Variable Configuration Parameters and Memory Bound Functions," in U.S. Provisional Patent Application No. 63/224,345 filed Jul. 21, 2021 titled "Cost Reduction for Crypto Mining" and U.S. patent application Ser. No. 17/806,060 filed Jun. 8, 2022 titled "Composite Cryptographic Systems with Variable Configuration Parameters and Memory Bound Functions," in U.S. Patent Application No. 63/208,374 filed Jun. 8, 2021 titled "Composite Cryptosystems with Automated Reparametrization" and U.S. patent application Ser. No. 17/806,060 filed Jun. 8, 2022 titled "Composite Cryptographic Systems with Variable Configuration Parameters and Memory Bound Functions," and in U.S. patent application Ser. No. 16/743,503 filed Jun. 15, 2020 titled "Robust and Secure Proof of Space Based Mining," the disclosures of which are incorporated herein by reference in their entireties.

In certain embodiments, containers which do not include properly formed tags can be unacceptable to other miners (e.g., ignored based on the consensus mechanism). In some embodiments, containers that do not include properly formed tags can be acceptable in at least some situations. In some embodiments, containers not including properly formed tags can be reported by bounty hunters (e.g., miners and/or verifiers).

In various embodiments, when a report is validated (e.g., by being approved by a set of miners using the consensus mechanism) at least one of a penalty and a reward is initiated. Penalties can correspond to reductions of access to resources (e.g., such as a financial resource of a miner associated with a container being reported). Penalties can depend on the type of condition that was being matched and indicated in a report. In some embodiments, penalties can depend on whether the creator of the container that is being reported has been penalized in the past. In certain embodiments, the first time a miner is penalized for using out-of-date software, the penalty may be a first portion (e.g., 10%) of the value of a reward that is awarded to successful miners. In some embodiments, the second time a miner is penalized for the same reason, the penalty can be a second portion (e.g., 20%) of the value of a reward that is awarded to successful miners. Penalty amounts can increase each time there are additional incidents. In several embodiments, increasing the penalty includes, a bounty hunter (or other entity) providing evidence of the previous penalty (e.g., in the form of a reference to a previous ledger entry associated with this previous penalty). In certain embodiments, rewards given to bounty hunters can depend on the type of match that is performed, and/or on the size of the penalty given. In various embodiments, awards can be divided between multiple entities, such as a bounty hunter, a miner facilitating the filing of the report generated by the bounty hunter, and/or a third party that receives a portion of the funds being collected as penalties in return for a service, such as the provision of a secure and efficient software updating service.

While specific systems and components for reports including evidence, container references and/o public keys are described above, any of a variety of systems and components can be utilized for reports including evidence, container references and/or public keys as appropriate to the requirements of specific applications. In certain embodiments components can be arranged in any order or sequence not limited to the order and sequence shown and described. In a number of embodiments, some of the above components may execute or perform processes substantially simultaneously where appropriate or in parallel to reduce latency and processing times. In some embodiments, one or more of the above components may be omitted. Although the above embodiments of the invention are described in reference to reports including evidence, container references and public keys the techniques disclosed herein may be used in any of the rich media systems, permissioned blockchains, cryptographic systems, methods of integrating real-world data and measurements into distributed and consensus-based environments, methods for ensuring blockchain integrity and stability, robust enforcement of software update policies in consensus networks, Proof of History based blockchain verification and other systems and processes discussed herein.

In many embodiments, ledger (e.g., distributed ledger) can include a first set of ledger entries, a second set of ledger entries and a container. An example ledger (e.g., distributed ledger) including a container irrevocably associating a set of ledger entries with a ledger is conceptually illustrated in FIG. 24. A ledger (e.g., distributed ledger) 300 can include a first set of ledger entries 2401, a second set of ledger entries 2410 and a container 2402. The container can include a ledger reference that indicates the first set of ledger entries 2401. In several embodiments, a container can associate a first set of ledger entries with a ledger in a manner that is difficult or infeasible to undo. The second set of ledger entries 2410 can include a first message 2411, a second message 2412, and a report 2412. The report 2412 can include a container reference that indicates the container 2402. In various embodiments, containers can be generated such that the containers or entities generating the containers satisfy one or more conditions. Satisfaction of a condition can be determined and/or indicated by tags. Tags can be included as part of containers. Tags can be indicative of information including (but not limited to) the wrong software version(s) being used to generate containers, the software used to generate containers being infected with and/or being vulnerable to malware, and/or that containers include elements that were generated in non-compliance and/or inconsistently with other values of containers with which they are associated.

As an example, a miner can include a tag that indicates that the miner used a first software application to generate a container. Other data associated with the container indicates that a second software application, different from first software application, was used to generate the container.

While specific systems and components for a ledger including a container irrevocably associating a set of ledger entries with a ledger are described above, any of a variety of systems and components can be utilized for a ledger including a container irrevocably associating a set of ledger entries with a ledger as appropriate to the requirements of specific applications. In certain embodiments components can be arranged in any order or sequence not limited to the order and sequence shown and described. In a number of embodiments, some of the above components may execute or perform processes substantially simultaneously where appropriate or in parallel to reduce latency and processing times. In some embodiments, one or more of the above components may be omitted. Although the above embodiments of the invention are described in reference to a ledger including a container irrevocably associating a set of ledger entries with a ledger the techniques disclosed herein may be used in any of the rich media systems, permissioned blockchains, cryptographic systems, methods of integrating real-world data and measurements into distributed and consensus-based environments, methods for ensuring blockchain integrity and stability, robust enforcement of software update policies in consensus networks, Proof of History based blockchain verification and other systems and processes discussed herein.

In some embodiments, reports can include public key blocks. An example public key block is conceptually illustrated in FIG. 25. A public key block 2500 includes a first public key 2501, a second public key 2503, an optional first descriptor 2502 and an optional second descriptor 2504. In various embodiments, a first public key can be associated with a bounty hunter that generated a report in which the public key block is incorporated. A first descriptor can specify that a first public key is associated with the bounty hunter, and/or specify a portion of a reward to be associated with first public key. A second descriptor can specify that a second public key is associated with another entity to receive a portion of a reward, and/or specify a portion of a reward to be associated with the second public key. Thus, when a report including a public key block is approved then value and/or access rights can be associated with a first public key and a second public key. The manner of associating the value and/or access rights can be governed by a first descriptor and/or a second descriptor. In various embodiments, a first descriptor and a second descriptor may be absent and/or implicit in the formatting of the public key block. In some embodiments, the formatting of a public key block can correspond to a percentage of reward. For example, the first public key can always be associated with 95% of a reward, and a second public key can always be associated with 5% of a reward.

While specific systems and components for public key blocks are described above, any of a variety of systems and components can be utilized for public key blocks as appropriate to the requirements of specific applications. In certain embodiments components can be arranged in any order or sequence not limited to the order and sequence shown and described. In a number of embodiments, some of the above components may execute or perform processes substantially simultaneously where appropriate or in parallel to reduce latency and processing times. In some embodiments, one or more of the above components may be omitted. Although the above embodiments of the invention are described in reference to public key blocks the techniques disclosed herein may be used in any of the rich media systems, permissioned blockchains, cryptographic systems, methods of integrating real-world data and measurements into distributed and consensus-based environments, methods for ensuring blockchain integrity and stability, robust enforcement of software update policies in consensus networks, Proof of History based blockchain verification and other systems and processes discussed herein.

Robust Enforcement of Software Update Policies in Consensus Networks

In certain embodiments, version identifiers can correspond to software releases of software applications that execute within the system. As can readily be appreciated anomalous behavior can occur when different versions of a software application are simultaneously executing within a distributed system. An example of a series of version identifiers is conceptually illustrated in FIG. 26. At the time T of initialization, T=0, the version identifier is the value H0 2601. H0 2601 can be computed as hash(H1). The function hash can be a function such as the SHA256 hash function. At time T=1, H1 2602 is the version identifier. At time T=3, H3 2603 is the version identifier. At time T=4, H4 2604 is the version identifier. The identifier H2 can be verified, given knowledge of H1, by hashing H2 and comparing the result to H1. The identifier H2 can be verified, given knowledge of H0, by hashing H2 twice and comparing the result to H0. H0 can be digitally signed by the creator of the mining code, or other code to be updated. A first software release is associated with H1. A second software release is associated with H2. The identifier H2 can be verified to be legitimate, based on H1, since identifiers are only released when the corresponding code version is released. Thus, a party having access to H2 has access to a software version that corresponds to H2.

In various embodiments, version identifiers can be referenced or included in transcripts. Transcripts can be generated by nodes in a consensus network. In some embodiments, version identifiers can be included by miners in any mining attempt. In several embodiments mining attempts can include proofs, such as proofs of work, proofs of stake, proofs of space, other proofs and/or combinations of such proofs. Proofs can be generated relative to ledger contents that have not yet been time-stamped. Ledger content that has not yet been time-stamped can be referred to as the mempool. Proofs can also be relative to a stored graph, as in the context of a proof of space, or to an access right, as in the context of a proof of stake. Proofs can further include and/or reference auxiliary data. In several embodiments, the reference to and/or inclusion of auxiliary data does not affect the determination of whether a given attempt to generate a proof succeeds or not. In some embodiments, auxiliary data can be digitally signed using a private key associated with a public key where the public key is associated with the proof. In several embodiments, version identifiers are one type of auxiliary data that can be included in proofs in this way. Other types of data can also be included as auxiliary data. In several embodiments, auxiliary data can be associated with a proof by making the auxiliary data an input used to determine the challenge that the proof is based on.

In many embodiments, version identifiers can include serial numbers and/or other numbers (e.g., 12.1) to indicate versions. In some embodiments, version identifiers can include cryptographic elements that provide evidence of a version. In certain embodiments, each version (e.g., software version, mining code version) can be represented by digitally signed messages. The messages can indicate the version and the associated digital signatures can be generated by a trusted entity that can generate version updates. In various embodiments, consecutive versions can be represented as consecutive preimages of a hash chain. The generation and verification of hash chains is described in U.S. Pat. No. 8,990,576 issued Mar. 24, 2015 titled "Methods and Apparatus for Efficient Computation of One-Way Chains in Cryptographic Applications" to Markus Jakobsson, and in the 2002 publication titled "Fractal Hash Sequence Representation and Traversal" by Markus Jakobsson, the disclosures of which are incorporated herein by reference. Cryptographic elements representing version identifiers enable verification of claims (e.g., claims related to code versions being used) related to a version identifier, as is disclosed herein.

In several embodiments, rate restrictors implement gradually increasing difficulties related to generation of proofs. The difficulty increase can be associated with a time, a sequence number for the mempool, and/or another counter. For example, the first ever version of a particular piece of software can be represented by (0, H0), the next version by (1, H1), and the one after that by (2, H2). Here Hi, where i is a counter, can be a hash value such that H0=hash(H1), H1=hash(H2), and Hi=hash(H(i+1)), where hash represents a cryptographic hash function such as the SHA256 hash function (or another function that is computationally one-way from a practical perspective). Thus, H1 cannot be computed from H0 in a reasonable amount of time, using normal resources, but H0 can be immediately computed from H1. Therefore, H1 can be verified using H0, just like H2 can be verified using H1, and H(i+1) verified from Hi. This verification can be performed by applying the hash function and comparing to an already known value. Entities that generate updates of the software can disclose consecutive preimages, e.g., first H0, then H1, and then H2, based on having generated a complete sequence ending on HN for some very large number N N=2^32) and that can be obtained by (but not limited to) storing them, generating them on the fly, using one of the fractal hash traversal methods referenced above for generation, and/or a version of such an algorithm.

While specific systems and components for a series of version identifiers are described above, any of a variety of systems and components can be utilized for a series of version identifiers as appropriate to the requirements of specific applications. In certain embodiments components can be arranged in any order or sequence not limited to the order and sequence shown and described. In a number of embodiments, some of the above components may execute or perform processes substantially simultaneously where appropriate or in parallel to reduce latency and processing times. In some embodiments, one or more of the above components may be omitted. Although the above embodiments of the invention are described in reference to a series of version identifiers the techniques disclosed herein may be used in any of the rich media systems, permissioned blockchains, cryptographic systems, methods of integrating real-world data and measurements into distributed and consensus-based environments, methods for ensuring blockchain integrity and stability, robust enforcement of software update policies in consensus networks, Proof of History based blockchain verification and other systems and processes discussed herein.

In various embodiments, version identifiers and version authenticators can be checked for acceptability. An example process for checking the acceptability of version identifiers and version authenticators is conceptually illustrated in FIG. 27. In some embodiments, processes for checking version identifiers and version authenticators can be executed by miners and/or verifiers. A process 2700 can obtain (e.g., receive) 2702 a set of a version identifier (e.g., Hj) and a version authenticator (e.g., AV). The version identifier and the version authenticator can be associated with a proof. The process 2700 can extract (2704) the version identifier. Extracting version identifiers can involve decompression, decryption or other decoding. In several embodiments, processes can verify whether obtained version identifiers are valid before verifying related version authenticator values. When obtained version identifiers are invalid the process can abort the version authenticator verification. Process 2700 can determine (2706) if the obtained version identifier corresponds to a known software version. If the version identifier does correspond to a known software version the process can proceed to 2712. If the version identifier does not correspond to a known software version then the process 2700 can obtain (2708) a reference to a mining code version corresponding to the version identifier. Based on the reference to the code version corresponding to the version identifier, the process 2700 can obtain (2710) mining code that corresponds to the version identifier. In several embodiments, obtaining a mining code can include making at least one request to at least one database. The request(s) can include related version identifiers. The process 2700 can extract (2712) the version authenticator. The process can determine (2714) whether the version authenticator matches a computed value hash (C, CODEj), where C is the challenge of a proof and CODEj can be the binary for the mining code as previously obtained. The mining code corresponds to the version identifier. If there is a match, the process 2700 can accept (2716) the version authenticator and the version identifier. If there is not a match, the process 2700 can reject (2718) the version authenticator and the version identifier.

In several embodiments, version authenticators can be proof, relative to the code (e.g., mining code) used to perform the consensus-based computation, that the code corresponds to the code associated with the claimed version (e.g., the version corresponding to the associated version identifier). In some embodiments, version authenticators can be cryptographic hashes of challenges associated with proofs, and the code used to generate the proofs.

In certain embodiments, version authenticators can include references to resources where associated codes (e.g., associated software version) can be obtained. In some embodiments, version authenticators can be verified by any entities (e.g., miners and/or verifiers) that have access to relevant code or can access relevant code from resource references. Verifiers can determine whether referenced code is valid (e.g., by determining whether it is digitally signed by a party associated with code updates), and/or whether referenced code is located at a valid location (e.g., webpages of entities associated with code updates). In various embodiments, referenced code that is not valid is rejected, and associated version authenticators are considered invalid.

In several embodiments, verification of version authenticators can include determining a challenge, determining a code (e.g., mining code) used, generating a cryptographic hash based on at least the challenge and the code, and/or comparing the computed value to the version authenticator. In various embodiments, when the computed value matches the version authenticator and/or the code is determined to be valid, then the version authenticator can be determined to be valid. In certain embodiments, version authenticators can be checksums computed based at least in part on the representation of the code as an input to the checksum algorithm. The checksum function can be publicly known. In several embodiments, version authenticators can be functions of the miner identities (e.g., miner public keys). Version authenticators can be functions of miner identity, and/or challenges. In some embodiments version authenticators can be functions of miner identity by computing the version authenticators as hash(C,pk,code), where C is a challenge, pk is a public key or other miner identifier, and code represents the binary of the mining code used to mine. Incorporating miner identity information into version authenticators can prevent cheating miners from taking the version authenticator from the packet of another proof and using it for the cheating miner's version authenticator. In various embodiments, version authenticators enable the production of evidence of having a given software version, where this evidence can easily be verified by other entities. Instead of, or in addition to, using cryptographic hash functions (e.g., MD5, SHA256, SHA512) to generate version authenticators and/or other values other functions that are hard to invert can be used. In this way, use of version authenticators in accordance with various embodiments of the invention can increase the security of a cryptographic system.

While specific processes for checking the acceptability of version identifiers and version authenticators are described above, any of a variety of processes can be utilized for checking the acceptability of version identifiers and version authenticators as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to checking the acceptability of version identifiers and version authenticators the techniques disclosed herein may be used in any of the rich media systems, permissioned blockchains, cryptographic systems, methods of integrating real-world data and measurements into distributed and consensus-based environments, methods for ensuring blockchain integrity and stability, robust enforcement of software update policies in consensus networks, Proof of History based blockchain verification and other systems and processes discussed herein.

In several embodiments, restriction values can vary with time, between miners, and/or between mining code versions. An example of a series of restriction values and the associated limitation values for two example miners is conceptually illustrated in FIG. 28. The time axis 2801, which is illustrative, and not meant to be at scale, corresponds to time or events elapsed, where events may correspond to acceptance of proofs and the associated closing of ledgers. The axis 2802 corresponds to the restriction value R and associated limitation values L. The line 2803 corresponds to a sequence of restriction values R as plotted on the time axis 2801. Line 2804 corresponds to a sequence of limitation values associated with the use of version j of code, where such code is represented by a binary CODEj. The miner corresponding to line 2804 remains using CODEj. Another miner updated to version j+1 of the code at event marked by 2806. Switching to the updated version j+1 can result in a reduction of the associated limitation value, corresponding to the sequence of values shown as line 2805.

While specific systems and components for series of restriction values and the associated limitation values are described above, any of a variety of systems and components can be utilized for a series of series of restriction values and the associated limitation values as appropriate to the requirements of specific applications. In certain embodiments components can be arranged in any order or sequence not limited to the order and sequence shown and described. In a number of embodiments, some of the above components may execute or perform processes substantially simultaneously where appropriate or in parallel to reduce latency and processing times. In some embodiments, one or more of the above components may be omitted. Although the above embodiments of the invention are described in reference to a series of restriction values and the associated limitation values the techniques disclosed herein may be used in any of the rich media systems, permissioned blockchains, cryptographic systems, methods of integrating real-world data and measurements into distributed and consensus-based environments, methods for ensuring blockchain integrity and stability, robust enforcement of software update policies in consensus networks, Proof of History based blockchain verification and other systems and processes discussed herein.

In some embodiments, miners can generate transcripts. Transcripts can be generated based on an acceptance of a version identifier and version authentication value. An example of a transcript is conceptually illustrated in FIG. 29. Transcript 2900 includes a ledger reference 2901, a proof 2902, a set of a version identifier and version authentication value 2903, and a code reference 2904. Transcripts can be generated by miners. Ledger references can identify one or more entries on the mempool from which a challenge is computed. The code reference can be used to locate and validate a code version. Proofs can be generated relative to challenges, and can be associated with records that include version identifiers and/or version authenticator values. Code references can include URLs to where the binary mining code associated with the version identifier can be found.

In several embodiments, restriction values can be associated with versions of code for generation of transcripts. Transcripts can include proofs. Restriction values can change based on time, and/or on a sequence number of the mempool being closed by use of a proof associated with the transcript. For example, a first mempool can correspond to a restriction value 1, a second mempool following directly after the first mempool can correspond to a restriction value 2, and a third mempool following directly after the second mempool can correspond to a restriction value 3. In various embodiments, restriction values can affect the difficulty of generating valid proofs. In some embodiments, restriction values can affect the profits associated with the completion of a proof that is accepted by a quorum of other nodes in the consensus network. In several embodiments, the restriction automatically increases and thus, automatically and based on the increasing restriction value, it can become less and less profitable for miners to generate proofs over time. In several embodiments, restriction values can be partially or fully reset when a miner downloads an approved update corresponding to a new software version (e.g., mining code) for mining. In certain embodiments, the software corresponds to code and/or parameter data not included in the code. In some embodiments, parameter data can be part of the code. In various embodiments, profits of mining are gradually reduced for all miners until a point where compliant miners their profits of mining at least partially restored to a previous state. In several embodiments, miners that are not in compliance (e.g., do not have the most recent code for mining), can still mine but will receive a reduced profit as compared to miners that are in compliance. In some embodiments, new updates can render previous updates non-compatible (e.g., a version that is three updates old may no longer be compatible) and previous versions can therefore not be usable for mining anymore. In certain embodiments, restriction values can be used to compute limitation values. Limitation values can directly identify the probability of success or the percent compensation associated with a given proof.

In several embodiments, each node in a consensus network can have code that performs steps to incorporate version identifiers, version authenticators and/or other data. In various embodiments, nodes in a consensus network can have code that performs steps to perform verifications of version identifiers, version authenticators and/or other data. In many embodiments, transcript generators (e.g., miners) can incorporate version identifiers, version authenticators, and/or other data to proofs as described above. In various embodiments, version identifies, version authenticators, and/or other data can be incorporated within a proof as auxiliary data.

In several embodiments, miners can use and/or be governed by restriction values associated with the code (e.g., mining code) the miners are using. In various embodiments, miners with outdated software can reap benefits of having a proof accepted by other nodes. In several embodiments, miners with outdated software can be subject to penalties based on restriction values. For example, the expected benefit to a miner would be lower if the miner has an outdated mining code version, relative to the expected benefit of a miner that has an up to date mining code version (e.g., by using the most recent code version of the mining software). In several embodiments, expected benefits can be significantly lower for miners using mining code versions that are several updates old, relative to miners that are using the most recent version of the mining code. Expected benefits can be based on restriction values as described elsewhere herein. In many embodiments, miners that misrepresent the mining code version being used can obtain no benefit at all from having a proof accepted by other nodes, or can have an expected benefit that is lower than it would have been had its representation of the software version not have been misrepresented.

While specific systems and components for transcripts generated based on an acceptance of version identifiers and version authentication values are described above, any of a variety of systems and components can be utilized for transcripts generated based on an acceptance of version identifiers and version authentication values as appropriate to the requirements of specific applications. In certain embodiments components can be arranged in any order or sequence not limited to the order and sequence shown and described. In a number of embodiments, some of the above components may execute or perform processes substantially simultaneously where appropriate or in parallel to reduce latency and processing times. In some embodiments, one or more of the above components may be omitted. Although the above embodiments of the invention are described in reference to transcripts generated based on an acceptance of version identifiers and version authentication values the techniques disclosed herein may be used in any of the rich media systems, permissioned blockchains, cryptographic systems, methods of integrating real-world data and measurements into distributed and consensus-based environments, methods for ensuring blockchain integrity and stability, robust enforcement of software update policies in consensus networks, Proof of History based blockchain verification and other systems and processes discussed herein.

In certain embodiments, limitations can be applied to the probability of success of miners and/or verifiers. An example process for generating a proof subject to a limitation is conceptually illustrated in FIG. 30. Processes for generating proofs subject to limitations are executable by miners and/or verifiers. Process 3000 can determine (3001) a limitation (e.g., L). Process 3000 can generate (3002) a proof (e.g., proof P). The process 3000 can extract (3003) a component (e.g., component COMP) from the proof. Extracting a component from a proof can include hashing a proof and selecting a portion (e.g., 100 least significant bits) from the hash of the proof. Process 3000 can submit (3004) the proof P when the component meets one or more conditions. A condition can be that the component (e.g., COMP) is greater than a limitation (e.g., L). Submitting a proof can include generating a transcript and transmitting the transcript and/or making the transcript accessible to one or more miners and/or verifiers.

In an example, a miner generates a proof P based on a challenge C, using a software version V with authenticator value AV, while governed by a limitation L derived from the restriction value R. The proof includes and/or references an auxiliary data element including (V, AV, S), where S is a reference to the source of the code of version V. Verifiers without knowledge of the code of version V can automatically obtain this code using the reference to S, and validate that the code is legitimate (e.g., by checking digital signatures). Verifiers that have knowledge of the code of version V can determine whether AV is a valid authenticator of V, e.g., using the code of version V and the challenge C. Knowing the version V used and what versions are available, the verifier can determine the limitation value L. Alternatively, L may be conveyed in the auxiliary data and verified whether it is correct by the verifier computing what the value L should have been (e.g., based on the known restriction value R). The computation of L can be based on the knowledge of the version V, whether there are newer versions and if so, how many, and/or by scrutiny of the restriction value R associated with the mempool being closed using the proof. In several embodiments, various components and or steps described in this example can be omitted, changed, and/or added.

In an example, a restriction value R is a counter that starts at 1 with the first closed ledger portion, is 2 for the second closed ledger portion, and 3 for the third, etc. Here, a closed ledger portion corresponds to the ledger entries in the mempool that the challenge is based on, where the challenge is used to compute the proof and the proof is what causes the closing of the ledger. A first version of the mining software, i.e., V=1, can be used at the time R=1. The limitation may be set to L=1 for all miners with V=1 at the time R=1. When R=2, the limitation may be increased and become L=2. The limitation increases by one for each increase of R, until there is a new version, i.e., V=2. At that time, which may be at R=3002, for example, L=R for all miners with software version V=1, but is reduced to R=1 for any miner with software version V=2. At R=3003, i.e., one ledger closing later, the miners with V=1 will use L=3003, while those with V=2 will use L=2. The next update to V=3 may occur at R=10004. Right before this update is announced, i.e., at R=10003, the miners with V=1 will use L=10003, but those with V=2 will use L=10003-3001=7002, based on their L-value having been increased by 1 for each increase of R. As the V=3 is deployed, those miners that download and use this code version will have their limitation value reset to L=1, but those that remain using version V=2 will use L=7003. Those miners that still use V=1 may now be using L=10004. The limiting value L for each miner will increase as R is increased, but will be reduced, in this example to L=1, when a miner upgrades its mining code to the most recent mining code. In several embodiments, the maximum acceptable age of a software version is a number of (e.g., two) versions too old. In the example, miners that use V=1 at R=10004 will no longer be compatible, and their proofs will no longer be accepted. In Some embodiments, the maximum acceptable age of an outdated mining code can be based on the number of closed ledgers and/or increases of restriction value (e.g., R) since the most recent update and/or another time datum. For example, as long as number of closed ledgers and/or increases of restriction value since the most recent update is less than a threshold value (e.g., 1000), the outdated mining code may be accepted as compatible, but when the threshold value is exceeded miners using outdated software are no compliant. These are just examples of rules and policies determining how the limitation increases over time, and how the compatibility can be determined. Other rules and policies, which will be expressed by the mining and verification code, can be used. Rules and policies can be modified over time, e.g., by having the description of the rule or policy be part of the component of the code that is being changed when the mining or verification code is being updated.

In several embodiments, profitability of miners can be reduced as L increases by extracting a portion of the proof (e.g., the 20 most significant bits of the proof and/or of a hash of the proof) and treating the extracted value as a number, this number can be referred to as a validator number. Validator numbers can be compared to the value L to determine the validity of the proof. In some embodiments, when the validator number exceeds L, then the proof is valid; otherwise the proof is not valid. In many embodiments, determining the validity of a proof based on a validator number can be performed both by miners and verifiers. Limitation values (e.g., L) can be used in the verification can be limitation values associated with miners submitting proofs for verification. In certain embodiments, when miners submit proofs that are not valid, the invalid proofs will be rejected. Approaches described herein can be applicable for proofs of work, proofs of space, for constructs that are hybrids of these, and other suitably configured proofs.

In many embodiments, an approach suitable for at least use with cryptographic systems using proofs of stake includes assigning a value to coins issued from valid proofs. For example, if the validator number is X and the limitation value is L, a valid proof can be assigned a value $(X-L)/L*Y$, where Y is the maximum coin value, and may be set to 1. A setting of 1 for the maximum coin value can correspond to the full coin value. The maximum coin value can be independent of the exchange rate of the coin to other currencies, including fiat currencies. Thus, if X−L is three quarters of L, a miner will only obtain 75% of the maximum value in response to closing a ledger. In many embodiments, other value-assigning algorithms can be used. For example, a non-linear algorithm can be used where the impact is small at first, but grows bigger later on. The determination of probability or value can also depend on the mining code version used by a miner relative to the most recent version. In some embodiments, a step-function can be implemented to penalize all miners with a version that is one version out of compliance with a first reduction (e.g., 20% reduction) in expected profit, and penalize those that are behind by two version with a second reduction (e.g., 75% reduction).

While specific processes for generating a proof subject to a limitation are described above, any of a variety of processes can be utilized for generating a proof subject to a limitation as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to generating a proof subject to a limitation the techniques disclosed herein may be used in any of the rich media systems, permissioned blockchains, cryptographic systems, methods of integrating real-world data and measurements into distributed and consensus-based environments, methods for ensuring blockchain integrity and stability, robust enforcement of software update policies in consensus networks, Proof of History based blockchain verification and other systems and processes discussed herein.

In many embodiments, limitations can be applied to mining rewards. An example process applying limitations to mining rewards is conceptually illustrated in FIG. 31. Processes for applying limitations to mining rewards can be executed by miners and/or verifiers. Process 3100 can receive (3102) a transcript. The transcript can include a proof. The process 3100 can determine (3104) if the proof wins. Determining if the proof wins can be based on verifying that P is valid and, optionally, that it has a quality measurement greater than other proofs. When it is determined that the proof wins, the process 3100 can proceed to 3106. When it is determined that the proof does not win, the process 3100 can end (3110). The process 3100 can determine (3106) a limitation. The process 3100 can generate (3108) a reward value associated with the proof. The reward value associated with the proof can be generated based at least on the limitation. In various embodiments, the reward value can be inversely related to the limitation. The reward value can be a mining reward assigned to a miner.

While specific processes for applying limitations to mining rewards are described above, any of a variety of processes can be utilized for applying limitations to mining rewards as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to applying limitations to mining rewards the techniques disclosed herein may be used in any of the rich media systems, permissioned blockchains, cryptographic systems, methods of integrating real-world data and measurements into distributed and consensus-based environments, methods for ensuring blockchain integrity and stability, robust enforcement of software update policies in consensus networks, Proof of History based blockchain verification and other systems and processes discussed herein.

In some embodiments, code update records can include penalty descriptors. An example code update record is conceptually illustrated in FIG. 32. The code update record 3200 can include a reference 3202, a binary code (e.g., binary mining code) 3204, a digital signature 3206, and a penalty descriptor 3208. In various embodiments, references can be unique to the code update record. The digital signature can be by an issuing authority, such as the provider of the code update and/or an associated trusted party. Digital signatures can be based on binary codes, penalty descriptors, and/or references. In many embodiments, digital signatures can be publicly verified using a public key that is associated with the issuing authority. In many embodiments, penalty descriptors can include rules, steps, algorithms, policies, values, and/or a combination of such. Penalty descriptors can be used to verify a penalty for using previous versions of the associated software (e.g., mining code, mining software). Penalty descriptors can be functions of the value of the current mining software version to be used, the current mining software version used by a given miner, a restriction value, and/or a limitation value. In some embodiments, penalty descriptors can include restriction values and/or limitation values.

In some embodiments, penalties for being non-compliant can depend on the severity of the need to update. Critical updates can be associated with greater penalties than a non-critical update, when not performed. Information about the degree of severity or the type of penalty can be propagated by the network as digitally signed announcements. Digitally signed announcements can be part of the software updates (e.g., a portion of data associated with a code update can indicate the penalties of not applying this update as a function of the restriction value, the code version being used, and/or other inputs). In various embodiments, restriction values can correspond, fully or partially, to network times, allowing penalties to be increased by the hour, for example. In some embodiments, penalties can be determined based on step functions, where additional penalties are levied stepwise is subsequent periods (e.g., by the 24 h period). In various embodiments, critical software patches can correspond to steeper increases of penalties over time than non-critical patches.

While specific systems and components for code update records are described above, any of a variety of systems and components can be utilized for code update records as appropriate to the requirements of specific applications. In certain embodiments components can be arranged in any order or sequence not limited to the order and sequence shown and described. In a number of embodiments, some of the above components may execute or perform processes substantially simultaneously where appropriate or in parallel to reduce latency and processing times. In some embodiments, one or more of the above components may be omitted. Although the above embodiments of the invention are described in reference to code update records the techniques disclosed herein may be used in any of the rich media systems, permissioned blockchains, cryptographic systems, methods of integrating real-world data and measurements into distributed and consensus-based environments, methods for ensuring blockchain integrity and stability, robust enforcement of software update policies in consensus networks, Proof of History based blockchain verification and other systems and processes discussed herein.

Improvement of Proof of History Based Blockchain Verification

In a traditional hash function h, such as the SHA256 hash function, when used in traditional PoH contexts, takes as input IN=(IN1, IN2). IN1 can be an output of a previous application of h and IN2 can be an optional event-descriptor. An example system is described in "Solana: A new architecture for a high performance blockchain v0.8.13" by Anatoly Yakovenko. The same series of function applications of h that a miner performs also has to be performed by each verifier. We use the term miner here to describe the processing performed by a party attempting to close a ledger in a Proof of Work (PoW), Proof of Space (PoS), Proof of Stake (PoSt), or other proof system. Such proof systems benefit from being combined with a Proof of History (PoH). A party wishing to verify the computation performed by the prover is referred to as a verifier. This may be another miner, but it could also be an entity that is not performing mining, such as a bounty hunter. Bounty hunters are disclosed in co-pending U.S. patent application Ser. No. 17/806,065 filed Jun. 8, 2022 titled "Systems and Methods for Maintenance of NFT Assets," and U.S. Provisional Patent Application No. 63/208,366 filed Jun. 8, 2021 titled "Perpetual NFT Assets" by Markus Jakobsson, Stephen C. Gerber, and Guy Stewart, the disclosures of which are incorporated herein by reference.

In some embodiments, processes can implement a witness-based hash function. Witness-based hash functions can be denoted by H. In several embodiments, in the absence of a witness, H can take as an input IN'=(IN1', IN2', IN3') where IN1' is an output of a previous application of H, IN2' is an optional event-descriptor, IN3' is an optional hardness value. The hardness value can also be called a resolution parameter. In several embodiments, the hardness value can determine the granularity of time quanta. In many embodiments, the hardness value can determine the effort associated with computing one verifiable output in the hash chain associated with the PoH, which can then be incorporated in a PoW, PoS, PoSt, or another proof. A high resolution (e.g., short time quanta) corresponds to a greater ability to distinguish the arrival order of events, such as entries on a blockchain. whereas a low resolution corresponds to a lesser ability to determine a relative order among events that take place at about the same time. At the same time, a high resolution is associated with a greater cost of verification than a low resolution, relative to the cost of generating the PoH.

In several embodiments, H can be computed, by a prover (e.g., a miner), in the absence of a witness. In many embodiments, computing H can include receiving an input. The received input can include IN2', and IN3'. IN2' can be an empty string. IN3' can be an integer value that is a hardness value. The hardness value can determine the resolution. Larger hardness values can correspond to lower resolutions. Lower resolutions (e.g., larger hardness values) can correspond to larger time quanta. Larger hardness values can correspond to greater relative savings of effort of the verification, relative to the processing corresponding to computing H by the prover (e.g., miner). In some embodiments, computing H can include setting C (e.g., setting C=0). The value C can be a tentative witness. At this point in the process, it can be unknown whether this selected value of C is a valid witness. In certain embodiments, computing H can include computing temp=h(IN1', IN2', IN3', C). In several embodiments, a benefit of including IN3' in the computation of temp is to prevent the computation temp followed by a retroactive switch to a new value for IN3'. In many embodiments, computing H can include Generating check=trunc(temp,IN3'). The function trunc(A,B) can truncate A to its B least significant bits. When check is not equal to a target (e.g., 0), the tentative witness C can be increase by an amount (e.g., by one) and a new temp can be generated for another iteration. In many embodiments, the hardness value (e.g., IN3') indicates the number of bits to be compared when determining whether the check matches the target. In various embodiments, the check can also be compared to values other than 0 (e.g., various target values). In many embodiments, target values are known by both the prover (e.g., miner) and the verifier(s). When the check matches the target the tentative witness C can be determined to be a valid witness. In several embodiments, computing H can include locally updating IN1' to (temp,C) and outputting IN1'.

In some embodiments, a sequence of values C=0, C=1, C=2, and etc. can be used. Using sequential values for C can enable simple verification that a prover (e.g., miner) is likely to have followed the pre-set sequence, as opposed to tested C-values out of order. In various embodiments, a bounty hunter can verify whether there exists a value for C, greater than or equal to 0, and less than the reported witness value, for which the prover should have halted and output a solution. In some embodiments, failing to report the smallest valid witness can be a reportable offense. In various embodiments, the series of values of C can be chosen according to a pseudo-random ordering, where only the prover may know the seed to the pseudo-random generator.

In several embodiments, a verification that an output of the format (temp,C) corresponds to an input (IN1', IN2', IN3') can be performed. In various embodiments, verifications can include computing vtemp=h(IN1', IN2', IN3', C). In some embodiments, verifications can include generating check=trunc(vtemp, IN3'). In many embodiments, verifications can include outputting "valid" if check=0 and vtemp=temp, and otherwise outputting "invalid".

In many embodiments, using PoH involves creating chains of hash function values, such as described elsewhere herein. In several embodiments, relative order between events can be established by chronicling the order of registered events in the form of values IN2'. In many embodiments, establishing the relative order of events can be performed in conjunction with an ordering in which values representing events, combined with the most recent hash chain value, are digitally signed before being incorporated into the chain as described above. For example, a party adding an event E to a ledger may determine the most recent value INV at that time, have an authority digitally sign (E, IN1'), resulting in a digital signature value S, after which the party wishing to time-stamp E submits (E, IN1', S) to the ledger. This proves that E took place after IN1' was posted. In some embodiments, trusted authorities may only sign events with the most recent value associated with them.

In accordance with many embodiments of the invention, hardness values (e.g., IN3') indicate the difficulty of generating a hash value H without a witness. In several embodiments, the difficulty increases exponentially as hardness value increases. In some embodiments, the hardness value IN3' does not affect the difficulty of the verification (e.g., the computation of H in the presence of a witness). In many embodiments, the witness can be part of the output generated by the miner as the miner evaluates H and determines the witness.

In several embodiments, hardness values (e.g., IN3') can be hardcoded quantities (e.g., IN3'=11), which cause the cost of generating H when a witness is present to be less (e.g., approximately 1/2000 of the cost for IN3'=11) than without a witness.

In several embodiments, witness-based hash functions can be computed without a witness. An example process for evaluating a witness-based hash function without a witness is conceptually illustrated in FIG. 33. Processes for evaluating a witness-based hash function without a witness can be executed by miners and/or verifiers. Process 3300 can access (3301) a previous chain value IN1'. As the processing starts, this initial value, can be a randomly selected value that is made public. After H has already been previously computed, the value can be obtained from the previous computation. Process 3300 can receive (3302) an event descriptor (e.g., IN2'). When there is no event to be time-stamped, IN2' can be set to the empty string, or a fixed value (e.g., 0). Process 3300 can access (3303) a hardness value IN3'. Hardness values can indicate a hardness of the computation to be performed. The process 3300 can set (3304) an initial value of C (e.g., C=0). In various embodiments the initial value of C can be set based on the value IN1' (e.g., as a portion of IN1'). The process 3300 can compute (3305), a temporary result (e.g., temp). The temporary result can be computed as a function (e.g., h) of IN2', IN3' and C. The function (e.g., h) can be a one-way cryptographic hash function (e.g., SHA256, SHA512). Process 3300 can generate (3306) a check. Generating a check can include selecting a portion of a temporary result. The portion selected can be based on a hardness value (e.g., IN3'). For example, a check can be the IN3' least significant bits of a temporary result. The process 3300 can determine (3307) if the check matches a target value (e.g., an IN3'-based target value). In some embodiments, a target value can be an all-zero string, of length IN3'. If there is a match the process 3300 continues to 3308. If there is not a match the process 3300 continues to 3310. The process 3300 can compute (3308) a new chain value (e.g., IN1'). In various embodiments, a new chain value can be computed by concatenating a temporary result (e.g., temp) and a witness value (e.g., C) used in the computation of the temporary result. The process 3300 can output (3309) a result. In several embodiments, the output can include a temporary result and a witness. In some embodiments, the output can be a concatenation of a temporary result and a witness, hash of a concatenation of a temporary value and a witness, a concatenation of a hash of a temporary result and a witness, and/or otherwise based on a temporary result and a witness. If the match of 3307 fails then C is not a valid witness, and the processing can continue to step 3310. Process 3300 updates (3310) the witness (e.g., C). Updating the witness can include increasing the witness by 1, or selecting pseudorandom value for the witness based on a seed (e.g., based on a seed that includes one or more of IN2', IN3' and/or the old witness. The process 3300 can return to 3304 compute and new temporary result. The new temporary result can be based on one or more of for IN2', IN3' and/or the new witness. In some embodiments, if IN2' and IN3' are provided to a hash function (e.g., hash function h) before a witness is provided, thereby allowing a previous state of the hash function to be utilized in future hash calculations. In various embodiments, a hash function can require the input order to start with C, which prevents such optimizations.

While specific processes for evaluating a witness-based hash function without a witness, any of a variety of processes can be utilized for evaluating a witness-based hash function without a witness as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to evaluating a witness-based hash function without a witness the techniques disclosed herein may be used in any of the rich media systems, permissioned blockchains, cryptographic systems, methods of integrating real-world data and measurements into distributed and consensus-based environments, methods for ensuring blockchain integrity and stability, robust enforcement of software update policies in consensus networks, Proof of History based blockchain verification and other systems and processes discussed herein.

In several embodiments, witness-based hash functions can be computed with a witness. An example process for evaluating a witness-based hash function with a witness is conceptually illustrated in FIG. 34. Processes for evaluating a witness-based hash function with a witness can be executed by miners and/or verifiers. Process 3400 can access (3401) a previous chain value IN1'. As the processing starts, this initial value (e.g., IN1'), can be a randomly selected value that is made public. After H has already been previously computed, the value IN1' can be obtained from the previous computation. Process 3400 can receive (3402) an event descriptor (e.g., IN2'). When there is no event to be time-stamped, IN2' can be set to the empty string, or a fixed value (e.g., 0). Process 3400 can access (3403) a hardness value IN3'. Hardness values can indicate a hardness of the computation to be performed. In some embodiments, the initial value, event descriptor, and/or hardness value can be obtained, computed and/or received by the process. Process 3400 can obtain (3404) a witness (e.g., C). The witness can be obtained by extracting the witness from a hash output generated by a prover (e.g., miner). For example, a witness can be obtained by extracting it from a hash output as generated by a process 3300 and/or another process. In some embodiments, a witness can be extracted by selecting a second portion of the output, where the first portion is of a known or specified size (e.g., 512 bits long in the case of the use of SHA512 for an associated hash function). Process 3400 can compute (3405) a temporary result. In several embodiments, temporary results can be computed as a function (e.g., function h) of IN1', IN2', IN3' and a witness (e.g., C). Process 3400 computes (3406) a check value (e.g., check). The check value is determined as described with respect to FIG. 33. Process 3400 determines (3407) if the check value matches a target. The target can be generated based on IN3'. If the check value does not match the target, the process 3400 declares (3410) the inputs invalid. If the check value matches the target, the process 3400 continues to 3408. Process 3400 can determine (3408) if the temporary result matches IN1'. If the temporary result matches the process 3400 declares (3409) the input valid. If the temporary result does not match the input is declared invalid. The input corresponds to a computed hash value (e.g., the computed hash value output in FIG. 33).

While specific processes for evaluating a witness-based hash function with a witness, any of a variety of processes can be utilized for evaluating a witness-based hash function with a witness as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to evaluating a witness-based hash function with a witness the techniques disclosed herein may be used in any of the rich media systems, permissioned blockchains, cryptographic systems, methods of integrating real-world data and measurements into distributed and consensus-based environments, methods for ensuring blockchain integrity and stability, robust enforcement of software update policies in consensus networks, Proof of History based blockchain verification and other systems and processes discussed herein.

In various embodiment the hardness value (e.g., IN3') can be modified. The hardness value can be modified based on a collision detection. An example process for modifying a hardness value is conceptually depicted in FIG. 35. In various embodiments, the hardness value (e.g., IN3') governs the difficulty of generating outputs. In several embodiments, hardness values do not affect the difficulty of verifying outputs. Process 3500 records (3501) a first time associated with a first event. In various embodiments, events can be in collision with one another. Collisions can correspond to two (or more) events being placed in queue to be time-stamped within one and the same time quantum. A time quantum typically corresponds to the time between the computation of two valid outputs (e.g., valid outputs as generated by process 3300, and/or other processes). In several embodiments, time may be measured by clock cycles of a processor, by count of events (e.g., such as the generation of valid outputs). In many embodiments, counts can be weighted. In several embodiments, counts can be weighted using the hardness values (e.g., IN3') or a function thereof as weights. Process 3500 can record (3502) a second time corresponding to an event. Based on the first and second time, the process 3500 can determine (3503) if a proximity condition is met. In some embodiments, the proximity condition can be satisfied when the time difference between the second time and the first time exceeds a first threshold (e.g., T1). When the proximity condition is satisfied, the process 3500 proceeds to increase (3504) a hardness value. In many embodiments, increasing a hardness value can reduce the computational cost of performing verification of outputs (e.g., the processing of FIG. 34) relative to that of generating outputs (e.g., the processing of FIG. 1). When the proximity condition is not met, the process 3500 can proceed to determine (3505) if a second event associated with a third time has occurred. When no second event is determined to have occurred, the process 3500 can return to 3502. When the second event associated with the third time is detected, the process 3500 can determine if a second proximity condition is met based on the third time and the first time. The second proximity condition can be the third time minus the first time falls below a second threshold (e.g., T2). When the second proximity condition is met, the process 3500 can decrease the hardness value (e.g., IN3'). When the second proximity condition is not met, the process can return to 3502. In many embodiments, Decreasing the hardness value can decrease the risk of collisions onwards. In some embodiments, the proximity condition can be a collision detection, such that when a collision is detected, the hardness is decreased.

In accordance with various embodiments of the invention, a reduction of computational costs for verifiers can be achieved. Techniques can enable automated adjustments of resolution associated with the time quanta used to order events. This adjustment can enable the use of sufficiently granular ordering that collisions are avoided. This avoidance may either be configured to be complete avoidance of collisions or can have a level of tolerance for collisions. A level of tolerance for collisions can be determined based on a configuration parameter.

In some embodiments, hardness values can change over time. In several embodiments, when two events occur within the same quantum of time, defined as the time it takes to generate the output of the hash function H without prior knowledge of the witness, this corresponds to a collision. Collisions can correspond to situations in which the relative order between two (or more) events is not established on the blockchain. In several embodiments, occasional collisions can be acceptable. In some embodiments, the system can attempt to eliminate or limit the number of collisions. Collisions can degrade the ability to establish the relative order of events recorded on a blockchain.

In many embodiments, the parameter IN3' can be modified to balance the power savings of the verifiers (which benefits from a large value of IN3') and the capability of creating a relative order between events on a granular level (which benefits from a smaller value of IN3'). In some embodiments, when at least a first threshold number of collisions are detected for a fixed period of time the value of IN3' can be reduced (e.g., reduced by 1 bit). Threshold numbers can be set as parameters for the system. In certain embodiments, reducing the hardness value by one can reduce the required processing by provers to half. In several embodiments, when for a fixed period of time, at least a second threshold number of collisions are detected, where the second threshold is greater than the first threshold, then the hardness value can be reduced by a larger amount (e.g., reduced by two). In a number of embodiments, when a set amount of time is passed and a number of collisions (e.g., 0) below a third threshold was observed, then the hardness value (e.g., IN3') can be increased (e.g., by 1). In several embodiments, when a fourth threshold number of events are recorded, such as 100 events, without any collision being recorded, then the hardness value (e.g., IN3') can be increased (e.g., by 1). In many embodiments, hardness values can be selected based on the reporting of events. In many embodiments, hardness values can be modified in a manner that balances the risk of collisions with the desire to minimize costs of verification.

In several embodiments, the processes and/or inputs for determining IN3' can be publicly known. In various embodiments, input counts (e.g., counts of number of hash function values being computed by the miner between two events) can be used. The counts used can be counts related to the blockchain that will not be subjective (e.g., counts based on the blockchain will not be different for different machines). In various embodiments, the system can modify hardness values (e.g., IN3') both on the miner side and the verifier side. The hardness values can be determined based on non-subjective quantities. Non-subjective quantities can include counts of hash function H outputs being generated. In several embodiments, counts can be weighted by a quantity that depends on the current hardness value, thereby increasing the weight of a count that corresponds to a more demanding computational task for the miner. For example, by using $2^{IN3'}$ as the weight, the weighted count can correspond approximately to a time elapsed, given a fixed computational setup for a given miner.

In several embodiments, hardness values, when changed by one bit, double or halve the effort associated with computing H in the absence of a witness. In some embodiments, other step sizes can be implemented. In many embodiments, when it is desirable to increase the effort by less than double, matches can be performed by determining whether the truncated value check, which may comprise B bits, is less than a threshold number T that is less than a multiple of B (e.g., 2B). For example, in a setting where the value check is 10 bits (e.g., can express a number between 0 and 1023), a threshold may be T=900. A value check would be accepted as a match if check>T, which would occur with a probability of roughly 1-900/1024 (e.g., approximately 12% probability) based on these parameter choices. Continuing the example, the threshold T can then be increased to 950 without modifying B. The probability of passing the check is then 1-950/1024, or roughly 7%. Similarly, if the parameters are set to (B, T)=(11,1022), then the probability of accepting an output is approximately 0.1%. To further reduce that, the value B can be increased to B=12, and the threshold T set to T=2046. It can also be increased to B=14, T=8090. A person of skill in the art will recognize that there are many variants of this that can be used to determine whether a computed hash value is acceptable. In some embodiments, multiple check values can be extracted, determinations for each of these can be performed, and a decision of whether a computed hash value is acceptable based on these two or more determinations can be made.

While specific processes for modifying a hardness value, any of a variety of processes can be utilized for modifying a hardness value as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to modifying a hardness value the techniques disclosed herein may be used in any of the rich media systems, permissioned blockchains, cryptographic systems, methods of integrating real-world data and measurements into distributed and consensus-based environments, methods for ensuring blockchain integrity and stability, robust enforcement of software update policies in consensus networks, Proof of History based blockchain verification and other systems and processes discussed herein.

In several embodiments, numbers of collisions for a given set of events can vary based on PoH time granularity scales. The notion of collisions under two different PoH time granularity scales is conceptually illustrated in FIG. 36. Four observed events, a first event 3601, a second event 3602, a third event 3603, and a fourth event 3604 with the time period are illustrated. The events take place at a time illustrated by their mapping to the time axis showing the actual time of occurrence 3610. The events can be mapped to one or more PoH time granularity scales, such as first PoH time granularity scale 3620 and second PoH time granularity scale 3630. The first PoH time granularity scale 3620 and the second PoH time granularity scale 3630 correspond to different PoH time resolutions. The first PoH time granularity scale 3620 includes first time quantum 3621, second time quantum 3622, and third time quantum 3622. The second PoH time granularity scale 3630 includes fourth time quantum 3631 and fifth time quantum 3632. The first event 3601 can be mapped to the first time quantum 3621 and to the fourth time quantum 3631. The second event 3602 can be mapped to the second time quantum 3622 and to the fourth time quantum 3631. The third event 3603 can be mapped to the second time quantum 3622 and to the fourth time quantum 3631. The fourth event 3604 can be mapped to the third time quantum 3623 and to the fifth time quantum 3632. There is a two-way collision during the second time quantum 3622, the collision is associated with the second event 3602 and the third event 3603. Similarly, there is a three-way collision for the fourth time quantum 3631, the collision associated with the first event 3601, the second event 3602 and the third event 3603.

Figure 37:
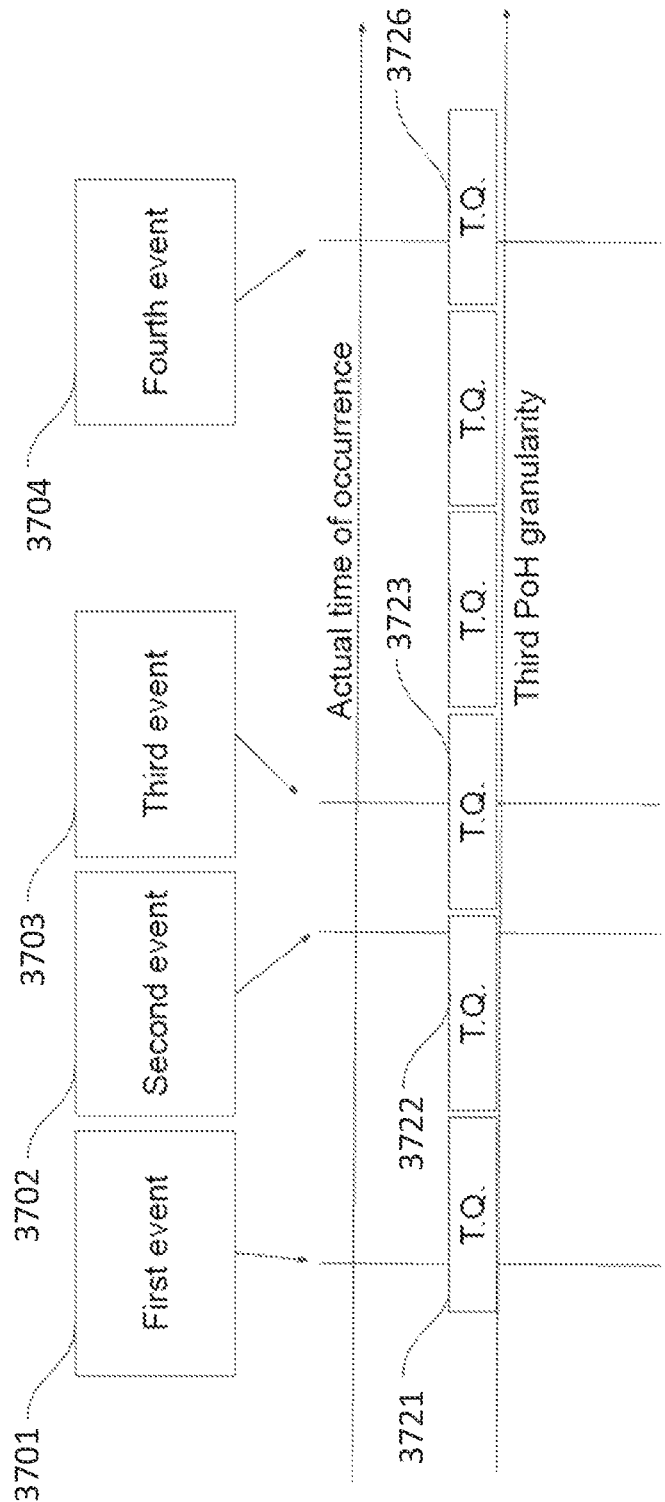
FIG. 37 conceptually illustrates the notion of collisions under another PoH time granularity scale.

The notion of collisions under another PoH time granularity scale is conceptually illustrated in FIG. 37. The time quanta (abbreviated T.Q. in the figure) in FIG. 37 are shorter than those depicted in FIG. 36. No collisions occur in FIG. 36. First event 3701 can be mapped to a first time quantum 3721. Second event 3702 can be mapped to a second time quantum 3722. Third event 3703 can be mapped to a third time quantum 3723. Fourth event 3704 can be mapped to a fourth time quantum 3726.

In some embodiments, one or more proof of history (PoH) series can be generated, and based on collision detection one of the one or more of the proof of history series can be selected to be output. An example process in which three proof of history series can be generated, and based on collision detection, one proof of history series can be output is conceptually illustrated in FIG. 38. In several embodiments, the three proof of history series can be generated in parallel using three processors. In some embodiments, the three proof of history series can be generated using an algorithm implemented on one processor using traditional time-sharing methods (e.g., using round-robin mechanisms). Process 3800 can initiate (3801) a first PoH series P1 using a first hardness value (e.g., IN3'=0). In several embodiments, a first PoH series can be initiated on a first processor. In many embodiments, the first PoH series initiated using a first hardness value corresponds to a first (e.g., highest) time quanta size. Process 3800 can initiate (3802) a second PoH series P2 using a second hardness value (e.g., IN3'=8). In some embodiments, a second PoH series can be initiated on a second processor. In many embodiments, the second PoH series initiated using a second hardness value corresponds to a second time quanta size. In many embodiments, the second time quanta size is larger than the first time quanta size. In certain embodiments the second hardness value (e.g., IN3'=8) corresponds to time quanta that are 2, 4, 8, 16, 32, 64, 128, 256, or another amount times bigger than those associated with P1. Process 3800 can initiate a third PoH series P3 using a third hardness value. In some embodiments, a third PoH series can be initiated on a third processor. In many embodiments, the third PoH series initiated using a third hardness value corresponds to a third time quanta size. In many embodiments, the third time quanta size is larger than the second time quanta size. In certain embodiments the third hardness value (e.g., IN3'=16) corresponds to time quanta that are 2, 4, 8, 16, 32, 64, 128, 256, or another amount times bigger than those associated with P2. The process 3800 can determine (3804) whether there are any collisions for P3 (e.g., determine if there are two or more events falling within the same time quantum in P3). When it is determined there is no collision, the process 3800 can proceed to generate (3805) a portion (e.g., the entire) PoH series P1, P2 and P3. Process 3800 can determine (3806) whether P3 has completed. If P3 has completed, the process 3800 continues to select and output (3807) P3 for verifiers to verify. If P3 has not been completed the process 3800 returns to 3804. If a collision is detected for P3 (e.g., at 3804), then the process 3800 continues to generate (3808) a portion (e.g., the entire) PoH series P1, and P2. Process 3800 can determine (3809) whether there are any collisions for P2. When it is determined there is a collision for P2 the process 3800 continues to select and output (3811) P1. Selecting and outputting P1 can include completing P1. When it is determined these is no collision for P2, the process 3800 can iterating for P1 and P2 until P2 completes (following the same principles as for P3), and the output of P2 is selected and output (3810). While this example includes three PoH series, a similar process can include 2, 3, 4, 5 or more PoH series.

In several embodiments, when there is a collision for a proof of history with large time quanta, then a PoH with smaller quanta can be considered instead, and if that also has a collision, then an even smaller-quanta PoH can used. In this way verifiers are provided with larger quanta proofs when possible, which can result in computational savings, and associated power savings, for the verifier.

Figure 38:
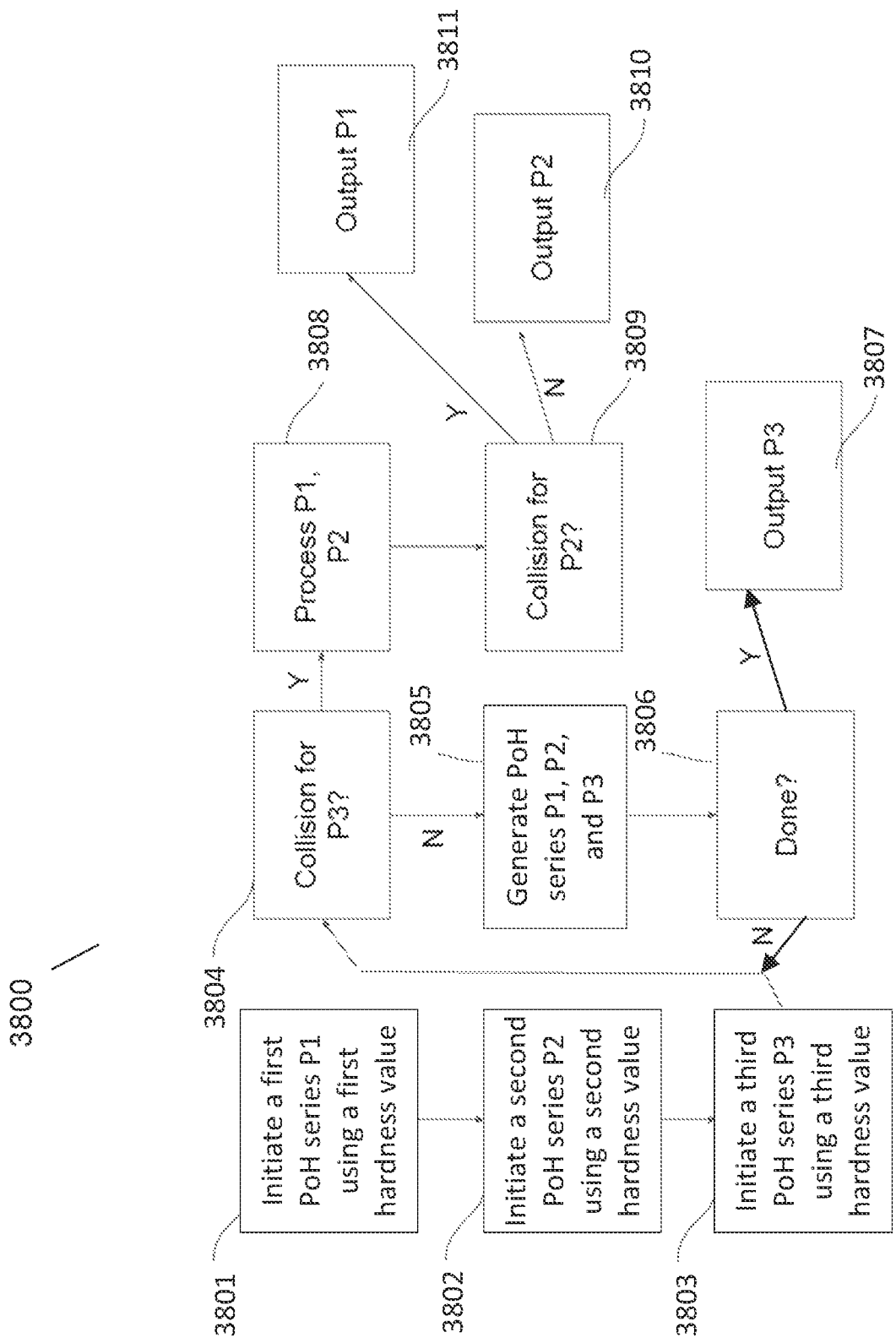
FIG. 38 conceptually illustrates an example process in which three proof of history series can be generated, and based on collision detection, one proof of history series can be output.

In the example depicted in FIG. 38, the power consumption of the prover, is approximately three times higher than the cost for the prover in the original Solana™ system, while the cost for each verifier, of which there may be many, will be approximately 0.001% of that in the original Solana™ system. Since there are many more verifiers than provers, this is a dramatic reduction of computational cost, which manifests itself both as a power saving and a capability to use commercial off the shelf hardware for verification. Since the illustrated system will not in any noticeable manner increase the number of collisions relative to that which would have occurred in the original Solana™ system, the significant saving associated with the disclosed technology does not have any meaningful drawback associated with it.

In various embodiments, provers (e.g., miners) establish relative ordering of reported events based on hash functions. In some embodiments, hash functions can be execute differently based on the presence or absence of detected collisions. In several embodiments, a shortcut computational effort of verifying the prover's computation exists and can be used by verifiers for the purposes of reducing computational effort and associated energy consumption. In several embodiments, verifications can be performed by commonplace computational entities, e.g., typical desktops, laptops, and/or other systems.

In several embodiments, a prover (e.g., a miner) can simultaneously use two or more hardness values (e.g., IN3a' and IN3b'). The multiple hardness values can be used concurrently to generate two or more simultaneous hash value sequences. In various embodiments, the multiple hardness values can be set so that a time quantum corresponding to a first hardness value (e.g., IN3a') includes an integer number of time quanta for a second setting. In various embodiments, the ending times of various time quanta corresponding to different hardness values can coincide, or can be spaced-apart. In some embodiments, when multiple time quanta end simultaneously, a selection can be made whether to use the first hardness value and associated information or the second hardness value and associated information in order to avoid collisions. In several embodiments, when both the first and the second hardness values and associated information avoid collisions, then the hardness values corresponding with the larger time quanta can be used. In multiple embodiments, computational complexity for the verifier can be reduced by using larger time quanta. In various embodiments, a series of hash chains can be computed in parallel by a prover (e.g., miner). In one example setting, there may be any number of (e.g., 1, 2, 3, 10, or another number) such chains, where the first chain uses time quanta of size 1, (e.g., IN3'=0); the second chain uses time quanta of size 2 (e.g., IN3'=1); and the ith chain uses time quanta of size 2i (e.g., IN3'=/). In various embodiments, after the largest-quanta chain has completed computing, one of the number of chains is reported. In several embodiments, the reported chain can be the chain with the largest quanta and no collisions. In several embodiments, the reported chain could be selected based on quanta size and collision numbers. In some embodiments, when all the chains have exactly one two-way collision then the largest-quanta chain is reported, whereas other tie-breaking methods can be used to select the chain are used for larger numbers of collisions, e.g., as governed by a policy set by the system. In some embodiments, the workload for provers can be increased by requiring multiple chains, the technique has the benefit of minimizing both the relative cost for the verifier and the risk of collisions, at the same time.

In several embodiments, the repetition of evaluation can be made to continue with a next iteration when the target is not matched and, at the same time, a second event has not been received since the beginning of the iteration, but only a first event or none at all. This approach, therefore, can cut the length of each iteration to avoid collisions. Collisions can still occur as two events can be registered at the same time, but this is a possibility in all systems.

While specific processes in which three proof of history series can be generated, and based on collision detection, one proof of history series can be output, any of a variety of processes can be utilized in which three proof of history series can be generated, and based on collision detection, one proof of history series can be output as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to processes in which three proof of history series can be generated, and based on collision detection, one proof of history series can be output the techniques disclosed herein may be used in any of the rich media systems, permissioned blockchains, cryptographic systems, methods of integrating real-world data and measurements into distributed and consensus-based environments, methods for ensuring blockchain integrity and stability, robust enforcement of software update policies in consensus networks, Proof of History based blockchain verification and other systems and processes discussed herein.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A device configured to implement a distributed ledger capable of immutably recording ledger entries that have validated version identifiers, the device comprising:
   a network interface;
   memory; and
   a processor, the processor configured to:
   obtain a ledger entry comprising a version identifier and a version authenticator value;
   determine a software version that corresponds to the version identifier;
   determine that the version identifier is valid based on the version authenticator value;
   obtain a challenge using a cryptographic system, wherein the challenge is based on the ledger entry;
   broadcast a block that incorporates the ledger entry to securely add the block to a distributed ledger, wherein the block is capable of being validated by using the cryptographic system to obtain a proof based on the challenge; and wherein the proof is capable of being validated based on comparing a validator number to a limitation value, wherein the validator number is extracted from the proof.

2. The device of claim 1, wherein:
   the processor is further configured to receive the block; and
   the proof is obtained based on the block.

3. The device of claim 1, wherein the proof is generated based on an iterative process.

4. The device of claim 1, wherein extracting a validator number from a proof comprises selecting a portion of the proof.

5. The device of claim 1, wherein extracting a validator number from a proof comprises selecting a portion of a hash of the proof.

6. The device of claim 1, wherein extracting a validator number from a proof comprises selecting a set of twenty most significant bits of the proof.

7. The device of claim 1, wherein obtaining a limitation value is based on comparing a software version associated with the version identifier with a received second software version.

8. The device of claim 1, wherein the limitation value can be determined based on a state of the distributed ledger.

9. The device of claim 1, wherein determining a software version that corresponds to the version identifier comprises determining if the version identifier is valid.

10. The device of claim 1, wherein determining a software version that corresponds to the version identifier comprises determining if the version identifier is valid based on the version authenticator value.

* * * * *